__US010944975B2__

(12) United States Patent
Nakagami

(10) Patent No.: US 10,944,975 B2
(45) Date of Patent: Mar. 9, 2021

(54) IMAGE PROCESSING DEVICE AND IMAGE PROCESSING METHOD

(71) Applicant: SONY CORPORATION, Tokyo (JP)

(72) Inventor: Ohji Nakagami, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/477,627

(22) PCT Filed: Jan. 5, 2018

(86) PCT No.: PCT/JP2018/000098
§ 371 (c)(1),
(2) Date: Jul. 12, 2019

(87) PCT Pub. No.: WO2018/135321
PCT Pub. Date: Jul. 26, 2018

(65) Prior Publication Data
US 2019/0342563 A1   Nov. 7, 2019

(30) Foreign Application Priority Data

Jan. 19, 2017   (JP) .............................. JP2017-007743

(51) Int. Cl.
*H04N 19/31*   (2014.01)
*H04N 19/167*   (2014.01)
(Continued)

(52) U.S. Cl.
CPC ........... *H04N 19/31* (2014.11); *H04N 19/167* (2014.11); *H04N 19/46* (2014.11); *H04N 19/70* (2014.11)

(58) Field of Classification Search
CPC ........ H04N 19/31; H04N 19/46; H04N 19/70; H04N 19/167
See application file for complete search history.

(56) References Cited

U.S. PATENT DOCUMENTS

| 2016/0073116 A1* | 3/2016 | Matsunobu | H04N 19/184 |
| | | | 375/240.01 |
| 2017/0236323 A1* | 8/2017 | Lim | H04N 21/23614 |
| | | | 345/419 |
| 2019/0014337 A1* | 1/2019 | Skupin | H04N 19/174 |

FOREIGN PATENT DOCUMENTS

| JP | H10-271509 A | 10/1998 |
| JP | 2005-102184 A | 4/2005 |

(Continued)

OTHER PUBLICATIONS

Itu, High efficiency video coding, Series H: Audiovisual and Multimedia Systems Infrastructure of audiovisual services —Coding of moving video, ITU-T Recommendation H.265, Apr. 2015, pp. 1-610.

(Continued)

*Primary Examiner* — Tsion B Owens
(74) *Attorney, Agent, or Firm* — Paratus Law Group, PLLC

(57) ABSTRACT

There is provided an image processing device and an image processing method making it possible to suppress a reduction in coding efficiency. The image processing device and the image processing method set temporal resolution for each of partial regions of image data to be coded and code the image data to generate a bit stream including information indicating the temporal resolution for each of the set partial regions. Alternatively, the image processing device and the image processing method analyze information indicating temporal resolution for each of partial regions of image data, the information being included in a bit stream in which the image data is coded. The present disclosure is applicable to, for example, image processing devices, bit stream conversion devices, image coding devices, image decoding devices, communication devices, or the like.

19 Claims, 32 Drawing Sheets

(51) Int. Cl.
*H04N 19/46* (2014.01)
*H04N 19/70* (2014.01)

(56) References Cited

FOREIGN PATENT DOCUMENTS

| JP | 2009-027564 A | 2/2009 |
| JP | 2011-035747 A | 2/2011 |
| JP | 2013-247663 A | 12/2013 |
| JP | 2014-030187 A | 2/2014 |
| WO | WO 2012/132267 A1 | 10/2012 |

OTHER PUBLICATIONS

Sreedhar et al., AHG8: Test results for viewport-dependent pyramid, cube map, and equirectangular panorama schemes, Joint Video Exploration Team (JVET) of ITU-T SG 16 WP 3 and ISO/IEC JTC 1/SC 29/WG 11, Oct. 15-21, 2016, pp. 1-7, 4th Meeting: Chengdu, CN.

Okubo et al., H.265/HEVC Textbook, Oct. 21, 2013, p. 135, Impress Japan Corporation, Tokyo, Japan.

Lu et al., A Perceptual Deblocking Filter for ROI-based Scalable Video Coding, Joint Video Team (JVT) of ISO/IEC MPEG & ITU-T VCEG (ISO/IEC JTC1/SG29/WG11 and ITU-T SG16 Q.6), Jan. 13-19, 2007, pp. 1-13, 22nd Meeting: Marrakech, Morocco.

Chen et al., Editorial improvements on SHVC Draft Text 2, Joint Collaborative Team on Video Coding (JCT-VC) of ITU-T SG16 WP3 and ISO/IEC JTC 1/SC 29/WG11, Jul. 25-Aug. 2, 2013, pp. 1, 11, 12, and 22-24, Vienna, AT.

* cited by examiner

| | |
|---|---|
| num_temporal_region | ue(v) |
| for(i=0;i< num_temporal_region; i++){ | |
| region_tileIdx[i] | ue(v) |
| region_temporal_id[i] | u(3) |
| } | |

A num_temporal_region specifies the number of temporal regions which have a own temporal id.When not present,the value is inferred to 0.

region_tileIdx[i] and region_temporal_id[i] specifies a temporal identifier RegionTemporalId[i] for a tile in a coded picture.
The variables RegionTemporalId[i] is derived in the following process.
for(i=0;i<= (num_tile_rows_minus1+1)*(num_tile_columns_minus1+1); i++){
  RegionTemporalId[i]=TemporalId
}
for(i=0;i< num_temporal_region; i++){
  RegionTemporalId[region_tileIdx[i]]=region_temporal_id[i]
}
When nal_unit_type is in the range of BLA_W_LP to RSV_IRAP_VCL23, inclusive,i.e.,the coded slice segment belongs to an IRAP picture, region_temporal_id[i] shall be equal to 0.
When nal_unit_type is equal to TSA_R or TSA_N,region_temporal_id[i] shall not be equal to 0.
When nuh_layer_id is equal to 0 and nal_unit_type is equal to STSA_R or STSA_N,region_temporal_id[i] shall not be equal to 0.
The value of region_temporal_id[i] shall be in the range of 0 to TemporalId in an access unit.

IMAGE PROCESSING DEVICE AND IMAGE PROCESSING METHOD

CROSS REFERENCE TO PRIOR APPLICATION

This application is a National Stage Patent Application of PCT International Patent Application No. PCT/JP2018/000098 (filed on Jan. 5, 2018) under 35 U.S.C. § 371, which claims priority to Japanese Patent Application No. 2017-007743 (filed on Jan. 19, 2017), which are all hereby incorporated by reference in their entirety.

TECHNICAL FIELD

The present disclosure relates to an image processing device and an image processing method and, in particular, to an image processing device and an image processing method that make it possible to suppress a reduction in coding efficiency.

BACKGROUND ART

Conventionally, the standardization of a coding system called HEVC (High Efficiency Video Coding) has been advanced by JCTVC (Joint Collaboration Team—Video Coding), the joint standardization group of ITU-T (International Telecommunication Union Telecommunication Standardization Sector) and ISO/IEC (International Organization for Standardization/International Electrotechnical Commission) for the purpose of further improving coding efficiency compared with MPEG-4 Part 10 (Advanced Video Coding, hereinafter called AVC) (see, for example, Non-Patent Literature 1).

In recent years, the resolution of image data as an object to be coded has become higher in such image coding systems. For example, when a VR (Virtual Reality) moving image is coded, a high-resolution image of 8 K×4 K or the like is coded so that a plane image in which a peripheral image when seen from a viewpoint position is developed on a plane is set as an object to be coded.

CITATION LIST

Non-Patent Literature

Non-Patent Literature 1: ITU-T, "SERIES H: AUDIOVISUAL AND MULTIMEDIA SYSTEMS Infrastructure of audiovisual services. Coding of moving video High efficiency video coding", ITU-T H.265 (V3), Apr. 29, 2015

DISCLOSURE OF THE INVENTION

Technical Problem

Since the high resolution of an image as an object to be coded results in an increase in coding amount, a further improvement in coding efficiency has been requested. However, in the case of conventional image coding systems, the existence of images having different spatial resolution has been allowed but the existence of images having different temporal resolution (frame rates) has not been allowed in pictures. For this reason, temporal resolution cannot be controlled for each partial region of pictures, which has caused the possibility of a reduction in coding efficiency.

The present disclosure has been made in view of the above circumstances and makes it possible to suppress a reduction in coding efficiency.

Solution to Problem

An image processing device according to an aspect of the present technology includes: a temporal resolution setting unit setting temporal resolution for each of partial regions of image data to be coded; and a coding unit coding the image data to generate a bit stream including information indicating the temporal resolution for each of the partial regions set by the temporal resolution setting unit.

The partial regions can be separately decodable tile sets.

The bit stream can include information related to the partial regions.

The information indicating the temporal resolution can include a temporal ID set for each of pictures of the image data and level information set for each of the partial regions.

The image data can be data of a plane image in which an omnidirectional image rendered in a spherical shape about a viewpoint is developed on a single plane.

The temporal resolution setting unit can make the temporal resolution higher at partial regions at positions closer to a center of the plane image in which the omnidirectional image is developed.

The image data can be data of a plane image in which plane images in six directions orthogonal to each other about a viewpoint are developed on a single plane.

The temporal resolution setting unit can make the temporal resolution of a plane image on a front side when seen from the viewpoint among the six directions higher than the temporal resolution of plane images in other directions.

The image processing device can further include: a partial region setting unit setting the partial regions, in which the temporal resolution setting unit can be configured to set temporal resolution of the respective partial regions set by the partial region setting unit.

The information indicating the temporal resolution can include a temporal ID set for each of the partial regions.

The coding unit can code a partial region included in a current picture with respect to the respective pictures of the image data on the basis of the temporal resolution for each of the partial regions set by the temporal resolution setting unit.

The bit stream can include information related to a method for complementing a region other than the partial regions of the pictures during the decoding.

The coding unit can generate a bit stream of the temporal resolution set by the temporal resolution setting unit for each of the partial regions.

An image processing method according to an aspect of the present technology includes: setting temporal resolution for each of partial regions of image data to be coded; and coding the image data to generate a bit stream including information indicating the temporal resolution for each of the set partial regions.

An image processing device according to another aspect of the present technology includes: an analysis unit analyzing information indicating temporal resolution for each of partial regions of image data, the information being included in a bit stream in which the image data is coded.

The image processing device can further include: a data extraction unit extracting data of a desired partial region from the bit stream in accordance with an analysis result of the analysis unit; and a bit stream generation unit generating a bit stream including the data of the partial region extracted by the data extraction unit.

The image processing device can further include: a decoding unit decoding coded data of a desired partial region among coded data of the image data included in the bit stream in accordance with an analysis result of the analysis unit.

The decoding unit can decode coded data of a partial region included in a current picture with respect to the respective pictures of image data on the basis of the temporal resolution for each of the partial regions analyzed by the analysis unit.

The decoding unit can complement the region other than the partial region of the current picture using a reproduction of an image of another picture different from the current picture, an average of images of a plurality of other pictures different from the current picture, and a newly generated image.

An image processing method according to another aspect of the present technology includes: analyzing information indicating temporal resolution for each of partial regions of image data, the information being included in a bit stream in which the image data is coded.

The image processing device and the image processing method according to an aspect of the present technology set temporal resolution for each of partial regions of image data to be coded and code the image data to generate a bit stream including information indicating the temporal resolution for each of the set partial regions.

The image processing device and the image processing method analyze information indicating temporal resolution for each of partial regions of image data, the information being included in a bit stream in which the image data is coded.

Advantageous Effects of Invention

According to the present disclosure, images can be processed. Particularly, a reduction in coding efficiency can be suppressed.

BRIEF DESCRIPTION OF DRAWINGS

FIGS. 24A and 24B are diagrams showing examples of a syntax and a semantics, respectively.

MODE(S) FOR CARRYING OUT THE INVENTION

Hereinafter, modes (hereinafter called embodiments) for carrying out the present disclosure will be described. Note that the description will be given in the following order.

1. High Coding Efficiency Using Temporal Efficiency
2. First Embodiment (Use MCTS SEI of HEVC)
3. Second Embodiment (Temporal ID for Each Partial Region)
4. Third Embodiment (Generate Bit Stream for Each Partial Region)
5. Other 1. High Coding Efficiency Using Temporal Efficiency Conventionally, the standardization of a coding system called HEVC (High Efficiency Video Coding) has been advanced by JCTVC (Joint Collaboration Team—Video Coding), the joint standardization group of ITU-T (International Telecommunication Union Telecommunication Standardization Sector) and ISO/IEC (International Organization for Standardization/International Electrotechnical Commission) for the purpose of further improving coding efficiency compared with MPEG-4 Part 10 (Advanced Video Coding, hereinafter called AVC).

In recent, years, the resolution of image data as an object to be coded has become higher in such image coding systems. For example, when a VR Reality) moving image is coded, a high-resolution image of 8 K×4 K or the like is coded so that a plane image in which a peripheral image when seen from a viewpoint position is developed on a plane is set as an object to be coded.

Since the high resolution of an image as an object to be coded results in an increase in coding amount, a further improvement in coding efficiency has been requested. For example, although there is a method for improving coding efficiency in which the spatial resolution of a region having low importance is reduced to cut off an information amount, consideration has to be given to influence on subjective image quality and the information amount cannot be unlimitedly cut off. Therefore, the method is not necessarily appropriate.

An information amount of a moving image can be controlled using temporal resolution as well. The temporal resolution indicates a rate (also called a frame rate) in a temporal direction. For example, a reduction in temporal resolution (a reduction in the number of frames per unit time) can results in a reduction in information amount and an improvement in coding efficiency. However, in the case of conventional image coding systems, the existence of images having different spatial resolution has been allowed but the existence of images having different temporal resolution (frame rates) has not been allowed in pictures.

Figure 1:
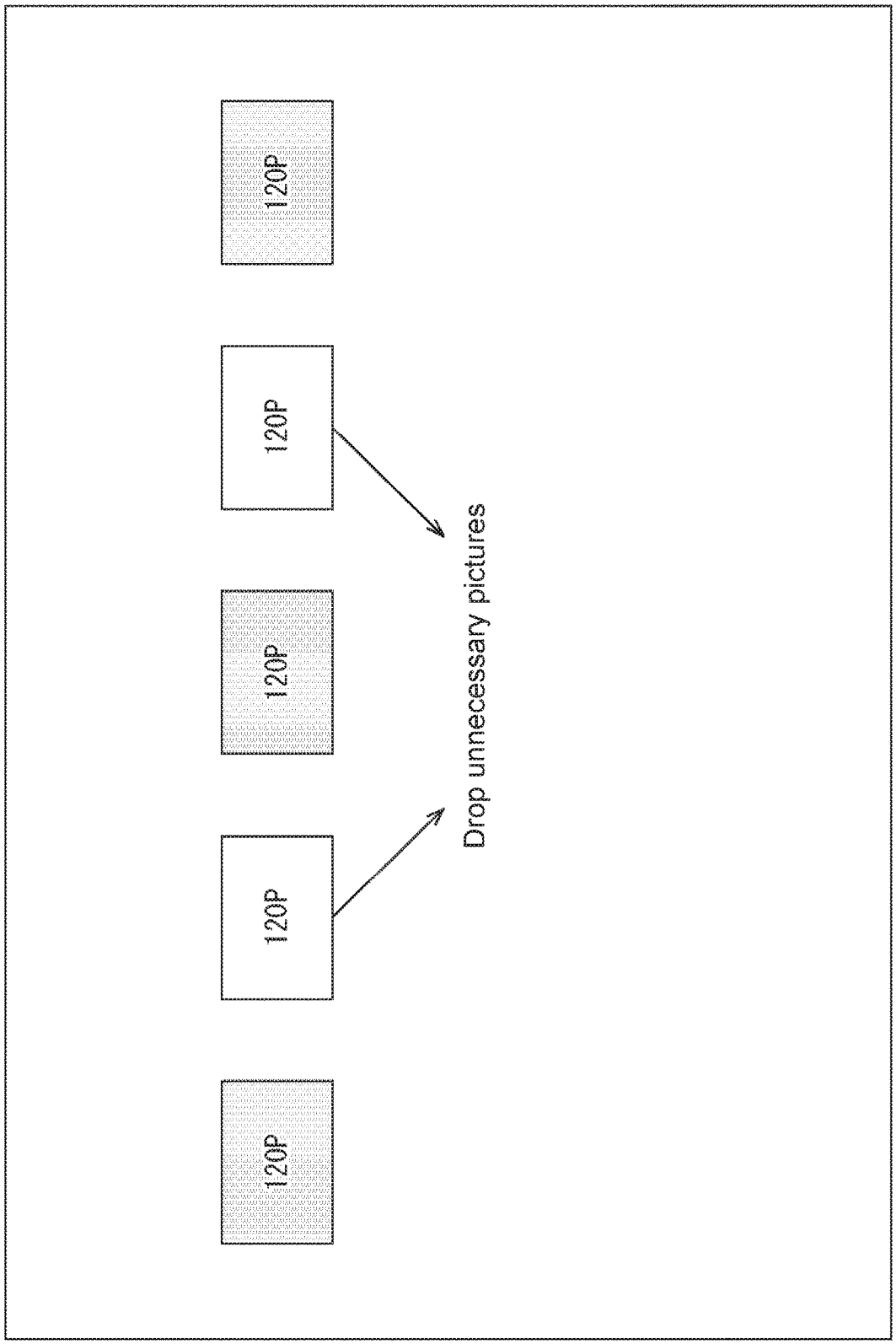
FIG. 1 is a diagram describing an example of a controlled state of temporal resolution.

Therefore, it has been possible to delete each picture to reduce the frame rate of the whole picture like an example shown in FIG. 1 but has not beer. Possible to control temporal resolution for some of the regions of the pictures. For this reason, it has been difficult to improve coding efficiency while suppressing a reduction in subject image quality, which has caused the possibility of a reduction in coding efficiency.

In view of this, the setting of temporal resolution for each partial region of image data to be coded and the generation of a bit stream including information indicating the temporal resolution for each partial region are performed. Thus, since information amounts of pictures can be partially controlled using the temporal resolution, coding can be performed more efficiently.

2. First Embodiment

<Image Processing System>

Figure 2:
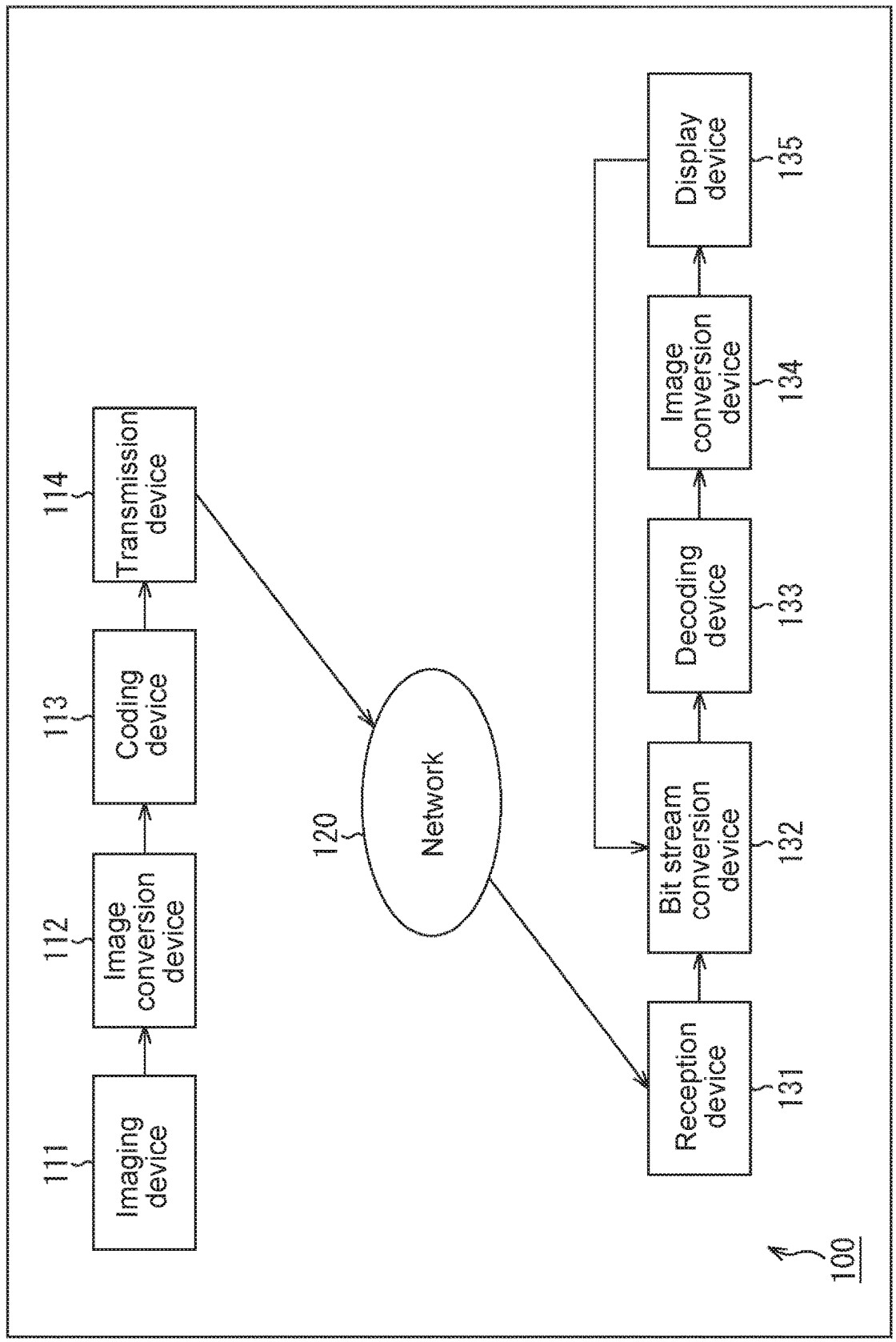
FIG. 2 is a block diagram showing a main configuration example of an image processing system.

FIG. 2 is a block diagram showing an example of the configurations of an image processing system that is a mode of an image processing system to which the present technology is applied. An image processing system 100 shown in FIG. 2 is a system in which the image data of a so-called VR moving image is coded and transmitted as a bit stream and the bit stream is decoded and displayed at a transmitted destination.

As shown in FIG. 2, the image processing system 100 has an imaging device 111, an image conversion device 112, a coding device 113, a transmission device 114, a reception device 131, a bit stream conversion device 132, a decoding device 133, an image conversion device 134, and a display device 135.

The imaging device 111 performs processing related to the capturing of an image of a subject. For example, the imaging device 111 captures an image of a subject and supplies the captured image to the image conversion device 112. The image conversion device 112 performs processing related to the conversion of the captured image. For example, the image conversion device 112 performs the rendering or the like of the captured image supplied from the imaging device 111 to generate a VR moving image. Further, the image conversion device 112 develops the VR moving image on a plane to generate a plane image for coding, and supplies the plane image to the coding device 113.

The coding device 113 performs processing related to the coding of an image. For example, the coding device 113 codes the plane image supplied from the image conversion device 112 to generate a bit stream and supplies the bit stream to the transmission device 114. The transmission device 114 performs processing related to the transmission of a bit stream. For example, the transmission device 114 supplies the bit stream supplied from the coding device 113 to the reception device 131 via a network 120.

The network 120 is a transmission medium. The network 120 is constituted by, for example, an arbitrary communication network. For example, the network 120 may be a wired communication network or a wireless communication network, or may be constituted by both the wired communication network and the wireless communication network. Further, the network 120 may be constituted by one communication network or a plurality of communication networks. For example, the network 120 may include a communication network or a communication path having an arbitrary communication standard such as a wide-area communication network for wireless mobile bodies such as the Internet, a public telephone line network, and so-called 3G line or 4G line, a wireless communication network for performing communication compliant with WAN (Wide Area Network), LAN (Local Area Network) and Bluetooth (™) standard, a communication path for short-distance wireless communication such as NFC (Near Field Communication), a communication path for infrared communication, and a wired communication network compliant with a standard such as HDMI (™) (High-Definition Multimedia interface) and USB (Universal Serial Bus). The transmission device 114 and the reception device 131 are connected to the network 120 and can give and receive the bit stream via the network 120.

The reception device 131 performs processing related to the reception of a bit stream. For example, the reception device 131 receives the bit stream supplied from the transmission device 114 via the network 120 and supplies the received bit stream to the bit stream conversion device 132. The bit stream conversion device 132 performs processing related to the conversion of a bit stream. For example, the bit stream conversion device 132 extracts the data of partial regions within a user's view from the bit stream supplied from the reception device 131 in response to a request from the display device 135, generates the bit stream of the partial regions, and supplies the generated bit stream to the decoding device 133.

The decoding device 133 performs processing related to the decoding of a bit stream. For example, the decoding device 133 decodes the bit stream supplied from the bit stream conversion device 132 (in a decoding system corresponding to the coding system of the coding device 113). The decoding device 133 supplies the data of a plane image obtained by decoding the bit stream to the image conversion device 134. The image conversion device 134 performs processing related to the conversion of an image. For example, the image conversion device 134 performs the rendering of the plane image supplied from the decoding device 133 on a three-dimensional space to generate an image within a user's view in a virtual reality space and supplies the generated image to the display device 135.

The display device 135 performs processing related to display. For example, the display device 135 displays the image within the user's view supplied from the image conversion device 134 to offer a virtual reality space to a user. Further, for example, the display device 135 specifies a position, a direction, or the like of a user's view in a virtual reality space according to a user's input, a sensing result, or the like, and requests the bit stream conversion device 132 to provide an image within the view.

<Devices and VR Moving Image>

Next, the devices constituting the above image processing system 100, their operations, or the like will be described in further detail.

Figure 3:
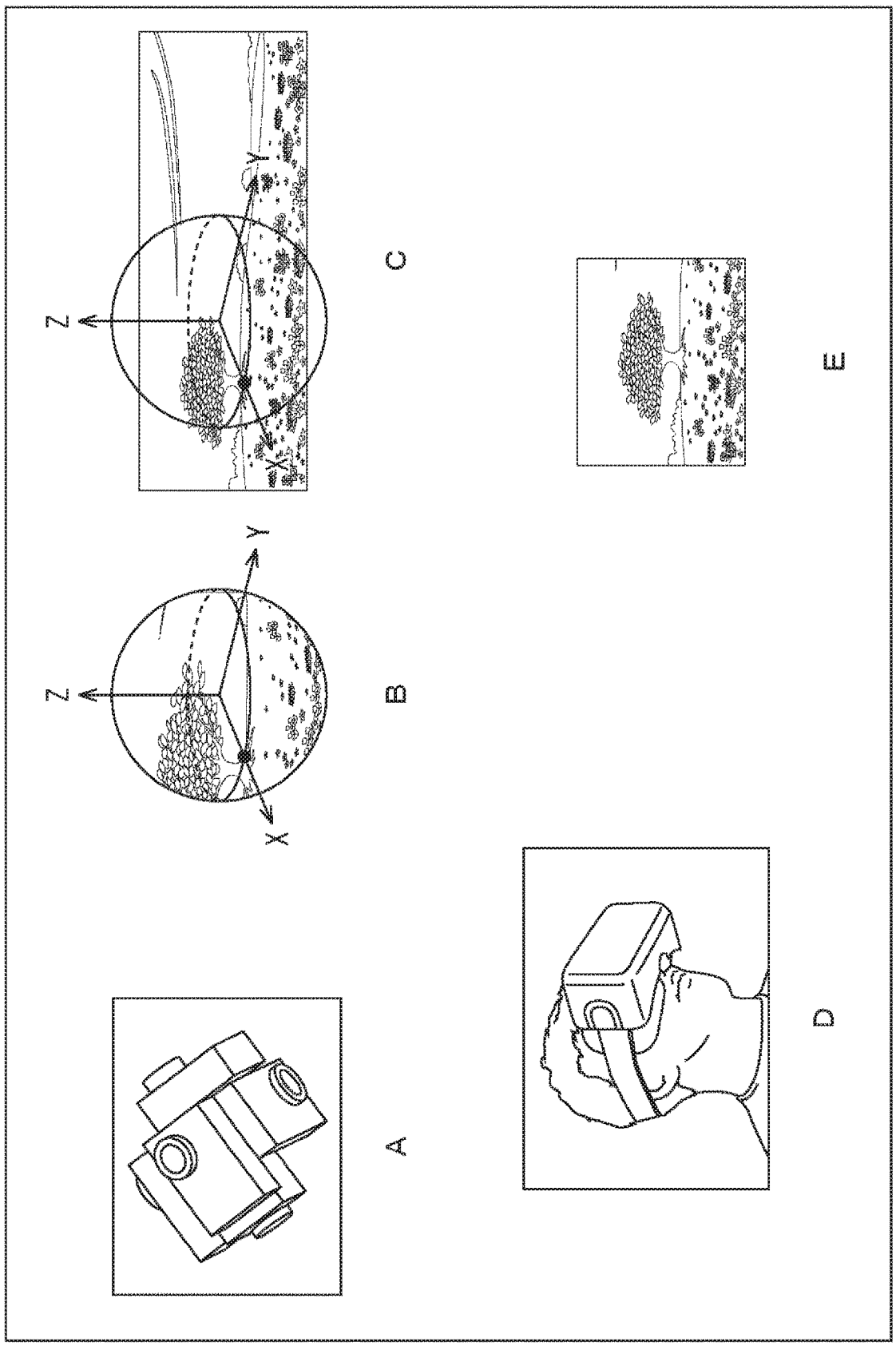
FIGS. 3A to 3E are diagrams each describing an example of a used state of a VR moving image.

The imaging device 111 may be any device but has, for example, a plurality of imaging units (cameras) that captures images in directions different from each other as shown in, for example, FIG. 3A to capture images of its periphery. The image conversion device 112 performs the rendering of the groups of the images captured by the imaging device 111 to generate an image around the imaging device 111. For example, the image conversion device 112 performs the rendering of the groups of the captured images in a spherical shape about a viewpoint (that is, the position of the imaging device 111) to generate an image in all directions (hereinafter also called an omnidirectional image) based on the viewpoint as shown in, for example, FIG. 3B. In the example of FIG. 3B, the center of the omnidirectional image having the spherical shape corresponds to the original point of an XYZ coordinate, and the original point indicates the position of the viewpoint. Note that the omnidirectional image will also be called a VR image (VR moving image) since the omnidirectional image is displayed as an image on a virtual reality space in the image processing system 100.

Further, since the coding device 113 and the decoding device 133 regard a plane image as an object to be processed, the image conversion device 112 develops the VR moving image (omnidirectional image) on a plane to generate a plane image as shown in FIG. 3C. The plane image is coded by the coding device 113, transmitted as a bit stream from the transmission device 114 to the reception device 131, and decoded by the decoding device 133. However, the display device 135 displays only an image within a user's view. Therefore, the bit stream conversion device 132 extracts data within the user's view from the bit stream to generate the bit stream of an image within the user's view.

The configuration of the display device 135 is arbitrarily. However, the display device 135 is constituted by, for example, an eyeglass-type device as shown in FIG. 3D and has display units that display images for respective eyes near the right and left eyes of a user wearing the device. The bit stream supplied from the bit stream conversion device 132 as described above is decoded by the decoding device 133, an obtained decoded image is rendered on a three-dimensional space by the image conversion device 134, and the image is displayed on the display unit by the display device 135. Thus, the user wearing the display device 135 can watch an image within the user's view on the virtual real space. That is, the image displayed on a the display device 135 is a part of the plane image (FIG. 3C) in which the omnidirectional image is developed as shown in, for example, FIG. 3E.

Note that the display device 135 detects a change in direction of a visual line (a change in direction of a face or the like) by the user through a sensor. The display device 135 estimates a user's view on the basis of the detection result and notifies the bit stream conversion device 132 of the estimated user's view. The bit stream conversion device 132 extracts an image within the user's view on the basis of the notification.

<Unbalanced Importance Inside Pictures>

Figure 4:
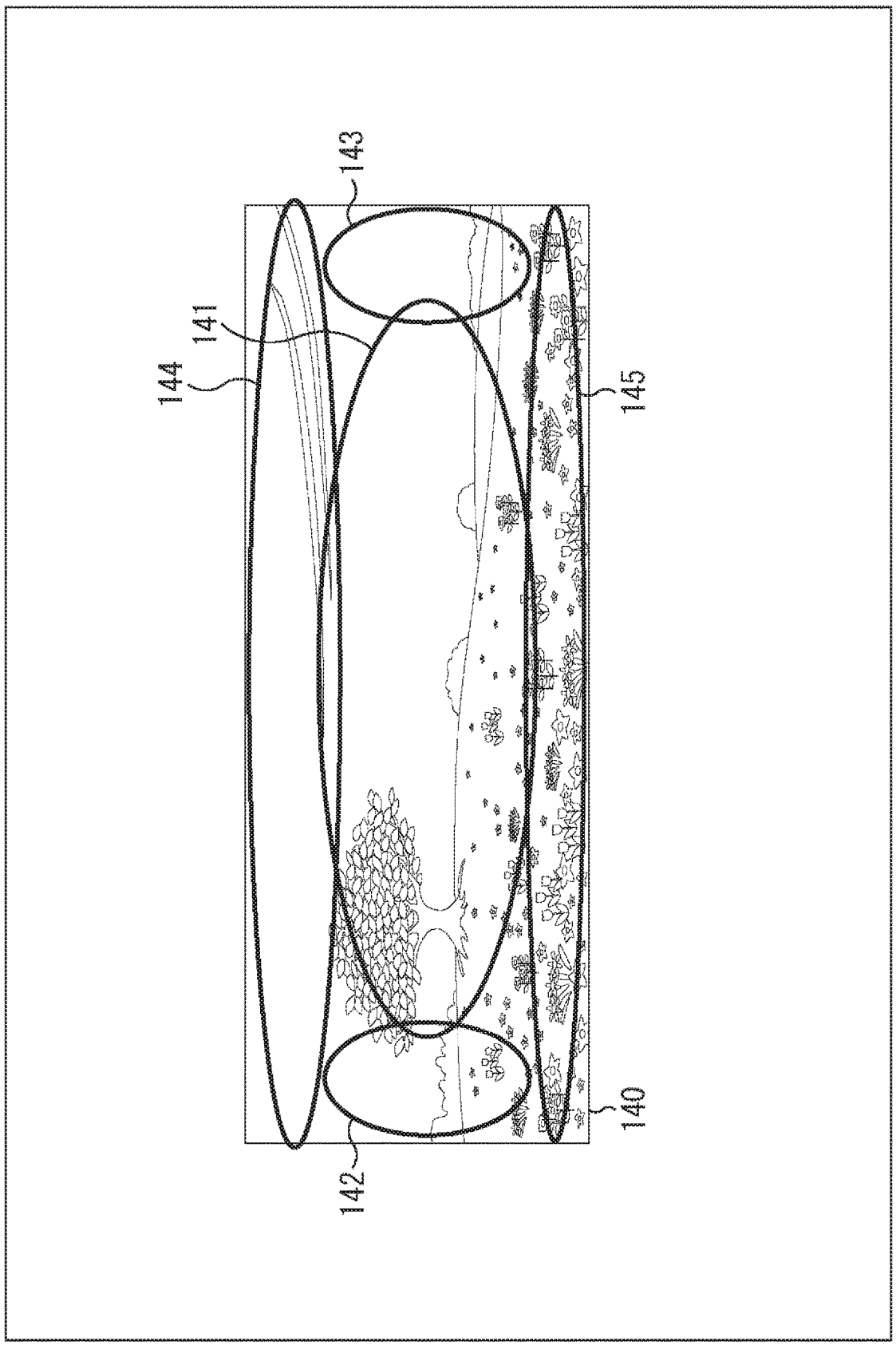
FIG. 4 is a diagram describing a distribution example of importance in a spatial direction.

In the image processing system 100 described above, a plane image as an object to be coded by the coding device 113 in which a VR moving image is developed has generally more important parts and less important parts (importance is unbalanced). For example, in a plane image 140 of FIG. 4, a noticeable object is likely to exist in regions 141 to 143 near the center than an upper-end region 144 or a lower-end region 145 in a vertical direction, and thus the regions 141 to 143 are likely to become important. Further, a lower direction corresponds to a user's feet in many cases. A noticeable object is generally likely to exist in the upper-end region 144 than the lower-end region 145, and thus the upper-end region 144 is likely to become important. Further, in a right and left direction, a noticeable object is generally likely to exist in the region 141 near the center than a left-end region 142 or a right-end region 143, and thus the region 141 is likely to become important.

Figure 5:
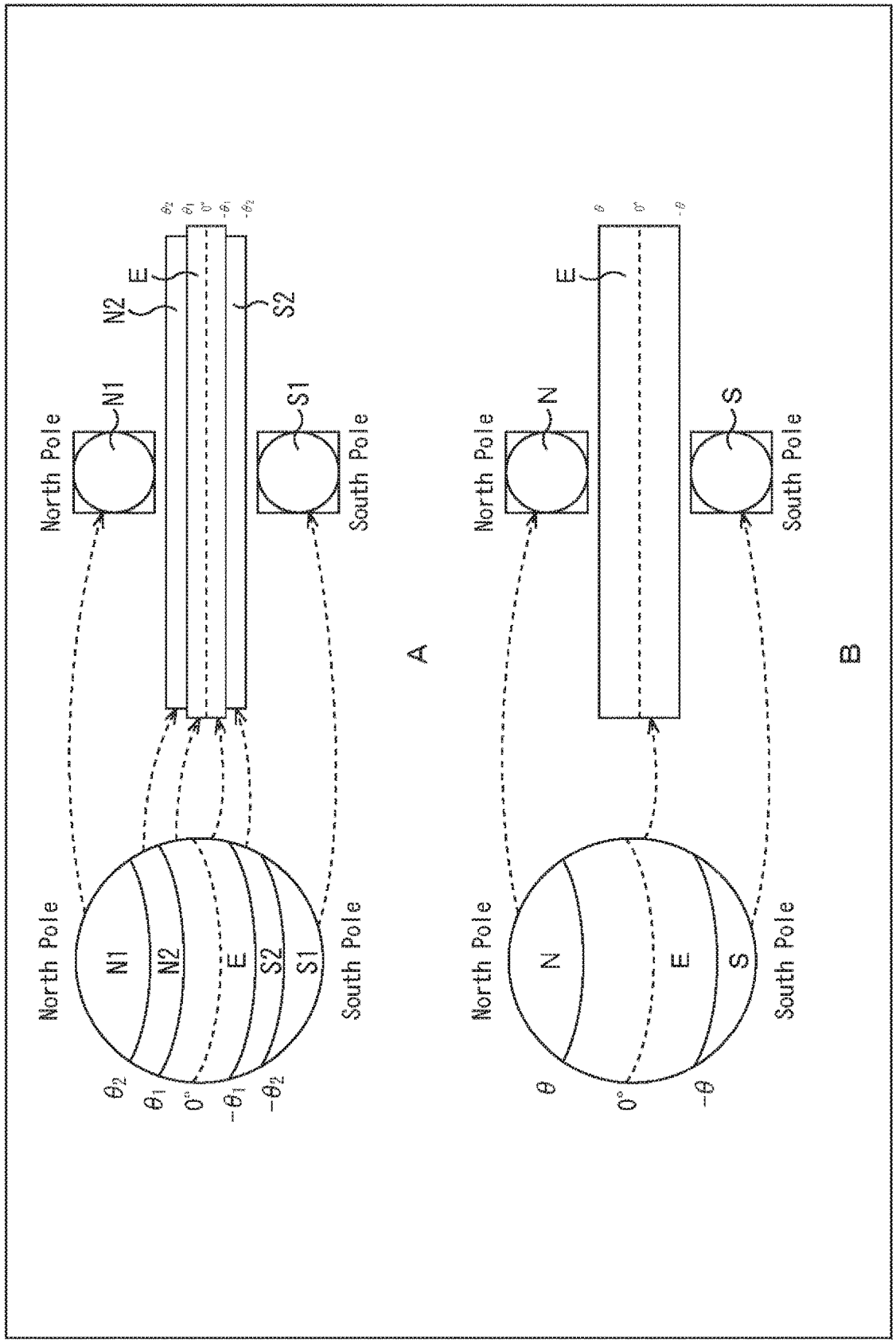
FIGS. 5A and 5B are diagrams each describing an example of a developed state.

In addition, a plane image to be coded is one in which an omnidirectional image is developed as described above. Generally, a plane image to be coded is developed by a method as shown in FIG. 5A or 5B. Accordingly, regions near the upper end and the lower end of a plane image after being developed are formed by images of small regions near the poles of an omnidirectional image (N1 and S1 in FIG. 5A or N and S in FIG. 5B). Accordingly, an information amount per unit area becomes negligent, and importance is likely to reduce.

<2-1. Coding>

<Setting of Temporal Resolution for Each Region>

Therefore, in order to suppress a reduction in coding efficiency according to such tendencies of importance, the coding device 113 sets temporal resolution for each partial region of image data to be coded and codes the image data to generate a bit stream including information indicating the set temporal resolution for each partial region.

Image data to be coded by the coding device 113 may be the data of a plane image in which an omnidirectional image rendered in a spherical shape about a viewpoint is developed on a single plane. In this case, partial regions at positions closer to the center of the plane image in which the omnidirectional image is developed may be set to have higher temporal resolution. Further, in the vertical direction of the plane image in which the omnidirectional image is developed, partial regions at positions closer to the center may be set to have higher temporal resolution. In addition, partial regions near the upper end of the plane image in which the omnidirectional image is developed may be set to have higher temporal resolution than that of partial regions near the lower end of the plane image. Thus, it becomes possible to perform information amount control depending on unbalanced importance as described above such as the reduction of temporal resolution of less important parts. Accordingly, a reduction in coding efficiency can be suppressed simultaneously with the suppression of a reduction in subjective image quality.

Figure 6:
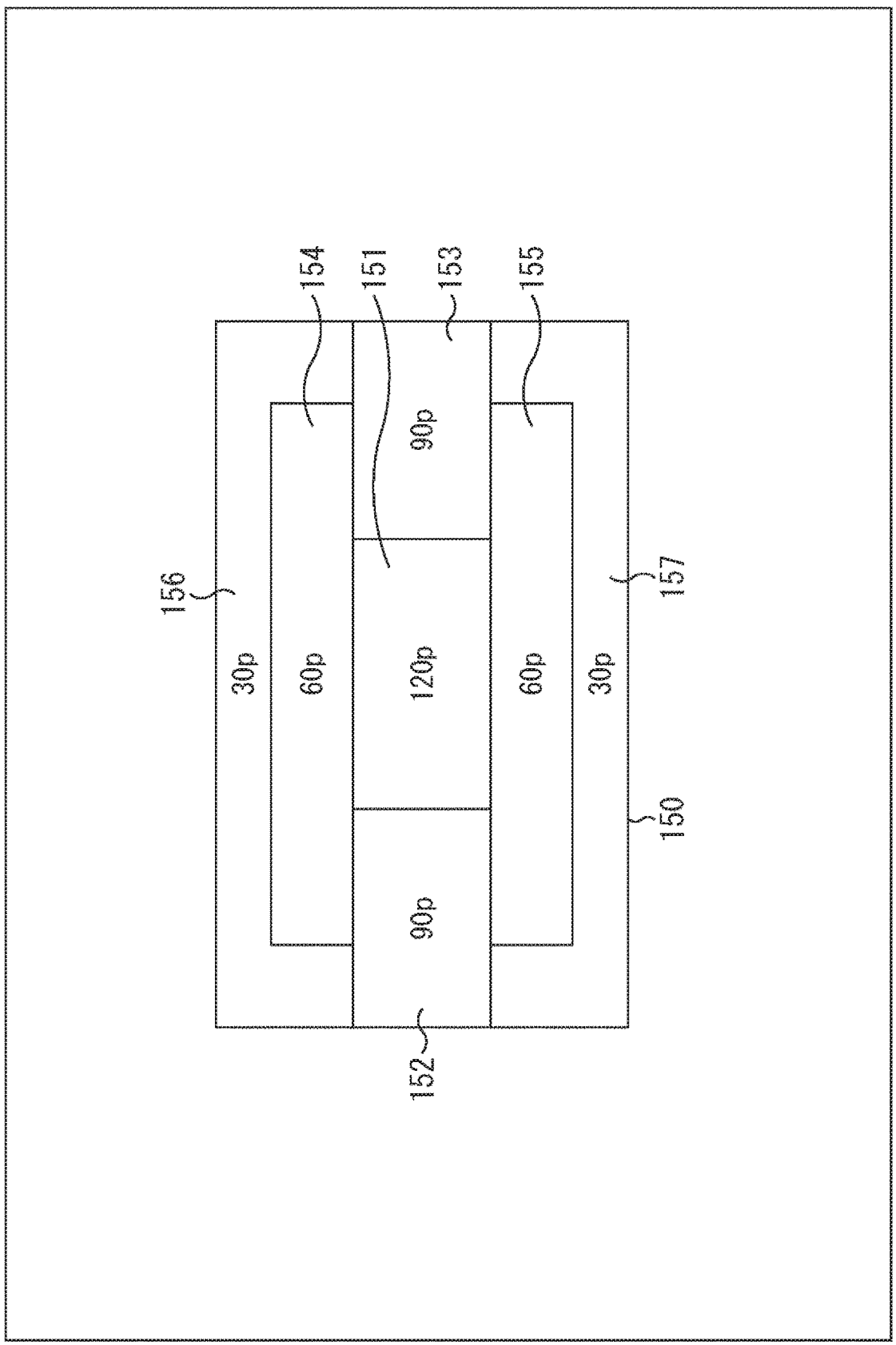
FIG. 6 is a diagram describing an example of an allocated state of temporal resolution in respective partial regions.

For example, a plane image 150 shown in FIG. 6 may be so configured that a region 151 near the center has a temporal resolution (frame rate) of 120 p (120 frames per second under a progressive system), left and right regions 152 and 153 have a temporal resolution (frame rate) of 90 p (90 frames per second under the progressive system), upper and lower regions 154 and 155 have a temporal resolution (frame rate) of 60 p (60 frames per second under the progressive system), and surrounding regions 156 and 157 have a temporal resolution (frame rate) of 30 p (30 frames per second under the progressive system).

Figure 7:
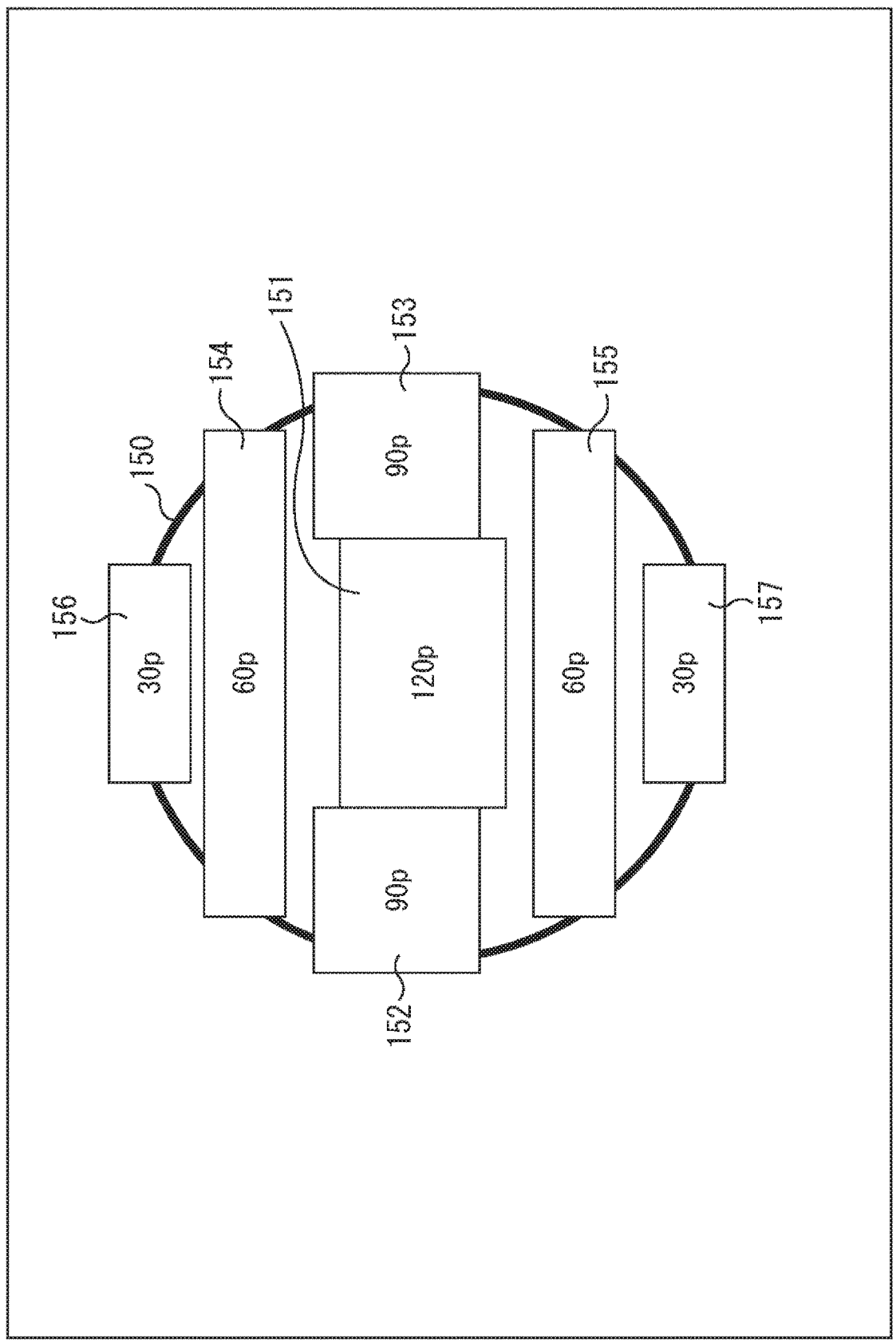
FIG. 7 is a diagram describing an example of an allocated state of temporal resolution in respective partial regions.

FIG. 7 shows the distribution of these regions in an omnidirectional image. As shown in FIG. 7, the regions generally less important and positioned closer to the upper and lower ends of the omnidirectional image are set to have lower temporal resolution, and the regions important and positioned closer to the center are set to have higher temporal resolution. Accordingly, a reduction in coding efficiency can be suppressed simultaneously with the suppression of a reduction in subjective image quality.

<Setting of Partial Regions>

Figure 8:
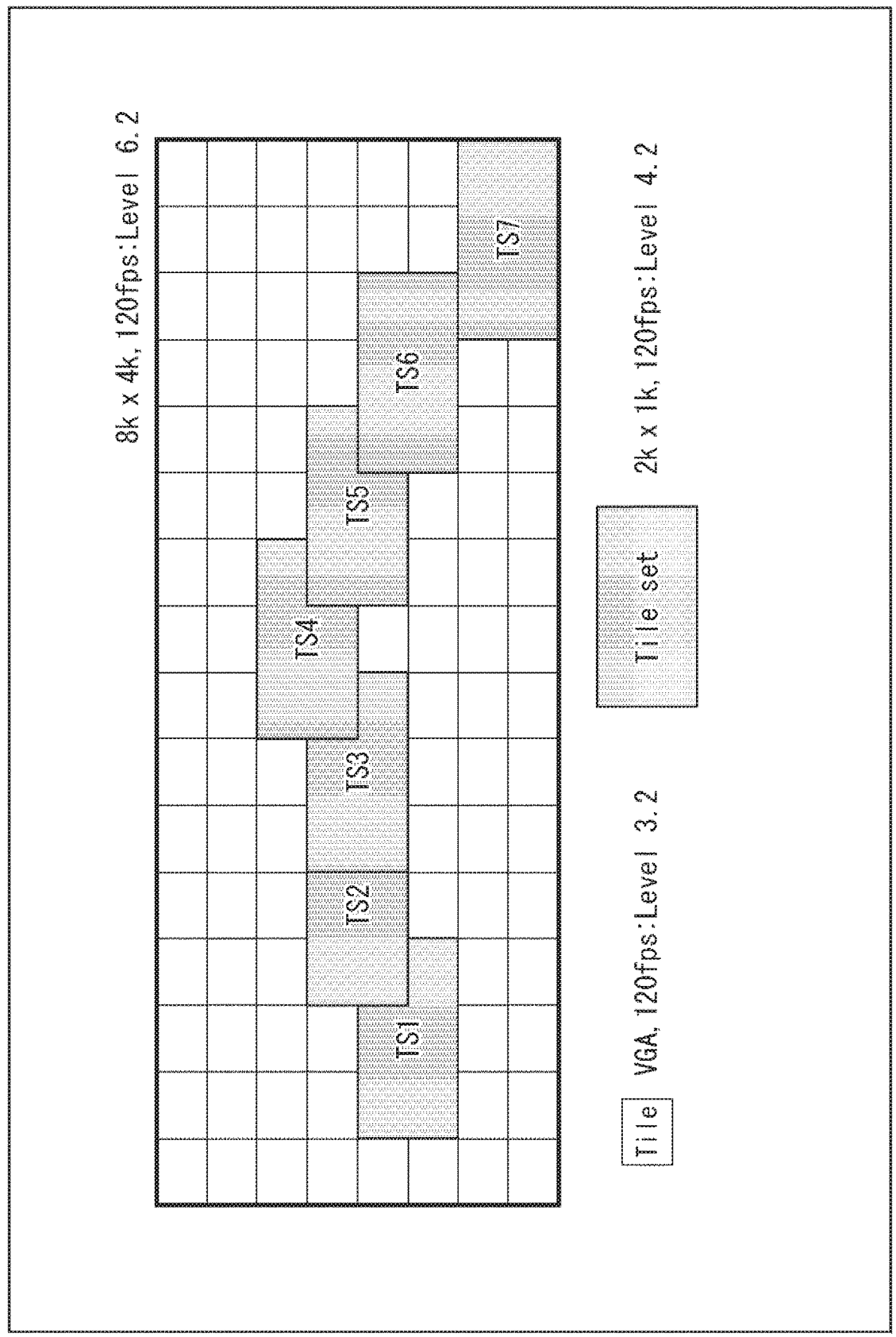
FIG. 8 is a diagram describing tile sets.

The regions (partial regions) as shown in FIG. 6 or 7 may be set as tile sets using the tile structure of HEVC (High Efficiency Video Coding). The tile sets are separately decodable regions managed by MCTS SEI (Motion constrained tile set Supplemental Enhancement Information). For example, as shown in FIG. 8, the coded data of a tile set TS1 of a frame is decoded, the coded data of a tile set TS2 of the next frame is decoded, the coded data of a tile set TS3 of the next frame is decoded, the coded data of a tile set TS4 of the next frame is decoded, the coded data of a tile set TS5 of the next frame is decoded, the coded data of a tile set TS6 of the next frame is decoded, and the coded data of a tile set TS7 of the next frame is decoded for a moving image having a frame size (resolution) of 8 K×4 K, whereby a moving image having the tile sets TS1 to TS7 as frames and having a frame size of 2 K×1 K can be obtained.

That is, the information of other regions is unnecessary for decoding the coded data of the tile sets. Therefore, the setting of such tile sets as partial regions for controlling temporal resolution further facilitates the setting of the temporal resolution of the regions separately from other regions.

<Setting of Temporal Resolution>

Figure 9:
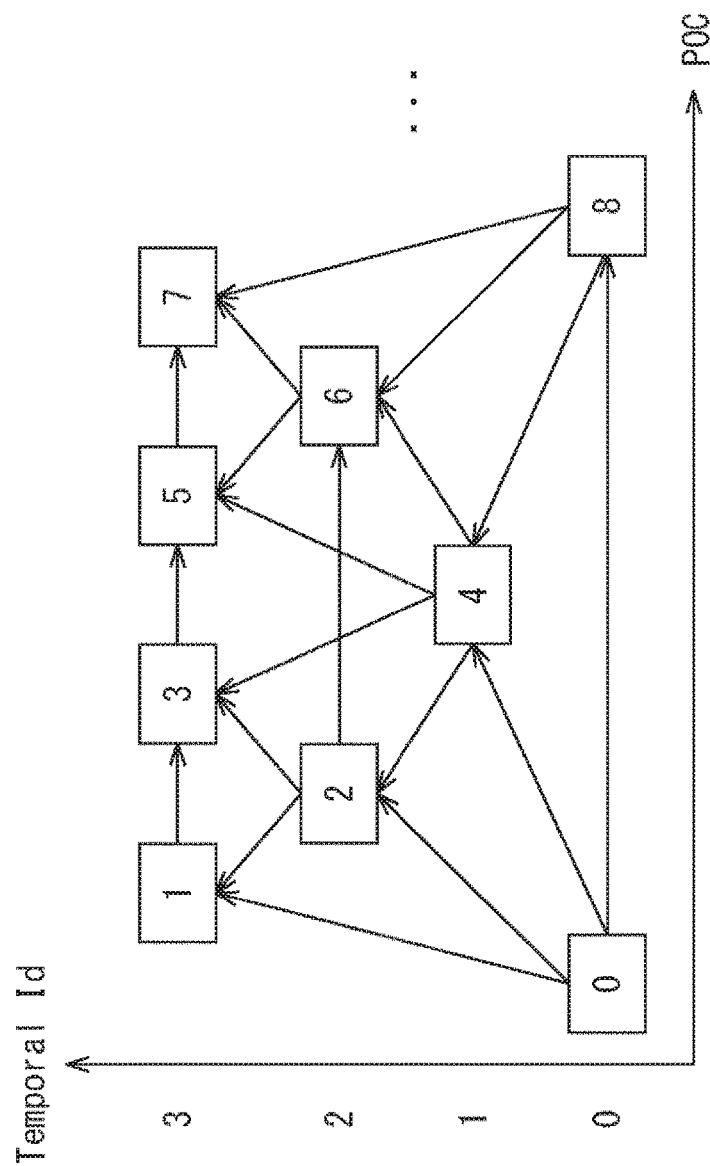
FIG. 9 is a diagram describing temporal IDs.

In the HEVC, a temporal scalability function is prepared in which temporal IDs (also called Tids or temporal identifiers) are described in a bit stream to allow an output with corresponding temporal resolution. As shown in FIG. 9, the respective pictures of a moving image to be coded can be hierarchized and coded. In FIG. 9, respective squares indicate frames, and numbers in the frames indicate POCs (Picture Order Counts). Further, the arrows between the frames indicate reference relationships. Temporal IDs indicate the identification information of respective hierarchies. In the case of FIG. 9, the frames of POCs 0 to 8 are divided into the four hierarchies of temporal IDs 0 to 3 to be coded. Note that a hierarchy structure for temporal scalability is arbitrarily and is not limited to the example of FIG. 9.

Thus, decoding without breaking up the reference relationships can be performed only by decoding the pictures of hierarchies including the hierarchy of a designated temporal ID. Therefore, a decoded image having temporal resolution corresponding to the temporal ID can be more easily obtained. That is, the temporal resolution (frame rate) of the decoded image can be more easily controlled.

However, since temporal IDs are set for respective pictures, the temporal resolution of partial regions cannot be set by the temporal IDs. Therefore, level information is set with respect to respective partial regions. The level information indicates the level of a profile necessary for performing decoding and stipulates the ability of a decoder or the complexity of a bit stream. More specifically, the level information stipulates the resolution of an image, a bit rate (or a frame rate), or the like.

Figure 10:
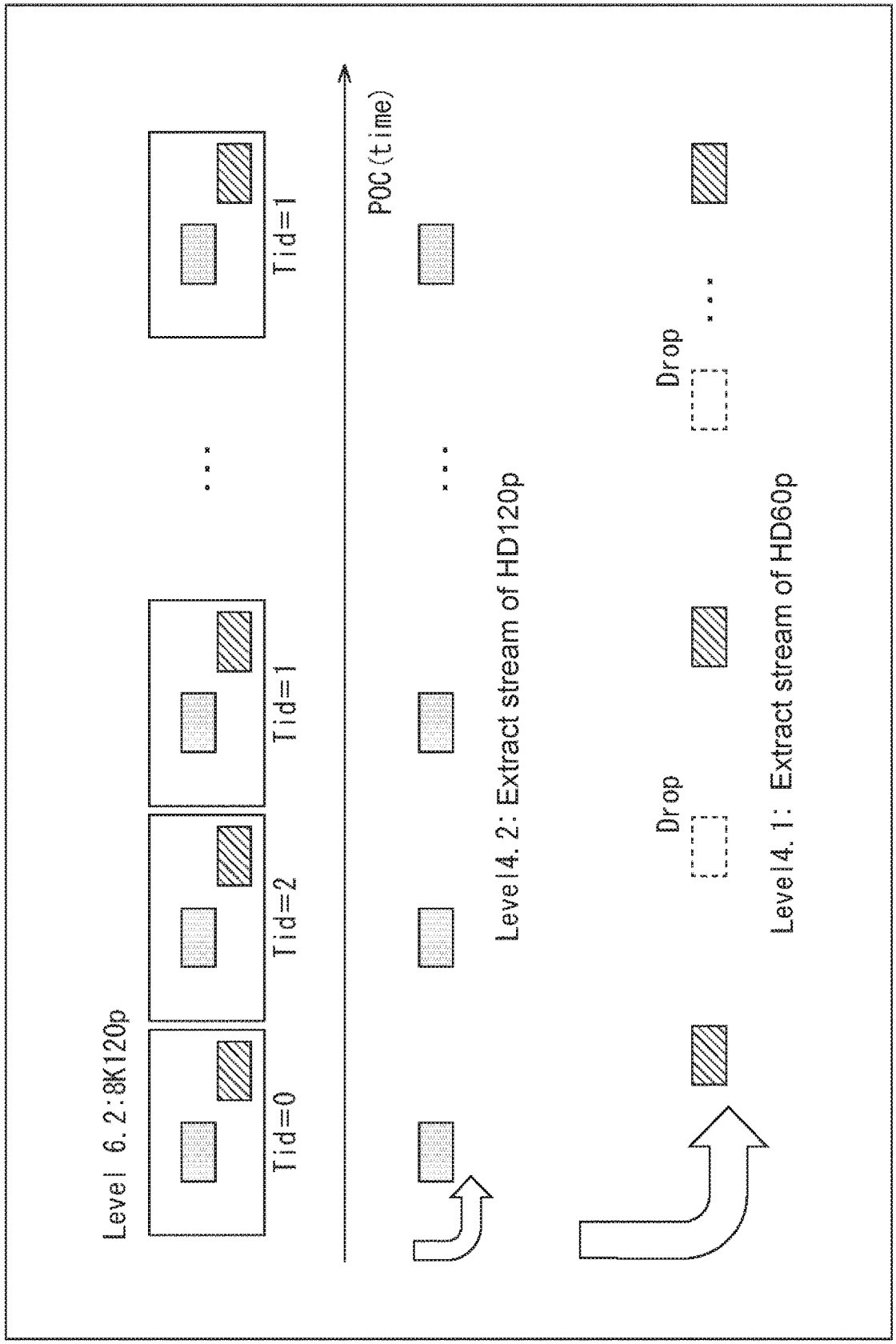
FIG. 10 is a diagram describing an example of an extracted state of partial regions.

By setting such level information with respect to partial regions for controlling temporal resolution, that is, tile sets (separately decodable regions), it becomes possible to set temporal resolution with respect to the partial regions. For example, as shown in FIG. 10, when tile sets (HD 120 p) having a level of 4.2 (Level=4.2) are decoded in a moving image (8K 120 p) having a level of 6.2 (Level=6.2) with respect to the whole frame, the data of the tile sets of respective frames is decoded. Further, for example, when tile sets ((HD 60 p) having a level of 4.1 (Level=4.1) are decoded, the data of the tile sets is decoded per two frames (every other frame).

Then, the use of the temporal scalability function as described above further facilitates the control of temporal resolution. For example, a temporal ID corresponding to temporal resolution indicated by the level information of a tile set is designated when the tile set is decoded, whereby a decoded image of the tile set can be obtained from the frames of hierarchies including the hierarchy of the temporal ID. That is, the decoded image of the tile set can be obtained by the temporal resolution indicated by the level information.

Figure 11:
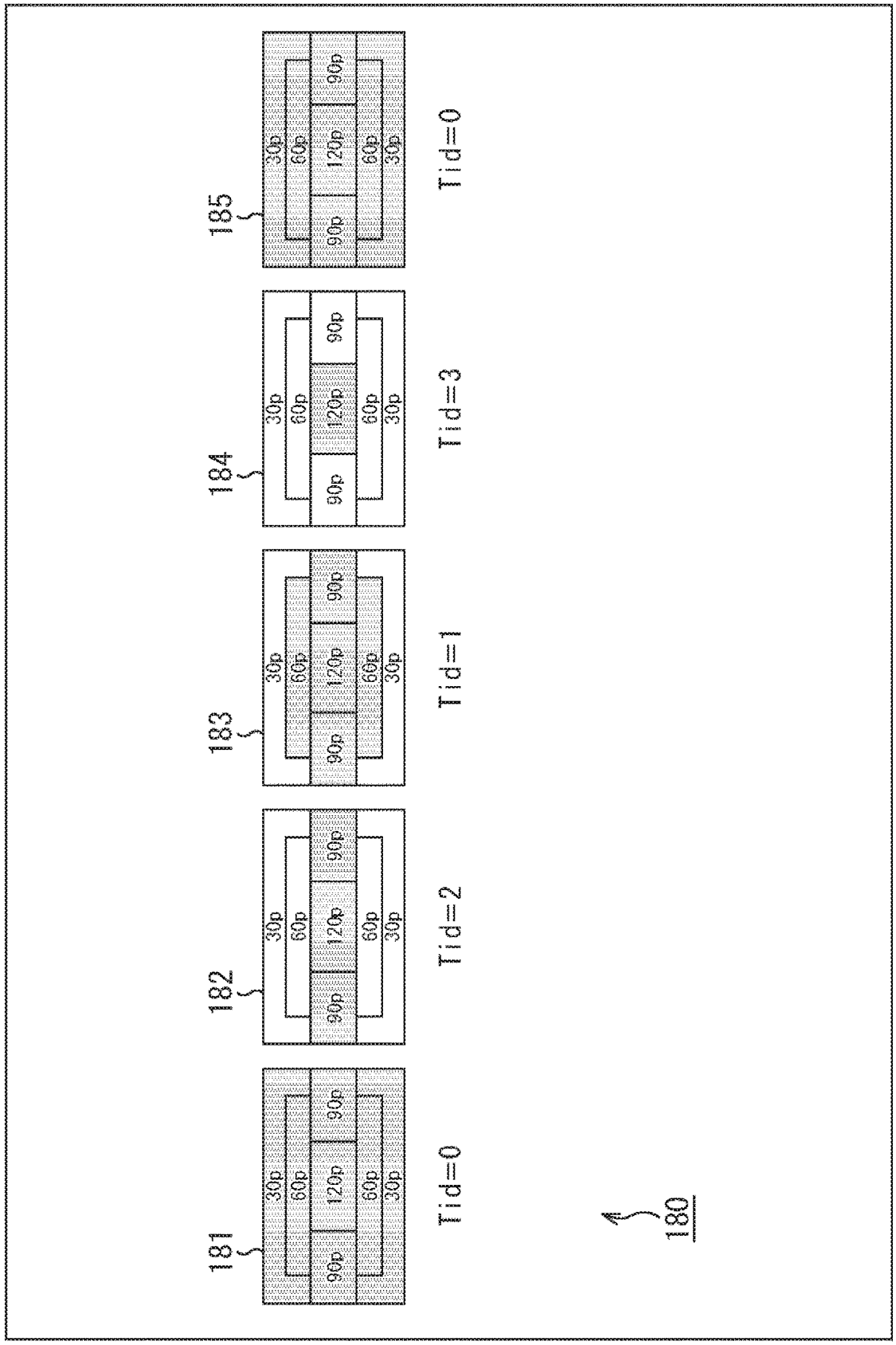
FIG. 11 is a diagram showing an example of a bit stream.

For example, in a bit stream 180 shown in FIG. 11, it is assumed that temporal resolution (frame rates) is set in the respective partial regions of frames 181 to 185 as level information. Further, it is assumed that temporal IDs (Tids) are set with respect to the respective frames 181 to 185 as shown in FIG. 11. Note that the bit stream in this case has a hierarchical structure different from that of the example of FIG. 9.

In this case, the data of a region in which 120 p is set as level information is, for example, obtained from each of the frames 181 to 185. That is, in this case, the frames of the hierarchies of temporal IDs including the temporal ID (Tid=3) corresponding to 120 p are decoded. Further, the data of a region in which 90 p is set is, for example, obtained from each of the frames 181 to 183 and the frame 185. That is, in this case, the frames of the hierarchies of temporal IDs including the temporal ID (Tid=2) corresponding to 90 p are decoded. In addition, the data of a region in which 60 p is set is, for example, obtained from each of the frames 181, 183, and 185. That is, in this case, the frames of the hierarchies of temporal IDs including the temporal ID (Tid=1) corresponding to 60 p are decoded. In addition, the data of a region in which 30 p is set is, for example, obtained from the frames 181 and 185. That is, in this case, the frame of the hierarchy of the temporal ID (Tid=0) corresponding to 30 p is decoded. That is, the tile sets displayed in gray of FIG. 11 are obtained from the respective frames of the bit stream 180.

Using the tile sets of the HEVC, temporal scalability (temporal IDs), and level information as described above, a reduction in coding efficiency can be more easily suppressed simultaneously with the suppression of a reduction in subjective image quality.

<Configurations of Coding Device>

Figure 12:
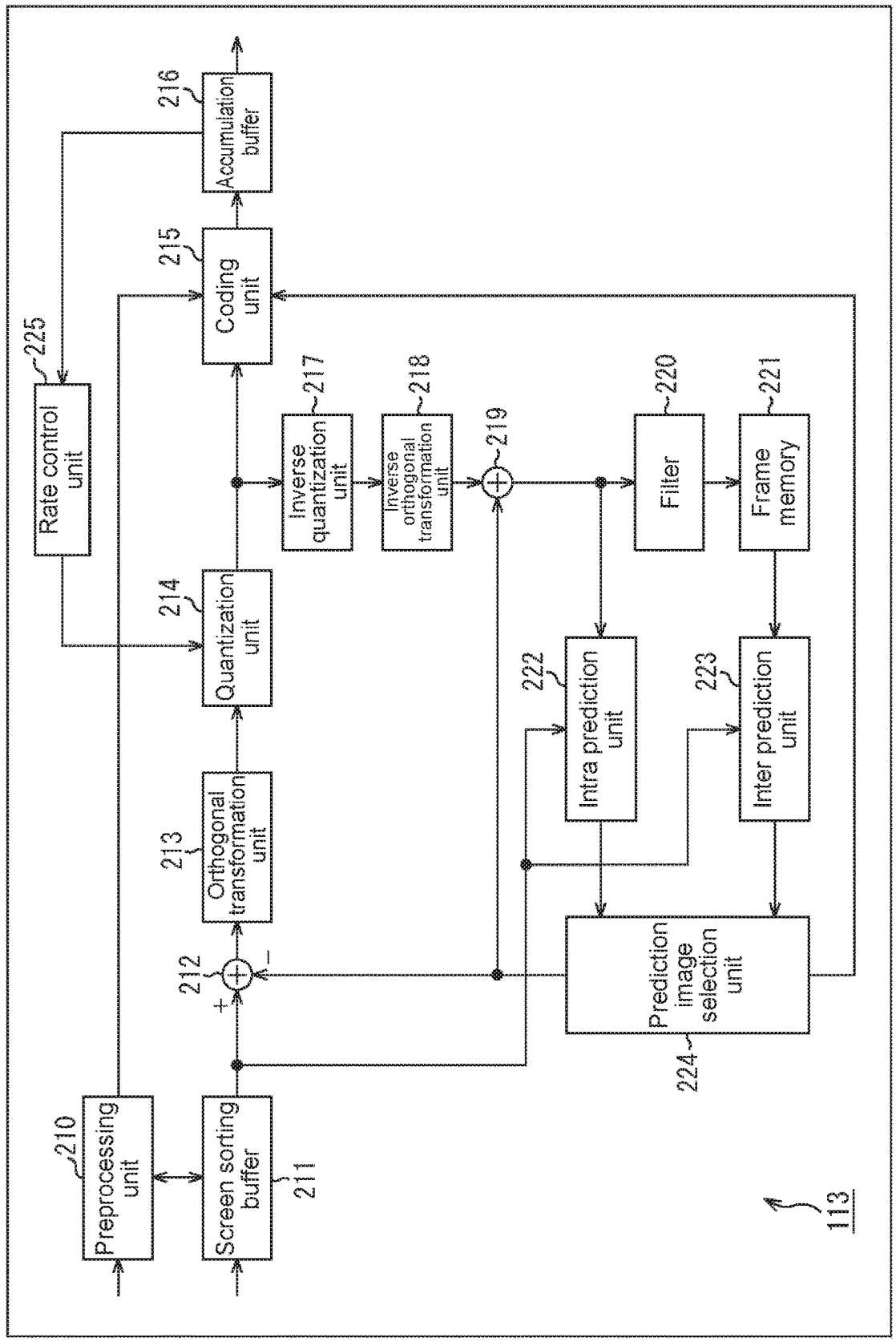
FIG. 12 is a block diagram showing a main configuration example of a coding device.

FIG. 12 is a block diagram showing a main configuration example of the coding device 113 that is a mode of an image processing device to which the present technology is applied. The coding device 113 codes an image input with a HEVC coding system or a coding system compliant with the HEVC coding system. As shown in FIG. 12, the coding device 113 has a preprocessing unit 210, a screen sorting buffer 211, a calculation unit 212, an orthogonal transformation unit 213, a quantization unit 214, a coding unit 215, an accumulation buffer 216, an inverse quantization unit 217, an inverse orthogonal transformation unit 218, a calculation unit 219, a filter 220, a frame memory 221, an intra prediction unit 222, an inter prediction unit 223, a prediction image selection unit 224, and a rate control unit 225.

The preprocessing unit 210 performs processing related to preprocessing in which the setting of temporal resolution for each partial region of image data, the control of coding, the generation of a parameter set (for example, a sequence parameter set (SPS)), a picture parameter set (PPS), SEI (for example, MCTS, SEI, or the like), or the like is performed.

Image data supplied from the image conversion device 112 is input to the screen sorting buffer 211. For example, the data of a plane image in which an omnidirectional image rendered in a spherical shape about a viewpoint is developed on a single plane is input. The screen sorting buffer 211 stores images of the respective frames of the input image data in order in which the images are to be displayed, sorts the images of the frames stored in the order in which the images are to be displayed in order in which the frames are to be coded according to GOP (Group Of Picture), and supplies the images of which the frames have been sorted to the calculation unit 212. Further, the screen sorting buffer 211 supplies the images of which the frames have been sorted to the intra prediction unit 222 and the inter prediction unit 223 as well.

The calculation unit 212 subtracts a prediction image supplied from the intra prediction unit 222 or the inter prediction unit 223 via the prediction image selection unit 224 from the images read from the screen sorting buffer 211 to obtain residual information (also called residual data) that is the difference between the read images and the prediction image. For example, in the case of an image subjected to intra coding, the calculation unit 212 subtracts a prediction image supplied from the intra prediction unit 222 from the images read from the screen sorting buffer 211. For example, in the case of an image subjected to inter coding, the calculation unit 212 subtracts a prediction image supplied from the inter prediction unit 223 from the image read from the screen sorting buffer 211. The calculation unit 212 supplies the obtained residual data to the orthogonal transformation unit 213.

The orthogonal transformation unit 213 orthogonally transforms the residual data supplied from the calculation unit 212 by a prescribed method. The orthogonal transformation unit 213 supplies the residual data (also called an orthogonal transformation coefficient) that has been subjected to the orthogonal transformation to the quantization unit 214.

The quantization unit 214 quantizes the orthogonal transformation coefficient by a prescribed method. The quantization unit 214 sets quantization parameters according to a target value (target bit rate) of a coding amount supplied from the rate control unit 225 to perform the quantization. The quantization unit 214 supplies the residual data (also called quantized data) that has been subjected to the quantization to the coding unit 215 and the inverse quantization unit 217.

The coding unit 215 codes the quantized data supplied from the quantization unit 214. Further, the coding unit 215 acquires information related to an optimum prediction mode from the prediction image selection unit 224. In addition, the coding unit 215 can acquire arbitrary information from an arbitrary processing unit. The coding unit 215 codes the various information. Thus, the coding unit 215 codes information related to an image to generate coded data. The quantization unit 215 supplies the obtained coded data to the accumulation buffer 216 to be accumulated.

The accumulation buffer 216 temporarily retains the coded data supplied from the coding unit 215. The accumulation buffer 216 outputs the retained coded data to the outside of the coding device 113 as, for example, a bit stream or the like at a prescribed timing. For example, the coded data is transmitted to a decoding side via any recording medium, an arbitrary transmission medium, an arbitrary information processing device, or the like. That is, the accumulation buffer 216 is also a transmission unit that transmits the coded data.

The inverse quantization unit 217 inversely quantizes the quantized data by a method corresponding to the quantization by the quantization unit 214. The inverse quantization unit 217 supplies the quantized data (also called an orthogonal transformation coefficient) that has been subjected to the inverse quantization to the inverse orthogonal transformation unit 218.

The inverse orthogonal transformation unit 218 inversely orthogonally transforms the orthogonal transformation coefficient by a method corresponding to the orthogonal transformation processing by the orthogonal transformation unit 213. The inverse orthogonal transformation unit 218 supplies the orthogonal transformation coefficient (also called restored residual data) that has been inversely orthogonally transformed to the calculation unit 219.

The calculation unit 219 adds a prediction image supplied from the intra prediction unit 222 or the inter prediction unit 223 via the prediction image selection unit 224 to the restored residual data to obtain a locally reconfigured image (also called a reconfiguration image). For example, in the case of an image that is subjected to intra coding, the calculation unit 219 adds a prediction image supplied from the intra prediction unit 222 to the restored residual data. For example, in the case of an image that is subjected to inter coding, the calculation unit 219 adds a prediction image supplied from the inter prediction unit 223 to the restored residual data. The calculation unit 219 supplies the obtained reconfiguration image to the filter 220 and the intra prediction unit 222.

The filter 220 appropriately performs filter processing such as, for example, deblocking filter with respect to the reconfiguration image. The filter 220 supplies a filter processing result (called decoded image) to the frame memory 221.

The frame memory 221 stores the decoded image in its storage region. Further, the frame memory 221 supplies the stored decoded image to the inter prediction unit 223 as a reference image at a prescribed timing.

The intra prediction unit 222 performs intra prediction (intra-screen prediction) in which a prediction image is generated using a pixel value inside a picture to be processed that is a reconfiguration image supplied from the calculation unit 219 as a reference image. For example, the intra prediction unit 222 performs the intra prediction in a plurality of intra prediction modes prepared in advance. The intra prediction unit 222 generates prediction images in all the candidate intra prediction modes, evaluates the cost function values of the respective prediction images using the input image supplied from the screen sorting buffer 211, and selects an optimum mode. After selecting the optimum intra prediction mode, the intra prediction unit 222 supplies a prediction image generated in the optimum intra prediction mode, intra prediction mode information that is information related to intra prediction such as an index indicating the optimum intra prediction mode, the cost function value of the optimum intra prediction mode, or the like to the prediction image selection unit 224 as information related to prediction results.

The inter prediction unit 223 performs inter prediction processing (motion prediction processing and compensation processing) using the input image supplied from the screen sorting buffer 211 and the reference image supplied from the frame memory 221. More specifically, the inter prediction unit 223 performs motion compensation processing according to a motion vector detected by motion prediction to generate a prediction image (inter prediction image information) as the inter prediction processing. For example, the inter prediction unit 223 performs such inter prediction in a plurality of inter prediction modes prepared in advance. The inter prediction unit 223 generates prediction images in all the candidate inter prediction modes. The inter prediction unit 223 evaluates the cost function values of the respective prediction images using the input image supplied from the screen sorting buffer 211, the information of a generated difference motion vector, or the like, and selects an optimum mode. After selecting the optimum inter prediction mode, the inter prediction unit 223 supplies a prediction image generated in the optimum inter prediction mode, inter prediction mode information that is information related to inter prediction such as an index indicating the optimum inter prediction mode and motion information, the cost function value of the optimum inter prediction mode, or the like to the prediction image selection unit 224 as information related to prediction results.

The prediction image selection unit 224 acquires the above information related to the prediction results from the intra prediction unit 222 and the inter prediction unit 223. The prediction image selection unit 224 selects any one of the information to select a prediction mode in the region. That is, the prediction image selection unit 224 selects any one of the (optimum) intra prediction mode and the (optimum) inter prediction mode as an optimum prediction mode. The prediction image selection unit 224 supplies the prediction image in the selected mode to the calculation units 212 and 219. Further, the prediction image selection unit 224 supplies a part or the whole of the information related to selected predication results to the coding unit 215 as information related to the optimum prediction mode.

The rate control unit 225 controls the rate of the quantization operation of the quantization unit 214 so as not to cause an overflow or an underflow on the basis of a coded amount of the coded data accumulated in the accumulation buffer 216.

<Configurations of Preprocessing Unit>

Figure 13:
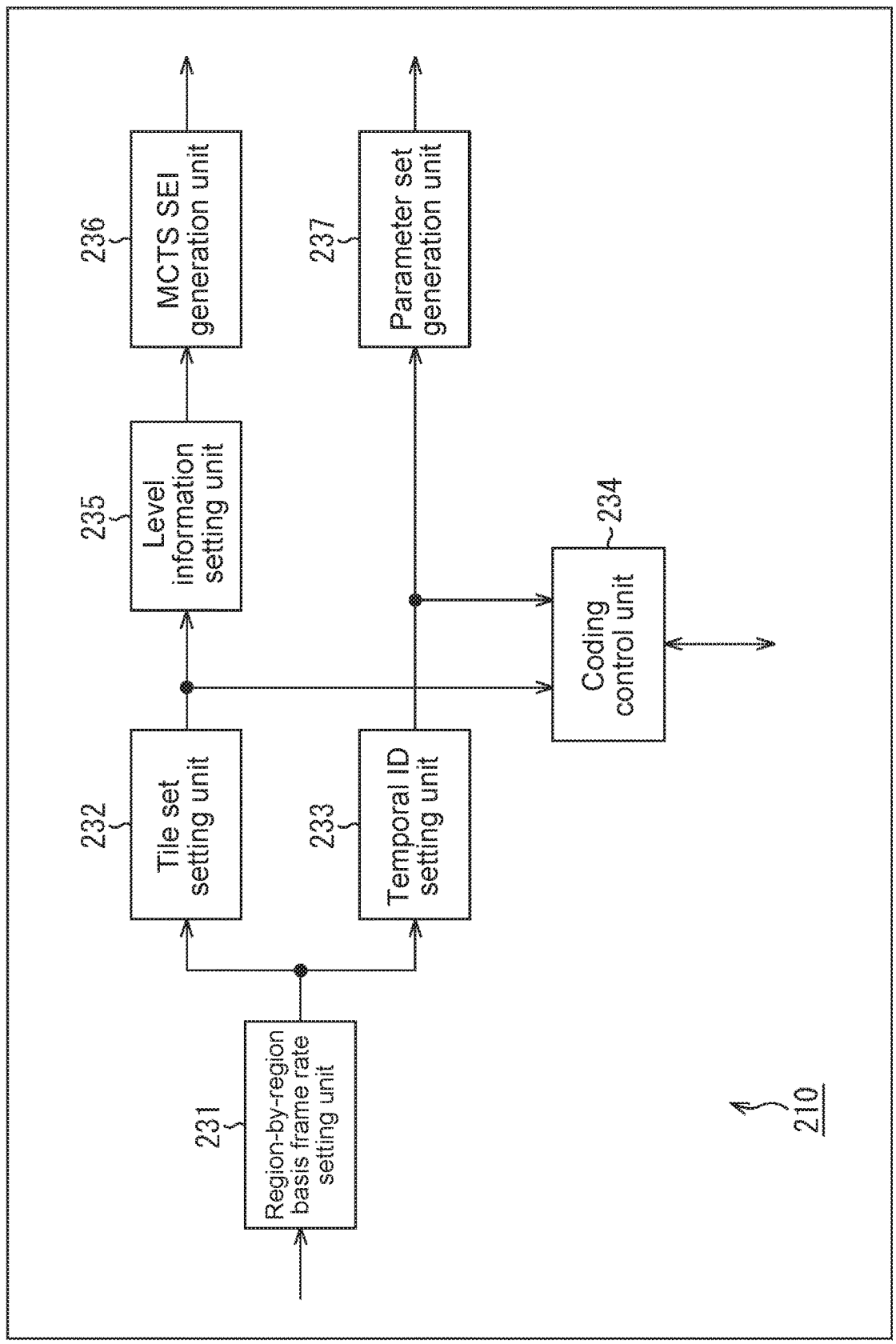
FIG. 13 is a block diagram showing a main configuration example of a preprocessing unit.

FIG. 13 is a block diagram showing a main configuration example of the preprocessing unit 210 (FIG. 12). As shown in FIG. 13, the preprocessing unit 210 has a region-by-region basis frame rate setting unit 231, a tile set setting unit 232, a temporal ID setting unit 233, a coding control unit 234, a level information setting unit 235, a MCTS SEI generation unit 236, and a parameter set generation unit 237.

The region-by-region basis frame rate setting unit 231 performs processing related to the setting of temporal resolution (frame rate) for each partial region inside pictures. For example, the region-by-region basis frame rate setting unit 231 sets partial regions inside a picture on the basis of user's instructions or the setting of an input image (for example, a method for developing an omnidirectional image, or the like) and sets the temporal resolution (frame rates) in the partial regions. The positions, sizes, and shapes of partial regions are arbitrarily. Further, the number of partial regions set in one picture is also arbitrarily. That is, a single partial region or a plurality of partial regions may be set. In addition, the temporal resolution of set partial regions is also arbitrarily. The setting of temporal resolution is separately performed for each partial region. Inside a picture, a plurality of partial regions having the same frame rate may exist, or a plurality of partial regions having frame rates different from each other may exist. The region-by-region basis frame rate setting unit 231 supplies the set respective partial regions and the setting of the temporal resolution to the tile set setting unit 232 and the temporal ID setting unit 233.

The tile set setting unit 232 performs processing related to the setting of tile sets managed by the MCTS SEI of HEVC. For example, the tile set setting unit 232 realizes the partial regions set by the region-by-region basis frame rate setting unit 231 as tile sets. Thus, the partial regions can be separately decoded. Further, for example, the tile set setting unit 232 supplies information indicating the set tile sets to the coding control unit 234 and the level information setting unit 235.

The temporal ID setting unit 233 performs processing related to the setting of temporal IDs prepared as the temporal scalability function of the HEVC. For example, the temporal ID setting unit 233 hierarchizes respective pictures and sets temporal IDs in respective hierarchies to realize the frame rates set by the region-by-region basis frame rate setting unit 231. In other words, the temporal ID setting unit 233 sets the temporal IDs in the respective pictures as information indicating the temporal resolution. Further, the temporal ID setting unit 233 supplies the information indicating set temporal scalability (including the temporal IDs of the respective pictures) to the coding control unit 234 and the parameter set generation unit 237.

The coding control unit 234 performs processing related to the control of coding. For example, the coding control unit 234 controls image coding by the coding device 113 on the basis of the tile sets or the setting of the temporal scalability. For example, the coding control unit 234 reflects the restriction of reference relationships according to the tile sets or the setting of the temporal scalability or the like on coding. Note that the coding control unit 234 can control an arbitrary processing unit where necessary.

The level information setting unit 235 performs processing related to the setting of level information with respect partial regions. For example, the level information setting unit 235 sets the level information of the respective tile sets set by the tile set setting unit 232. That is, the level information setting unit 235 sets the level information of the tile sets as information indicating temporal resolution for each partial region of image data to be coded. Since the resolution of the tile sets is lower than that of pictures, the level information of the tile sets becomes smaller than that of the whole picture. Further, if the temporal resolution of the tile sets is reduced, the level information of the tile sets becomes further smaller. Thus, the level information setting unit 235 sets the level information of the tile sets, whereby the ability of a decoder necessary for decoding the bit stream of the tile sets can be reduced. For example, the level information setting unit 235 supplies the supplied information indicating the tile sets or the level information set by the level information setting unit 235 itself to the MCTS SET generation unit 236.

The MCTS SEI generation unit 236 generates MCTS SEI including the information indicating the tile sets, the level information, or the like supplied from the level information setting unit 235. That is, the MCTS SEI generation unit 236 generates the MCTS SEI as information related to the partial regions. The MCTS SEI generation unit 236 supplies the generated MCTS SEI to the coding unit 215 (FIG. 12). The coding unit 215 codes the supplied MCTS SEI and causes the coded MCTS SEI to be included in a bit stream. That is, the bit stream output from the coding device 113 includes the information related to the partial regions. Further, the MCTS SEI includes the level information of the tile sets that is information indicating the temporal resolution of the partial regions. That is, the bit stream output from the coding device 113 includes the information indicating the temporal resolution of each partial region.

The parameter set generation unit 237 performs processing related to the generation of a parameter set. For example, the parameter set generation unit 237 generates a sequence parameter set (SPS), a picture parameter set (PPS), or the like. The parameter set generation unit 237 causes the temporal IDs of respective frames to be included in, for example, the picture parameter set. Note that the temporal IDs may be included in the sequence parameter set. The parameter set generation unit 237 supplies the generated parameter set to the coding unit 215 (FIG. 12) The coding unit 215 codes the supplied parameter set and causes the coded parameter set to be included in the bit stream. That is, the bit stream output from the coding device 113 includes the information indicating the temporal resolution.

With the configurations described above, the coding device 113 can suppress a reduction in coding efficiency.

<Flow of Image Coding Processing>

Next, an example of the flow of respective processing performed by the coding device 113 will be described. First, an example of the flow of image coding processing will be described with reference to the flowchart of FIG. 14.

When the image coding processing is started, the preprocessing unit 210 performs preprocessing in step S101. The details of the preprocessing will be described later.

In step S102, the screen sorting buffer 211 stores images of the respective frames (pictures) of an input moving image in order in which the images are to be displayed, and then sorts the pictures from the order in which the picture are to be displayed to order in which the pictures are to be coded.

In step S103, the intra prediction unit 222, the inter prediction unit 223, and the prediction image selection unit 224 perform prediction processing to generate a prediction image or the like in an optimum prediction mode. That is, in the prediction processing, the intra prediction unit 222 performs intra prediction to generate a prediction image or the like in an optimum intra prediction mode, the inter prediction unit 223 performs inter prediction to generate a prediction image or the like in an optimum inter Prediction mode, and the prediction image selection unit 224 selects an optimum one of the intra prediction mode and the inter prediction mode on the basis of cost function values or the like.

In step S104, the calculation unit 212 calculates the difference between the input image of which the order of the frames has been sorted by the processing of step S102 and the prediction image in the optimum mode selected by the prediction processing of step S103. That is, the calculation unit 212 generates the residual data (residual image) between the input image and the prediction image. A data amount of the residual data thus calculated is smaller than that of original image data. Accordingly, it becomes possible to compress the data amount, compared with a case in which the image is directly coded.

In step S105, the orthogonal transformation unit 213 orthogonally transforms the residual data generated by the processing of step S104.

In step S106, the quantization unit 214 quantizes an orthogonal transformation coefficient obtained by the processing of step S105 by using a quantization parameter calculated by the rate control unit 225 or the like.

In step S107, an inverse quantization unit 217 inversely quantizes quantized data generated by the processing of step S106 with characteristics corresponding to the characteristics of the quantization of step S106.

In step S108, the inverse orthogonal transformation unit 218 inversely orthogonally transforms an orthogonal transformation coefficient obtained by the processing of step S107 by a method corresponding to the orthogonal transformation of step S105.

In step S109, the calculation unit 219 adds the prediction image obtained by the prediction processing of step S103 to the residual data restored by the processing of step S108 to generate the image data of a reconfiguration image.

In step S110, the filter 220 performs filter processing such as deblocking filter with respect to the image data of the reconfiguration image generated by the processing of step S109.

In step S111, the frame memory 221 stores a local-decoded decoded image obtained by the processing of step S110.

In step S112, the coding unit 215 performs coding processing. That is, the coding unit 215 codes the quantized data obtained by the processing of step S106. That is, the coding unit 215 codes the quantized data that is information related to the image by, for example, a prescribed coding method such as variable length coding and arithmetic coding to generate coded data. Further, at this time, the coding unit 215 causes information related to the image other than the quantized data corresponding to the residual data such as information related to the prediction mode selected by the prediction processing of step S103 to be included in the coded data.

In step S113, the accumulation buffer 216 accumulates the coded data or the like obtained by the processing of step S112. The coded data or the like accumulated in the accumulation buffer 216 is appropriately read as, for example, a bit stream and transmitted to a decoding side via a transmission path or a recording medium.

In step S114, the rate control unit 225 controls the rate of the quantization processing of step S106 so as not to cause an overflow or an underflow on the basis of a coded amount (generated coded amount) of the coded data or the like accumulated in the accumulation buffer 216 by the processing of step S113.

When the processing of step S114 ends, the image coding processing ends.

Note that the respective processing is performed in an arbitrary unit and may not be performed in the same unit. Accordingly, the processing of the respective steps can be appropriately performed in parallel with the processing of other steps or the like, or can be performed in order in which the processing is sorted.

<Flow of Preprocessing>

Next, an example of the flow of the preprocessing performed in step S101 of FIG. 14 will be described with reference to the flowchart of FIG. 15.

When the preprocessing is started, the region-by-region basis frame rate setting unit 231 of the preprocessing unit 210 sets partial regions and their temporal resolution (frame rates) with respect to an input image in step S131.

In step S132, the tile set setting unit 232 sets tile sets corresponding to the partial regions set in step S131 in respective pictures.

In step S133, the temporal ID setting unit 233 sets the hierarchization structure of the respective pictures to realize the frame rates set in step S131 and sets temporal IDs corresponding to the hierarchies with respect to the respective pictures.

In step S134, the coding control unit 234 controls, on the basis of the tile sets set in step S132 and the temporal IDs set in step S133, the image coding processing described with reference to FIG. 14 so that reference relationships are, for example, not inconsistent with the settings.

In step S135, the level information setting unit 235 sets the level information of the tile sets set in step S132.

In step S136, the MCTS SEI generation unit 236 generates MCTS SEI including the management information of the tile sets set in step S132, the level information of the tile sets set in step S135, or the like. The MCTS SEI is included in the bit stream and output in step S113 of FIG. 14.

In step S137, the parameter set generation unit 237 generates a parameter set including the temporal IDs of the respective pictures set in step S133. The parameter set is included in the bit stream and output in step S113 of FIG. 14.

Figure 14:
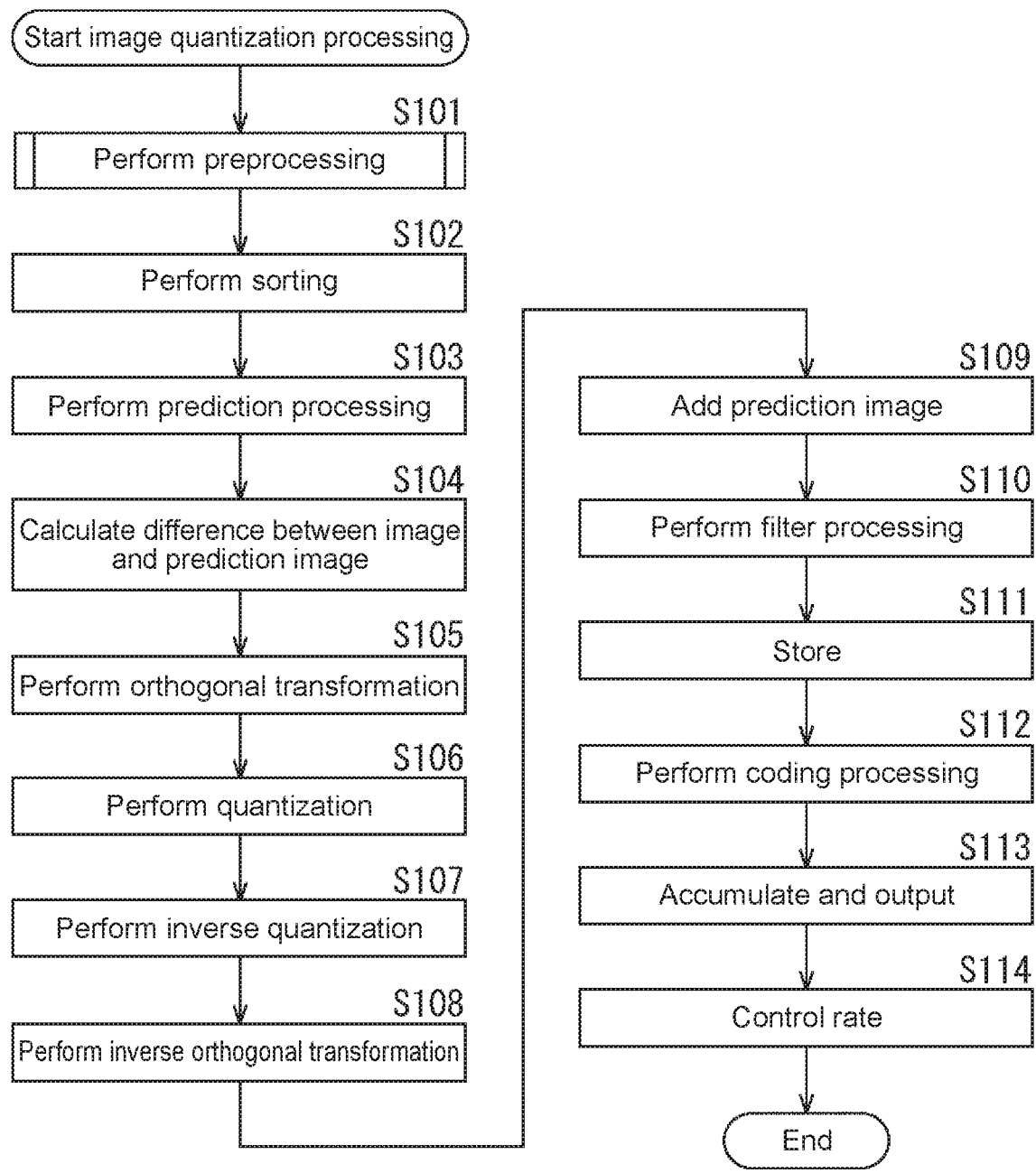
FIG. 14 is a flowchart describing an example of the flow of image coding processing.
Figure 15:
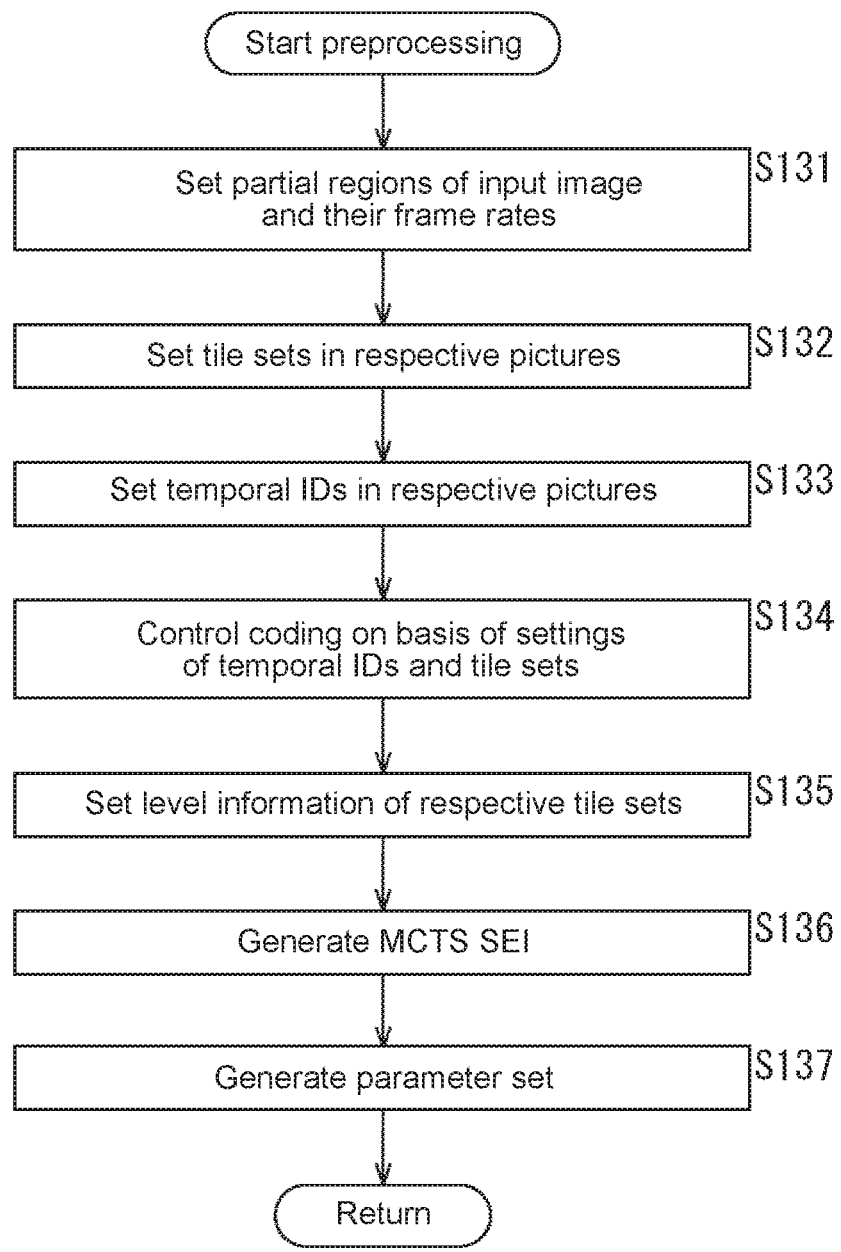
FIG. 15 is a flowchart describing an example of the flow of preprocessing.

When the processing of step S137 ends, the preprocessing ends and the processing returns to FIG. 14.

By performing the respective processing as described above, the coding device 113 can suppress a reduction in coding efficiency.

<2-2. Bit Stream Conversion>
<Analysis of Temporal Resolution for Each Region>

The bit stream conversion device 132 (FIG. 2) extracts the data of partial regions designated by the display device 135 or the like from a bit stream generated by the coding device 113 as described above and converts the data into the bit stream of the partial regions. At this time, the bit stream conversion device 132 analyzes information indicating temporal resolution for each partial region of image data, the information being included in the bit stream in which the image data is coded. Accordingly, when converting the data into the bit stream of the partial regions, the bit stream conversion device 132 can make the temporal resolution be adaptable to a setting. Accordingly, a reduction in the coding efficiency of the bit stream of the partial regions can be suppressed. Further, an increase in load for decoding can be suppressed.

<Configurations of Bit Stream Conversion Device>

Figure 16:
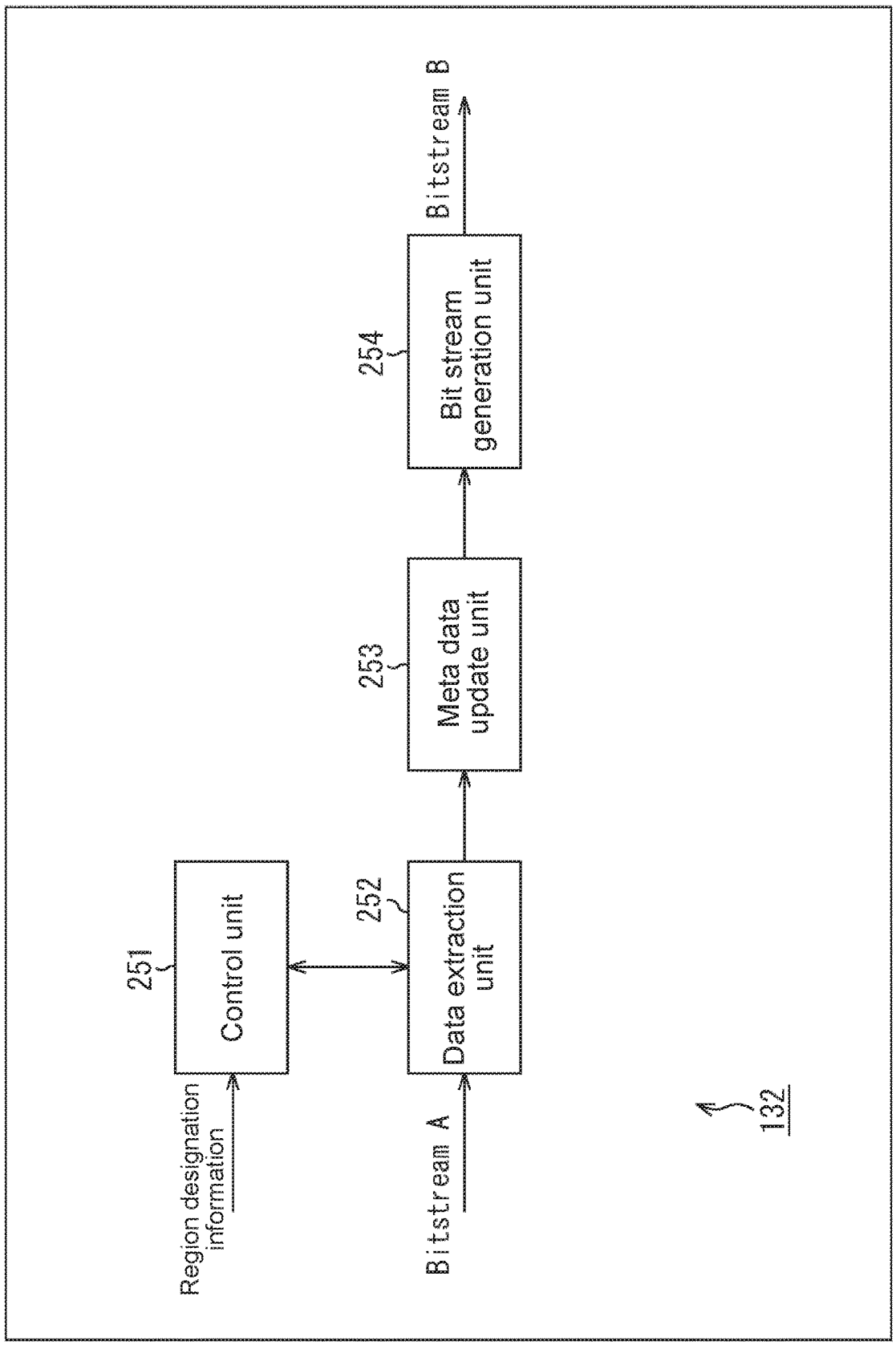
FIG. 16 is a block diagram showing a main configuration example of a bit stream conversion device.

FIG. 16 is a block diagram showing a main configuration example of the bit stream conversion device 132 (FIG. 2) that is a mode of the image processing device to which the present technology is applied. As shown in FIG. 16, the bit stream conversion device 132 has a control unit 251, a data extraction unit 252, a meta data update unit 253, and a bit stream generation unit 254.

The control unit 251 performs processing related to the control of bit stream conversion. For example, the control unit 251 acquires information (region designation information) for designating partial regions to be extracted, the information being supplied from the display device 135 or the like. Further, for example, the control unit 251 controls the data extraction unit 252 to cause the data of the partial regions designated by the region designation information to be extracted from a bit stream.

The data extraction unit 252 performs processing related to the extraction of data. For example, the data extraction unit 252 extracts, according to the control of the control unit 251, the data of partial regions designated by the display device 135 or the like from a bit stream (Bit stream A) supplied from the reception device 131. The data extraction unit 252 extracts, for example, data for each tile set as the data of the partial regions. Since the tile sets are separately decodable, the data extraction unit 252 can extract the data from the bit stream without the need to perform decoding or the like. Accordingly, the data extraction unit 252 can easily extract desired data. Note that in the data extraction, the data extraction unit 252 analyzes, for example, information related to the temporal resolution of partial regions as objects to be extracted, specifies the temporal resolution (frame rates) of the partial regions, and specifies pictures from which data is to be extracted on the basis of the temporal resolution and temporal IDs. Then, for example, the data extraction unit 252 extracts the data of the specified partial regions from the specified pictures. Thus, the data of the partial regions can be extracted as the data of frame rates set on a coding side. Further, for example, the data extraction unit 252 supplies the extracted data to the meta data update unit 253.

The meta data update unit 253 performs processing related to the update of meta data. The content of updated meta data is arbitrarily. For example, the meta data update unit 253 performs processing such as setting level information with respect to the data of the extracted partial regions. Since the data extraction unit 252 extracts the data of the partial regions so as to have the temporal resolution set on the coding side as described above, the level information of the data becomes level information set on the coding side. That is, the meta data update unit 253 sets level information transmitted by MCTS SEI or the like and set by the coding device 113 as level information with respect to the data of the extracted partial regions. Further, for example, the meta data update unit 253 supplies the data of the partial regions in which meta data has been updated to the bit stream generation unit 254.

The bit stream generation unit 254 performs processing related to the generation of a bit stream. For example, the bit stream generation unit 254 generates a bit stream (Bit stream B) including the data of the partial regions supplied from the meta data update unit 253. Further, for example, the bit stream generation unit 254 supplies the generated bit stream to the decoding device 133 (FIG. 2).

With the configurations described above, the bit stream conversion device 132 can suppress a reduction in coding efficiency. Further, the bit stream conversion device 132 can suppress an increase in load for decoding.

<Flow of Bit Stream Conversion Processing>

Figure 17:
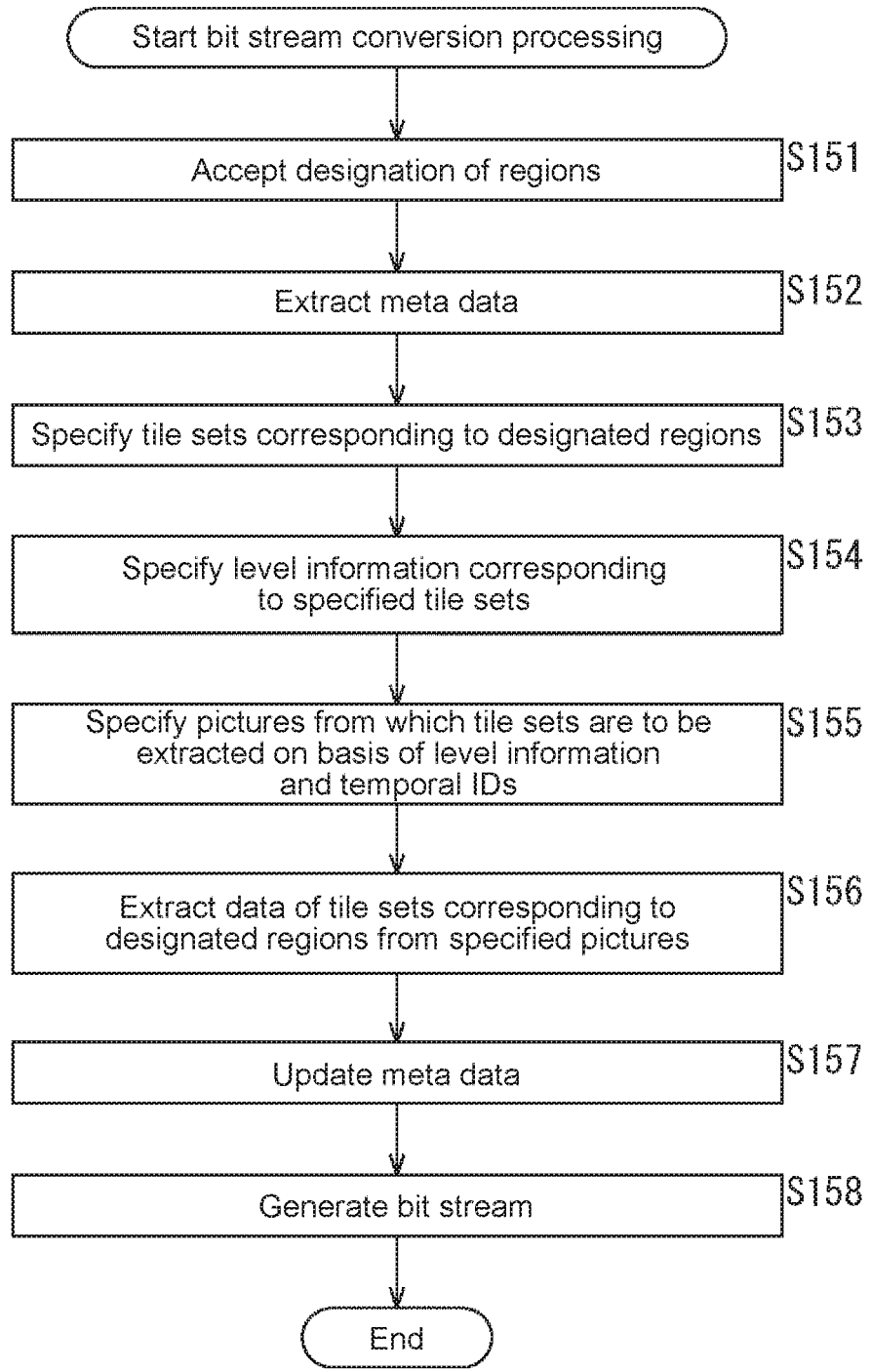
FIG. 17 is a flowchart describing an example of the flow of bit stream conversion processing.

Next, an example of the flow of bit stream conversion processing performed by the bit stream conversion device 132 will be described with reference to the flowchart of FIG. 17.

When the bit stream conversion processing is started, the control unit 251 of the bit stream conversion device 132 accepts the designation of regions to be extracted in step S151. In step S152, the data extraction unit 252 extracts, for example, meta data corresponding to the designated region such as SEI and a parameter set from a bit stream. In step S153, the data extraction unit 252 specifies tile sets corresponding to the designated regions. In step S154, the data extraction unit 252 refers to the meta data (for example, MCTS SEI or the like) extracted in step S152 to specify level information corresponding to the tile sets specified in step S153. In step S155, the data extraction unit 252 specifies pictures from which the tile sets are to be extracted on the basis of the level information specified in step S154 and the meta data (for example, a picture parameter set or the like) extracted in step S152. In step S156, the data extraction unit 252 extracts the data of the tile sets corresponding to designated regions (the tile sets specified in step S153) of the pictures specified in step S155 from the bit stream.

In step S157, the meta data update unit 253 updates the meta data extracted in step S152 so as to correspond to the tile sets extracted in step S156.

In step S158, the bit stream generation unit 254 generates a bit stream (a bit stream of partial regions) including the data extracted in step S156 and the meta data updated in step S157.

When the processing of step S158 ends, the bit, stream conversion processing ends.

By performing the bit stream conversion processing as described above, the bit stream conversion device 132 can suppress a reduction in coding efficiency. Further, the bit stream conversion device 132 can suppress an increase in load for decoding.

<2-3. Decoding>
<Configurations of Decoding Device>

The decoding device 133 (FIG. 2) decodes a bit stream converted by the bit stream conversion device 132 as described above in a HEVC coding system FIG. 18 is a block diagram showing a main configuration example of the decoding device 133 (FIG. 2).

Figure 18:
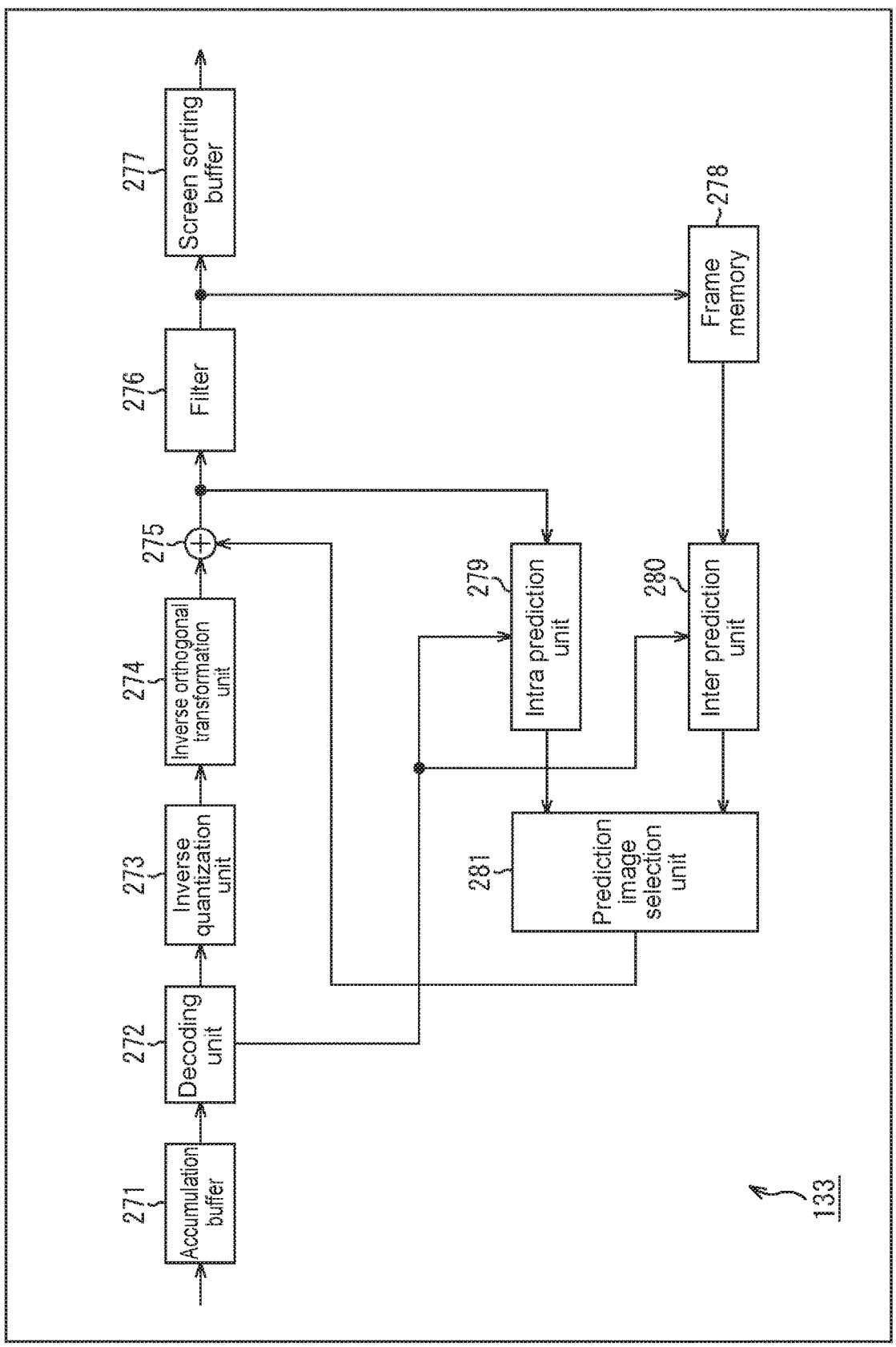
FIG. 18 is a block diagram showing a main configuration example of a decoding device.

As shown in FIG. 18, the decoding device 133 has an accumulation buffer 271, a decoding unit 272, an inverse quantization unit 273, an inverse orthogonal transformation unit 274, a calculation unit 275, a filter 276, a screen sorting buffer 277, a frame memory 278, an intra prediction unit 279, an inter prediction unit 280, and a prediction image selection unit 281.

A bit stream converted by the bit stream conversion device 132, that is, the bit stream of desired tile sets extracted from a bit stream generated by the coding device 113 is supplied to the coding device 133. The accumulation buffer 271 accumulates the bit stream and supplies the bit stream to the decoding unit 272 at a prescribed timing.

The decoding unit 272 decodes the bit stream (the bit stream of extracted partial regions (tile sets)) supplied from the accumulation buffer 271 in a system corresponding to the coding system of the coding unit 215 of FIG. 12. When obtaining quantized data after decoding the bit stream, the decoding unit 272 supplies the quantized data to the inverse quantization unit 273. Further, the decoding unit 272 supplies information related to an optimum prediction mode obtained by decoding the bit stream to the intra prediction unit 279 or the inter prediction unit 280. For example, when intra prediction is performed, the decoding unit 272 supplies information related to a prediction result of an optimum intra prediction mode to the intra prediction unit 279. For example, when inter prediction is performed, the decoding unit 272 supplies information related to a prediction result of an optimum inter prediction mode to the inter prediction unit 280. Similarly, the decoding unit 272 can appropriately supply various information obtained by decoding coded data to various processing units that need the information.

The inverse quantization unit 273 inversely quantizes the quantized data supplied from the decoding unit 272. That is, the inverse quantization unit 273 performs inverse quantization in a system corresponding to the quantization system of the quantization unit 214 of FIG. 12 (that is, in the same system as that of the inverse quantization unit 217). The inverse quantization unit 273 supplies an orthogonal transformation coefficient obtained by the inverse quantization to the inverse orthogonal transformation unit 274.

The inverse orthogonal transformation unit 274 inversely orthogonally transforms the orthogonal transformation coefficient supplied from the inverse quantization unit 273. That is, the inverse orthogonal transformation unit 274 performs inverse orthogonal transformation is a system corresponding to the orthogonal transformation system of the orthogonal transformation unit 213 of FIG. 12 (that is, in the same system as that of the inverse orthogonal transformation unit 218). The inverse orthogonal transformation unit 274 supplies residual data (restored residual data) obtained by the inverse orthogonal transformation processing to the calculation unit 275.

The calculation unit 275 adds a prediction image supplied from the prediction image selection unit 281 to the restored residual data supplied from the inverse orthogonal transformation unit 274 to obtain a reconfiguration image. The calculation unit 275 supplies the reconfiguration image to the filter 276 and the intra prediction unit 279.

The filter 276 performs the same filter processing (for example, deblocking filter or the like) as that performed by the filter 220 of FIG. 12. The filter 276 supplies a decoded image that indicates a filter processing result to the screen sorting buffer 277 and the frame memory 278.

The screen sorting buffer 277 sorts the supplied decoded image. That is, frames that have been sorted in order in which the frames are to be coded by the screen sorting buffer 211 of FIG. 12 are sorted in original order in which the frames are to be displayed. The screen sorting buffer 277 supplies the data of the decoded image in which the frames have been sorted to the image conversion device 134.

The frame memory 278 stores the supplied decoded image. Further, the frame memory 278 supplies the stored decoded image or the like to the inter prediction unit 280 at a prescribed timing or on the basis of a request from an outside such as the inter prediction unit 280.

The intra prediction unit 279 performs intra prediction using information related to a prediction result of an optimum intra prediction mode supplied from the decoding unit 272 and the reconfiguration image supplied from the calculation unit 275 to generate a prediction image. The intra prediction unit 279 supplies the generated prediction image to the prediction image selection unit 281.

The inter prediction unit 280 performs inter prediction using information related to a prediction result of an optimum inter prediction mode supplied from the decoding unit 272 and the decoded image supplied from the frame memory 278 to generate a prediction image. The inter prediction unit 280 supplies the generated prediction image to the prediction image selection unit 281.

The prediction image selection unit 281 supplies the prediction image supplied from the intra prediction unit 279 or the inter prediction unit 280 to the calculation unit 275. For example, when a macro block as an object to be processed is a macro block that has been subjected to intra prediction for coding, the intra prediction unit 279 performs intra prediction to generate a prediction image (intra prediction image). Therefore, the prediction image selection unit 261 supplies the intra prediction image to the calculation unit 275. For example, when a macro block as an object to be processed is a macro block that has been subjected to inter prediction for coding, the inter prediction unit 280 performs inter prediction to generate a prediction image (inter prediction image). Therefore, the prediction image selection unit 281 supplies the inter prediction image to the calculation unit 275.

As described above, the decoding device 133 can decode the bit stream of partial regions extracted by the bit stream conversion device 132. Accordingly, the decoding device 133 can suppress a reduction in coding efficiency and suppress an increase in load for decoding.

<Flow of Image Decoding Processing>

Next, an example of the flow of image decoding processing performed by the decoding device 133 will be described with reference to the flowchart of FIG. 19.

When the image decoding processing is started, the accumulation buffer 271 accumulates a bit stream supplied to the decoding device 133 in step S171. In step S172, the decoding unit 272 decodes the bit stream accumulated in step S171 to obtain quantized data.

In step S173, the inverse quantization unit 273 inversely quantizes the quantized data obtained by the processing of step S172 to obtain an orthogonal transformation coefficient. In step S174, the inverse orthogonal transformation unit 274 inversely orthogonally transforms the orthogonal transformation coefficient obtained by the processing of step S173 to obtain restored residual data.

In step S175, the intra prediction unit 279, the inter prediction unit 280, and the prediction image selection unit 281 perform prediction image generation processing to generate a prediction image in a prediction mode for coding.

In step S176, the calculation unit 275 adds the prediction image obtained by the processing of step S175 to the restored residual data obtained by the processing of step S174 to obtain a reconfiguration image.

In step S177, the filter 276 applies filter processing such as deblocking filter to the reconfiguration image obtained by the processing of step S176 to obtain a decoded image.

In step S178, the screen sorting buffer 277 performs the sorting of the decoded image obtained by the processing of step S177 to sort frames in original order in which the frames are to be displayed (in order before the frames are sorted by the screen sorting buffer 211 of the coding device 113).

In step S179, the frame memory 278 stores the decoded image obtained by the processing of step S177. The decoded image is used as a reference image in inter prediction.

When the processing of step S179 ends, the image decoding processing ends.

By performing the image decoding processing as described above, the decoding device 133 can decode the bit stream of partial regions extracted by the bit stream conversion device 132. Therefore, the decoding device 133 can suppress a reduction in coding efficiency and suppress an increase in load for decoding.

<2-4. Other Development Examples>
<VR Moving Image>

The above description shows an example in which an omnidirectional image having a spherical shape is used as a VR moving image. However, the format of a VR moving image is arbitrarily and is not limited to the example. For example, as shown on the left side of FIG. 20A or the right side of FIG. 20B, an image (hereinafter also called a six-way image) rendered in a cuboid shape or a three-dimensional shape about a viewpoint may be used. That is, the six-way image is constituted by six-way plane images orthogonal to each other. Since images of the respective surfaces of the six-way image are plane images, the images of the respective surfaces are easily arranged side by side on a plane when the six-way image is developed on the plane. However, a method for arranging the images is arbitrarily. For example, the six-way image may be developed in consideration of the positional relationships between the respective surfaces of the six-way image as shown in the right side of FIG. 20A, or the six surfaces may be sorted and developed so that the plane images after the development become the smallest as shown in FIG. 20B.

Figure 20:
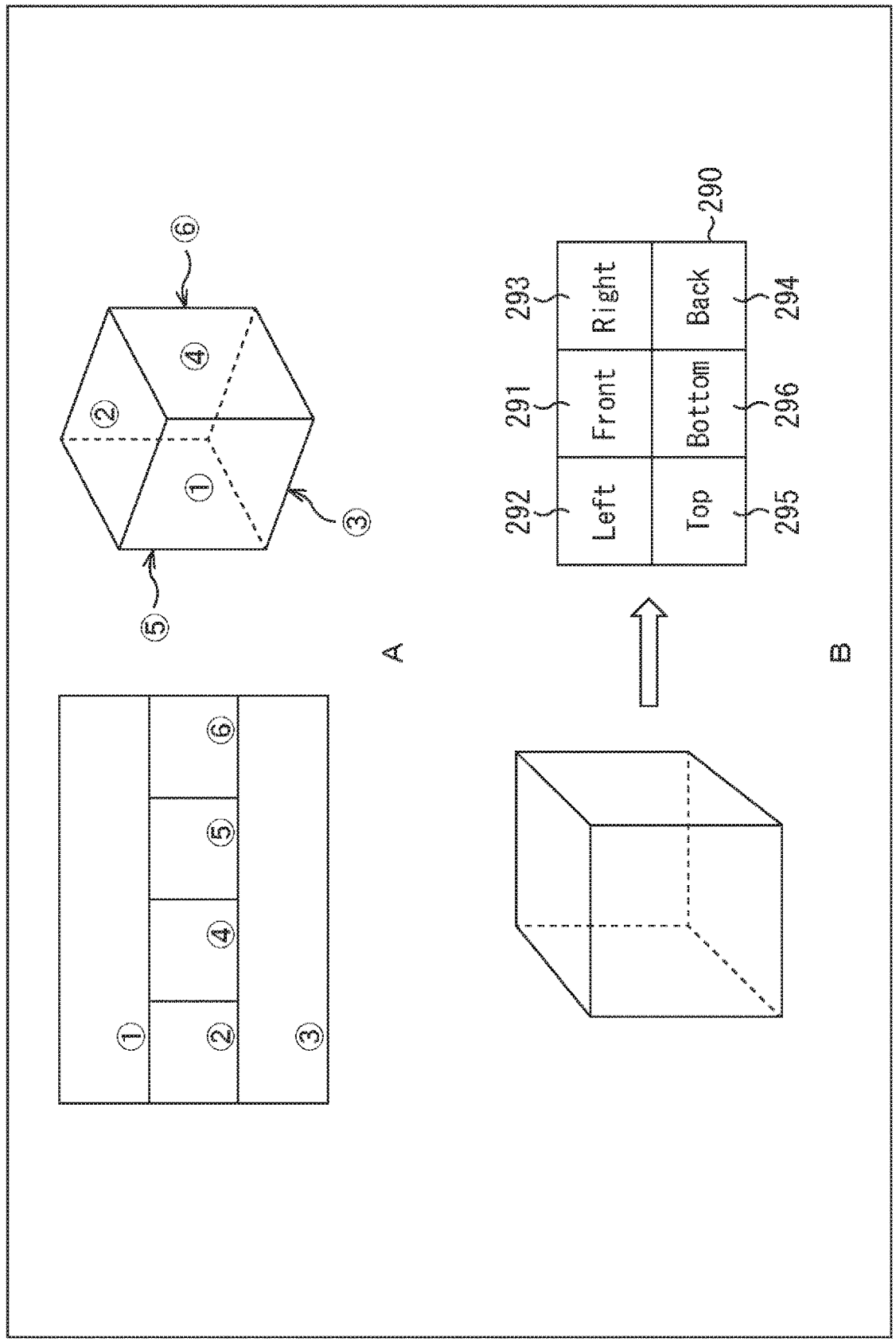
FIGS. 20A and 20B are diagrams each describing an example of a developed state.

In the case of the example of FIG. 20B, in a developed plane image 290, an image of a left side surface (Left) is arranged in a partial region 292 on the left side in the figure of a partial region 291 in which an image of a front surface (Front) is arranged. Further, an image of a right side surface (Right) is arranged in a partial region 293 on the right side in the figure of the partial region 291. In addition, an image of a back surface (rear surface) (Back) is arranged in a partial region 294 on the lower side in the figure of the partial region 293. Further, an image of a top surface (Top) is arranged in a partial region 295 on the lower side in the figure is the figure of the partial region 292. In addition, an image of a bottom surface (Bottom) is arranged in a partial region 296 on the lower side in the figure of the partial region 291.

A The coding device 113 can regard the data of a plane image in which six-way plane images orthogonal to each other about a viewpoint are developed on a single plane as described above as an object to be coded.

In such a case, it may only be possible to make the respective surfaces of the six-way image into partial regions (tile sets) and control temporal resolution for each of the surfaces. Images of the respective surfaces of the six-way image are orthogonal to each other, and the independency between the images is high. Generally, images captured by cameras or the like different from each other may be often used. Accordingly, coding can be easily separately performed, and the separate control of the temporal resolution (frame rates) has less influence on other temporal resolution. Accordingly, surfaces are easily made into tile sets.

When temporal resolution is set for each of the surfaces of the six-way image, the temporal resolution may only be set according to the importance of the respective surfaces. For example, a noticeable object is generally most highly likely to exist in an image of a front surface (front when seen from a viewpoint position), and the importance of the image is likely to become high. Accordingly, the temporal resolution of an image of a front surface (the image (Front) arranged in the partial region 291 in the case of FIG. 20B) inside a plane image in which a six-way image is developed may be set to be higher than those of images arranged in the other partial regions (the partial regions 292 to 296).

Further, for example, noticeable objects are generally highly likely to exist in images of a left surface (left side when seen from a viewpoint position), a right surface (right side when seen from the viewpoint position), and a back surface (back side when seen from the viewpoint position) than images of a top surface (top side when seen from the viewpoint position) and a bottom surface (bottom side when seen from the viewpoint position), and the importance of the images is likely to become high. Accordingly, the temporal resolution of an image of a left surface (the image (Left) arranged in the partial region 292 in the case of FIG. 20B), an image of a right surface (the image (Right) arranged in the partial region 293 in the case of FIG. 20B), and an image of a back surface (the image (Back) arranged in the partial region 294 in the case of FIG. 20B) may be set to be higher than those of an image arranged in a top surface (the image (Top) arranged in the partial region 295 in the case of FIG. 20B) and an image arranged in a bottom surface (the image (Bottom) arranged in the partial region 296 in the case of FIG. 20B) inside a plane image in which a six-way image is developed.

In addition, for example, noticeable objects are generally highly likely to exist in images of a left surface (left side when seen from a viewpoint position) and a right surface (right side when seen from the viewpoint position) than an image of a back surface (back side when seen from the viewpoint position), and the importance of the images is likely to become high. Accordingly, the temporal resolution of an image of a left surface (the image (Left) arranged in the partial region 292 in the case of FIG. 20B) and an image of a right surface (the image (Right) arranged in the partial region 293 in the case of FIG. 20B) may be set to be higher than that of an image arranged in a back surface (the image (Back) arranged in the partial region 294 in the case of FIG. 20B) inside a plane image in which a six-way image is developed. Accordingly, the temporal resolution of an image of a top surface (the image (Top) arranged in the partial region 295 in the case of FIG. 20B) may be set to be higher than that of an image arranged in a bottom surface (the image (Bottom) arranged in the partial region 296 in the case of FIG. 20B) inside a plane image in which a six-way image is developed.

Further, for example, a noticeable object is generally highly likely to exist in an image of a top surface (top side when seen from a viewpoint position) than an image of a bottom surface (bottom side when seen from the viewpoint position), and the importance of the image is likely to become high.

Further, in this case, information indicating pictures necessary for decoding partial regions may be included in a bit stream (may be transmitted to a decoding side) as information indicating temporal resolution. For example, with an assumption that a temporal ID to be decoded is less than or equal to DTID, a syntax value of DTID may be transmitted for each surface as information indicating pictures necessary for decoding partial regions. For example, the syntax value may be set as follows.

1) Front, Back Max Temporal ID→Decode at maximum frame rate
2) Left, Right Max Temporal ID-1→Decode at ½ frame rate
3) Top, Bottom Max Temporal ID-2→Decode at ⅓ frame rate Note that in this case as well, processing such as coding, bit stream conversion, and decoding can be performed by the same method as that of the case described above in which a plane image in which an omnidirectional image is developed is set as an object to be coded. Accordingly, the description of the processing is omitted, but the same effects as those of the case of an omnidirectional image can be obtained in the case of a six-way image.

3. Second Embodiment

<Temporal ID for Each Partial Region>

The first embodiment describes coding and decoding with the HEVC. However, the present technology is applicable to an arbitrary coding system or a decoding system and is not limited to the above example of the HEVC For example, a temporal ID may be set for each partial region.

Figure 21:
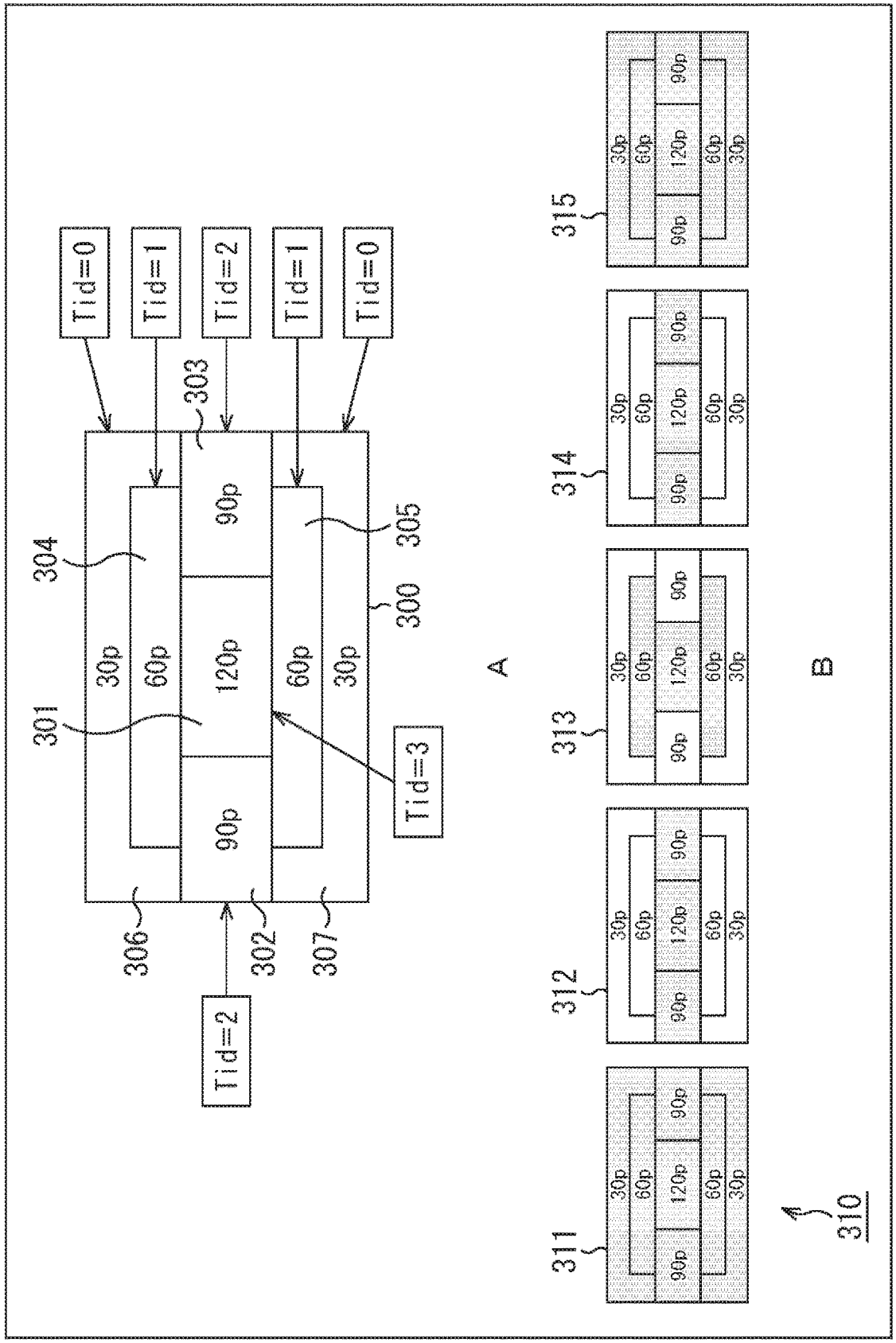
FIGS. 21A and 21B are diagrams each showing an example of a bit stream.

For example, in the case of FIG. 21A, "Tid=3" is set as a temporal ID with respect to a region 301 of a picture 300 in which temporal resolution is set at 120 p. Further, "Tid=2" is set as a temporal ID with respect to regions 302 and 303 in which temporal resolution is set at 90 p. In addition, "Tid=1" is set as a temporal ID with respect to regions 304 and 305 in which temporal resolution is set at 60 p. Further, "Tid=0" is set as a temporal ID with respect to regions 306 and 307 in which temporal resolution is set at 30 p.

Thus, like a bit stream 310 shown in FIG. 21B, the respective partial regions can be coded with the temporal resolution corresponding to the temporal IDs allocated to the partial regions. For example, in the bit stream 310, the region 301 to which Tid=3 is allocated is coded in each of frames 311 to 315 so that the temporal resolution becomes 120 p. Further, the regions 302 and 303 to which Tid=2 allocated is coded in each of the frames 311, 312, 314, and 315 (the frames other than the frame 313) so that the temporal resolution becomes 90 p. In addition, the regions 304 and 305 to which Tid=1 is allocated is coded in each of the frames 311, 313, and 315 (every other frame) so that the temporal resolution becomes 60 p. Further, the regions 306 and 307 to which Tid=0 is allocated is coded in each of the frames 311 and 315 (the frames other than the frames 312 to 314) so that the temporal resolution becomes 30 p.

That is, by the use of the temporal IDs set for the respective partial regions, only the regions displayed in gray can be coded in the respective frames like the bit stream 310 shown in FIG. 21B. Accordingly, a reduction in coding efficiency can be suppressed. Further, in this case as well, the temporal IDs can be set with respect to the respective regions in consideration of the importance or the like of the regions like the case of the first embodiment. Therefore, a reduction in coding efficiency can be suppressed simultaneously with the suppression of a reduction in subjective image quality.

<Image Processing System>

Figure 22:
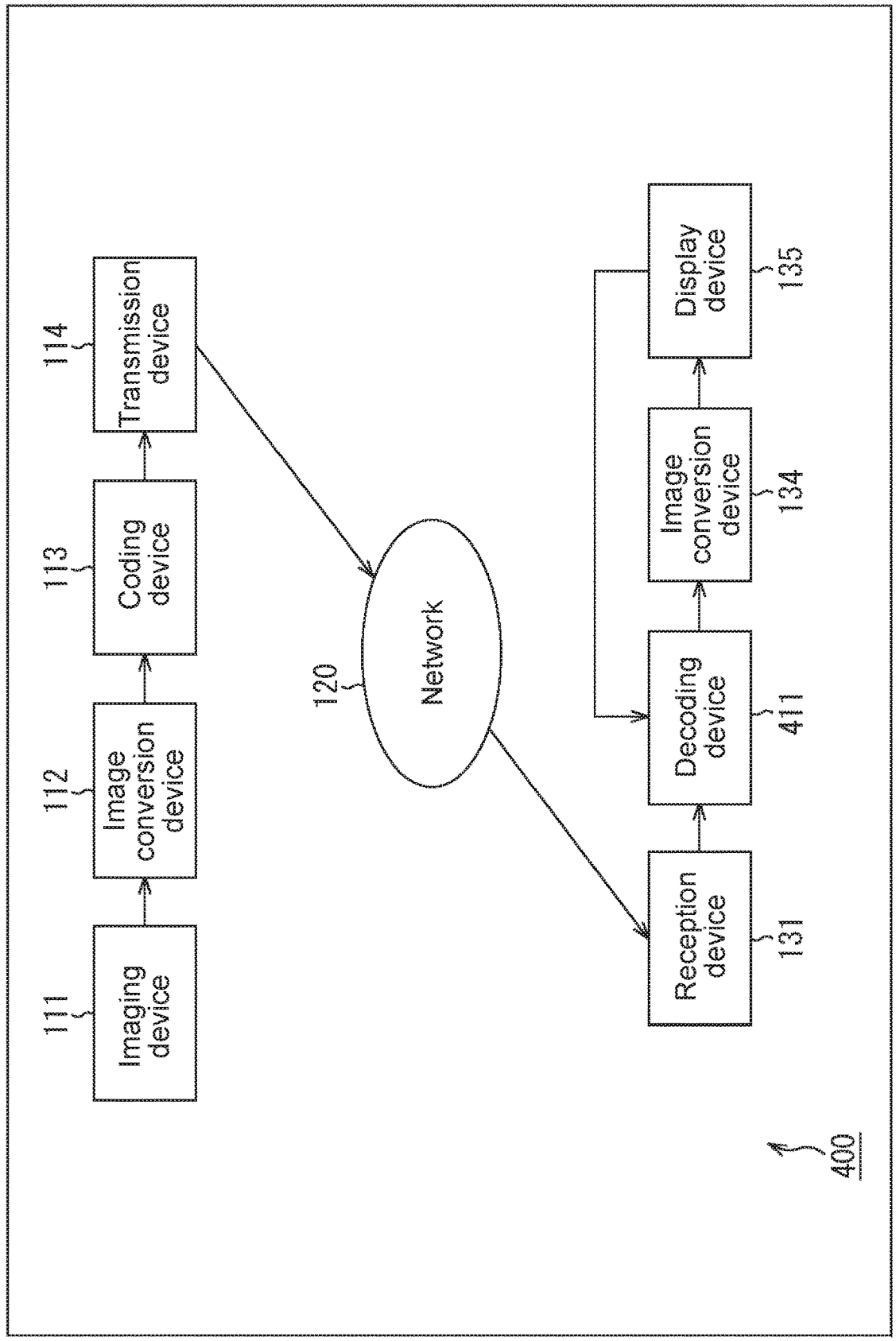
FIG. 22 is a block diagram showing a main configuration example of an image processing system.

FIG. 22 is a block diagram showing a configuration example of an image processing system that is a mode of the image processing system to which the present technology is applied. An image processing system 400 shown in FIG. 22 is basically the same system as the image processing system 100 described with reference to FIG. 2. That is, the image processing system 400 is basically configured to have the same configurations as those of the image processing system 100 and performs the same processing. However, the bit stream conversion device 132 of the image processing system 100 is omitted in the image processing system 400. Further, a decoding device 411 is provided instead of the decoding device 133.

The decoding device 411 is basically the same device as the decoding device 133 but decodes a bit stream received by a reception device 131, i.e., the bit stream of the whole picture generated by a coding device 113. However, in the case of the image processing system 400, the coding device 113 sets a temporal ID for each partial region as described with reference to FIG. 21A and codes only necessary partial regions inside pictures on the basis of the temporal resolution of the respective partial regions as described with reference to FIG. 21B.

The decoding device 411 decodes the data of partial regions requested by a display device 135 or the dike, the data being included in such a bit stream. That is, the data of the respective partial regions is stored in the bit stream with the temporal resolution set with respect to the partial regions. Accordingly, the decoding device 411 can obtain a moving image of the set temporal resolution of the partial regions by decoding the partial regions.

Note that image data as an object to be coded is arbitrarily in this case as well and may be, for example, a plane image in which an omnidirectional image described in the first embodiment is developed or a plane image in which a six-way image is developed.

Further, the temporal resolution of respective partial regions can be arbitrarily set. For example, the temporal resolution may be set according to the importance of the regions like the first embodiment. For example, when a plane image in which an omnidirectional image is developed is set as an object to be coded, partial regions at positions closer to the center of the plane image may be set to have higher temporal resolution. Further, in the vertical direction of the plane image, higher temporal resolution may be set in partial regions at positions closer to the center may be set to have higher temporal resolution. In addition, partial regions near the upper end of the plane image may be set to have higher temporal resolution than that of partial regions near the lower end of the plane image.

Further, for example, when a plane image in which a six-way image is developed is set as an object to be coded, a plane image on a front side when seen from a viewpoint among six directions may be set to have higher temporal resolution than that of plane images in other directions. In addition, for example, plane images on a left side, a right side, and a back side when seen from the viewpoint among the six directions may be set to have higher temporal resolution than that of plane images on a top side and a bottom side when seen from the viewpoint. Further, for example, plane images on the left side and the right side when seen from the viewpoint among the six directions may be set to have higher temporal resolution than that of a plane image on the back side when seen from the viewpoint. In addition, for example, a plane image on the top side when seen from the viewpoint among the six directions may be set to have higher temporal resolution than that of a plane image on the bottom side when seen from the viewpoint.

Thus, like the case of the first embodiment, it becomes possible to perform information amount control depending on the deviation of importance as described above such as the reduction of the temporal resolution of less important parts. Accordingly, a reduction in coding efficiency can be suppressed simultaneously with the suppression of a reduction in subjective image quality.

<3-1. Coding>
<Configurations of Preprocessing Unit>

Figure 23:
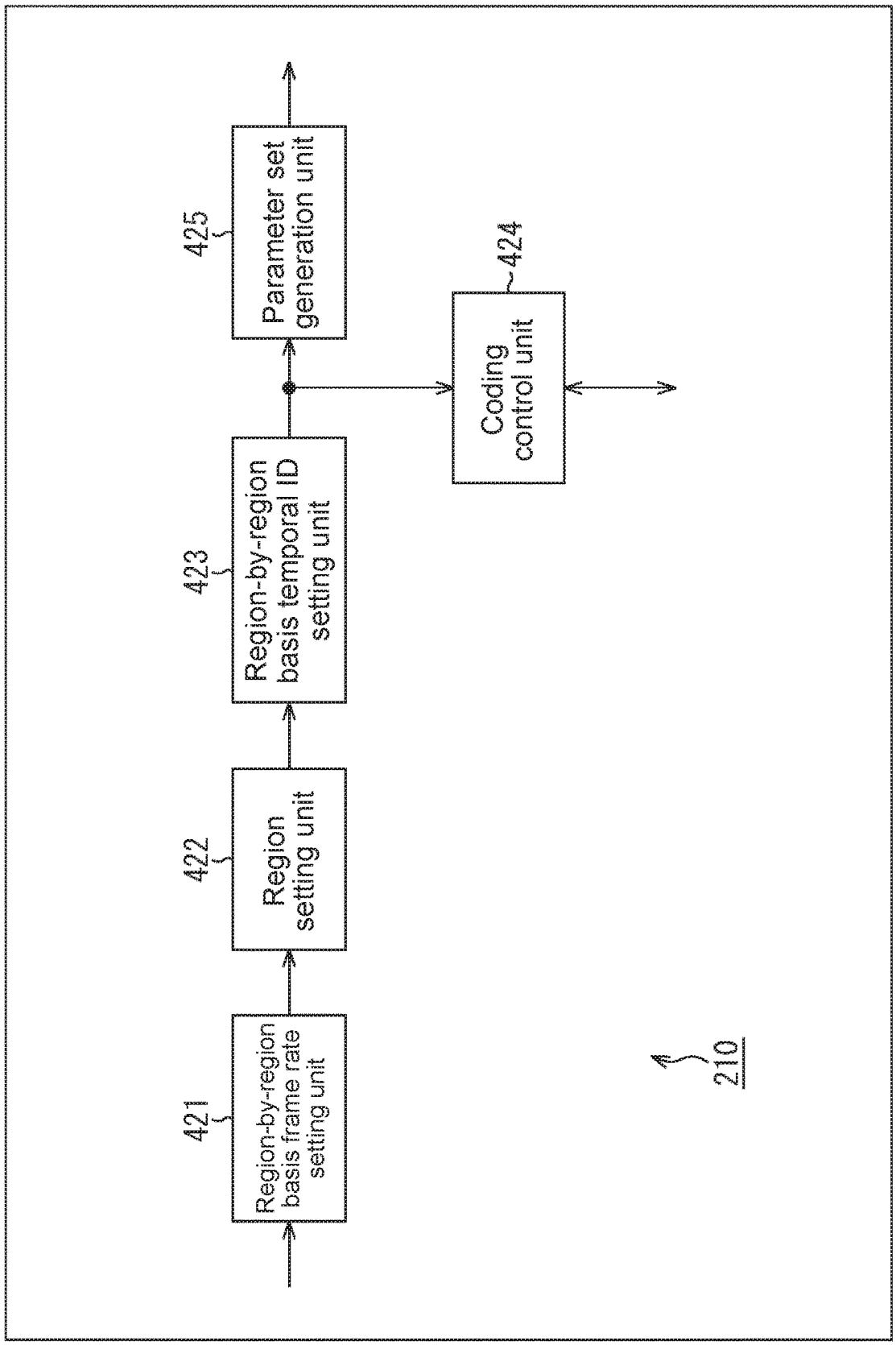
FIG. 23 is a block diagram showing a main configuration example of a preprocessing unit.

In the image processing system 400, the coding device 113 has basically the same configurations (FIG. 12) as those of the coding device 113 of the first embodiment. However, in this case, a preprocessing unit 210 has configurations as shown in FIG. 23. As shown in FIG. 23, the preprocessing unit 210 has a region-by-region basis frame rate setting unit 421, a region setting unit 422, a region-by-region basis temporal ID setting unit 423, a coding control unit 424, and a parameter set generation unit 425.

The region-by-region basis frame rate setting unit 421 is the same processing unit as the region-by-region basis frame rate setting unit 231 and performs processing related to the setting of temporal resolution (frame rate) for each partial region inside pictures. The region-by-region basis frame rate setting unit 421 supplies the setting of the set respective partial regions and the temporal resolution to the region setting unit 422.

The region setting unit 422 sets the positions, sizes, shapes, or the like of the partial regions in which the temporal resolution is set. The region setting unit 422 can set the partial regions using an arbitrary data unit, as a unit. For example, the partial regions may be set using separately decodable tile sets lie the case of the first embodiment, or may be set without tile sets. The region setting unit 422 supplies information indicating the set partial regions to the region-by-region basis temporal ID setting unit 423.

The region-by-region basis temporal ID setting unit 423 sets the temporal IDs of values corresponding to the temporal resolution set by the region-by-region basis frame rate setting unit 421 with respect to the respective partial regions set by the region setting unit 422. The region-by-region basis temporal ID setting unit 423 supplies information indicating the partial regions and information indicating the temporal IDs to the coding control unit 424 and the parameter set generation unit 425.

The coding control unit 424 controls the respective processing units of the coding device 113 on the basis of the supplied information indicating the partial regions and the temporal IDs and codes a partial region included in a current picture with respect to the respective pictures of image data to generate a bit stream including the data of the partial regions of respective temporal resolution like the bit stream 310 shown in FIG. 21B.

The parameter set generation unit 425 generates a parameter set. For example, the parameter set generation unit 425 generates a parameter set including the information indicating the partial regions and the information indicating the temporal resolution (temporal IDs).

For example, the region setting unit 422 may set the partial regions in units of tile, and the region-by-region basis temporal ID setting unit 423 may set the temporal IDs of the respective partial regions. In this case, the parameter set generation unit 425 may generate a parameter set including information indicating the partial regions using the tiles and information indicating the temporal resolution of the respective partial regions using the temporal IDs. An example of a syntax in this case is shown in FIG. 24A. Further, a semantics is shown in FIG. 24B.

In the case of this example, the partial regions that control the temporal resolution are set using the identification information of the tiles (region_tileIdx[i]), and the temporal resolution is set using the temporal IDs (region_temporal_id [i]) in a picture parameter set. Note that these information items may be set in a sequence parameter set.

As described above, the preprocessing unit 210 sets the temporal IDs with respect to the partial regions and performs coding on the basis of the getting. Therefore, the coding device 113 can generate a bit stream including the partial regions of respective temporal resolution like the bit stream 310 shown in FIG. 21B. Thus, a reduction in coding efficiency can be suppressed.

<Flow of Preprocessing>

Figure 25:
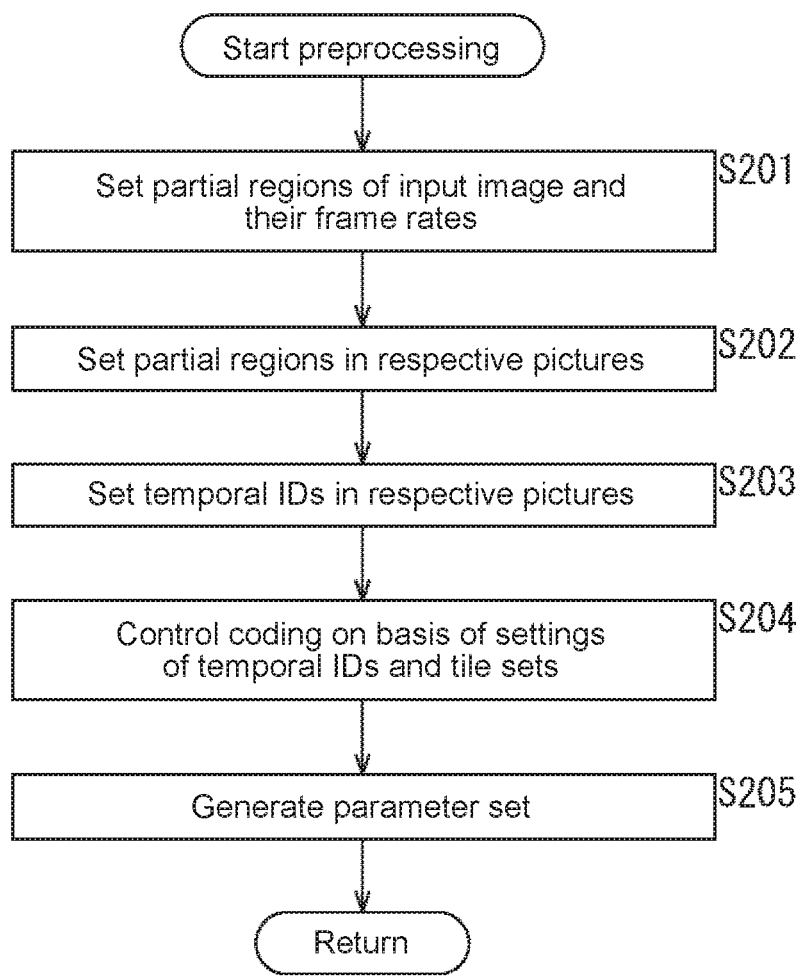
FIG. 25 is a flowchart describing an example of the flow of preprocessing.

In this case as well, image coding processing is performed in the same flow as that of the image coding processing of the first embodiment (FIG. 14). An example of the flow of preprocessing in this case will be described with reference to the flowchart of FIG. 25.

When the preprocessing is started, the region-by-region basis frame rate setting unit 231 of the preprocessing unit 210 sets partial regions and their temporal resolution (frame rates) with respect to an input image in step S201.

In step S202, the region setting unit 422 sets the partial regions set in step S201 in respective pictures.

In step S203, the region-by-region basis temporal ID setting unit 423 sets the hierarchization structure of the respective pictures to realize the frame rates set in step S201 and sets temporal IDs corresponding to the temporal resolution with respect to the respective partial regions.

In step S204, the coding control unit 424 controls, on the basis of the partial regions set in step S202 and the temporal IDs corresponding to the respective partial regions set in step S203, the image coding processing described with reference to FIG. 14.

In step S205, the parameter set generation unit 425 generates a parameter set. The parameter set is included in the bit stream and output in step S113 of FIG. 14.

When the processing of step S205 ends, the preprocessing ends and the processing returns to FIG. 14.

By performing the respective processing as described above, the coding device 113 can suppress a reduction in coding efficiency.

<3-2. Decoding>
<Analysis of Temporal Resolution for Each Region>

The decoding device 411 decodes a bit stream generated by the coding device 113 as described above. At this time, the decoding device 411 analyzes information indicating temporal resolution for each partial region of image data, the information being included in the bit stream in which image data is coded. Accordingly, the decoding device 411 can specify and decode a partial region existing in a current picture. Therefore, the decoding device 411 can correctly decode a bit stream generated by the decoding device 113 described in the present embodiment. That is, the decoding device 411 can suppress a reduction in coding efficiency. Note that the decoding device 411 may complement regions in which no current picture exists. Thus, the decoding device 411 can decode the whole picture.

<Configurations of Decoding Device>

Figure 26:
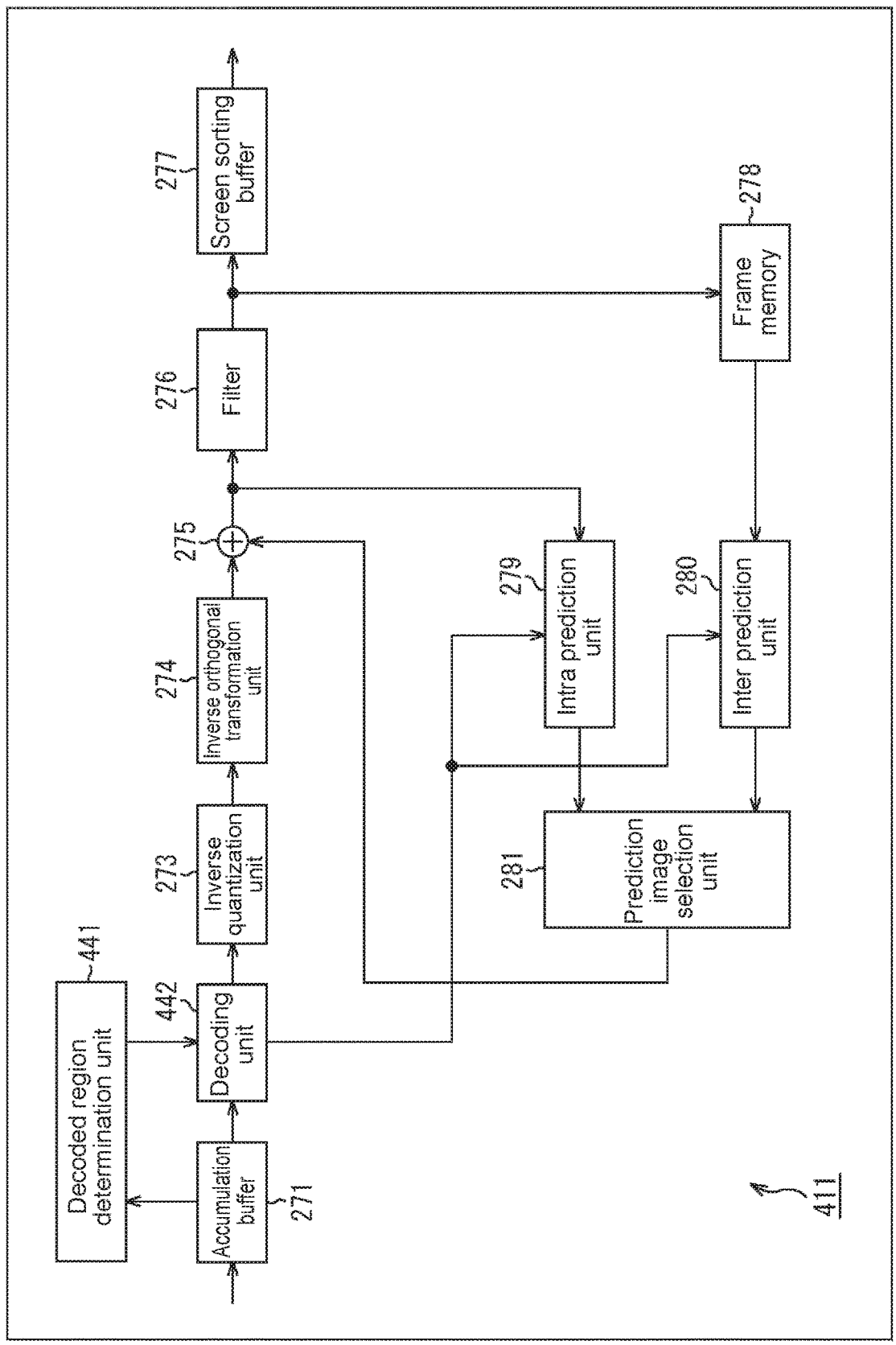
FIG. 26 is a block diagram showing a main configuration example of a decoding device.

FIG. 26 is a block diagram showing a main configuration example of the decoding device 411. As shown in FIG. 26, the decoding device 411 has basically the same configurations as those of the decoding device 133 (FIG. 18). However, the decoding device 411 has a decoded region determination unit 441 and has a decoding unit 442 instead of the decoding unit 272.

The decoded region determination unit 441 analyzes information (for example, a temporal ID for each partial region) indicating temporal resolution for each partial region of image data, the information being included in a bit stream, and determines decoded regions of respective pictures. The decoded region determination unit 441 supplies the determination result to the decoding unit 442.

According to the determination result (the analysis result of information indicating temporal resolution for each partial region) supplied from the decoded region determination unit 441, the decoding unit 442 decodes the coded data of desired partial regions among the coded data of image data included in the bit stream. For example, the decoding unit 442 decodes the coded data of a partial region included in a current, picture with respect to the respective pictures of image data on the basis of analyzed temporal resolution for each partial region. Thus, the decoding device 411 can correctly decode the bit stream generated by the coding device 113 described in the present embodiment. That is, the decoding device 411 can suppress a reduction in coding efficiency.

Further, the decoding unit 442 decodes partial regions in which the data of respective pictures exists according to the determination result of the decoded region determination unit 441 and complements the other regions. Thus, the decoding device 411 can code the whole picture.

<Flow of Image Decoding Processing>

Figure 27:
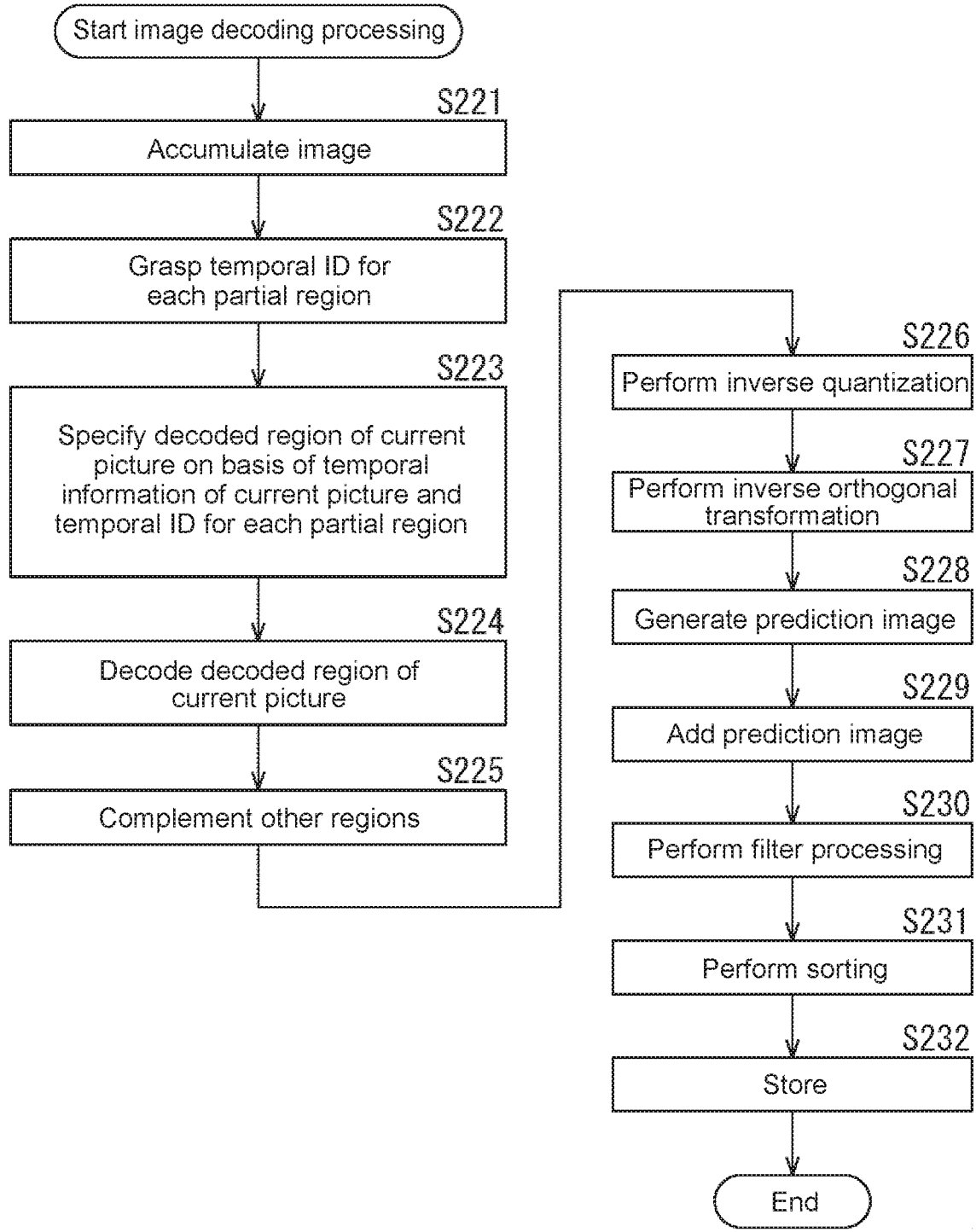
FIG. 27 is a flowchart describing an example of the flow of image decoding processing.

An example of the flow of image decoding processing performed by the decoding device 411 will be described with reference to the flowchart of FIG. 27.

When the image decoding processing is started, an accumulation buffer 271 accumulates a bit stream supplied to the decoding device 411 in step S221. In step S222, the decoded region determination unit 441 grasps a temporal ID for each partial region. In step S223, the decoded region determination unit 441 specifies a region as an object to be decoded (decoded region) of a current picture on the basis of the time information of the current picture and a temporal ID for each partial region. In step S224, the decoding unit 442 decodes the decoded region of the current picture specified in step S223. In step S225 the decoding unit 442 complements regions (the other regions) other than the decoded region of the current picture.

Figure 19:
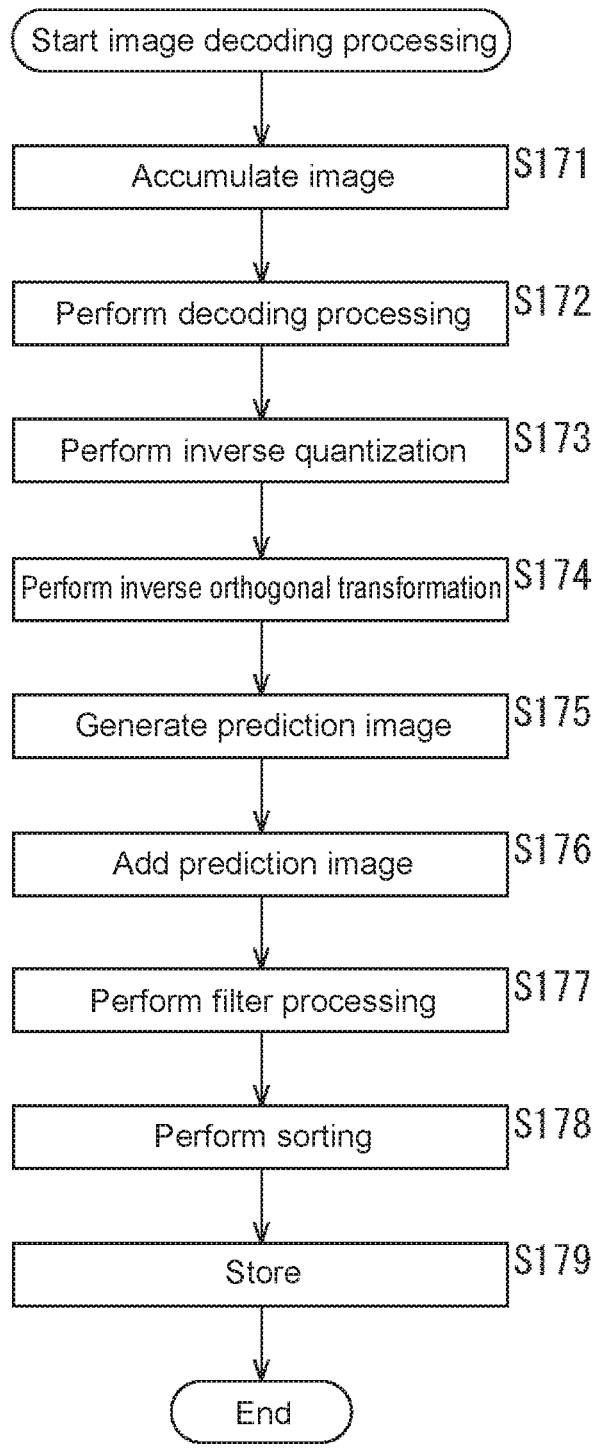
FIG. 19 is a flowchart describing an example of the flow of image decoding processing.

The respective processing of steps S226 to S232 is performed like the respective processing of steps S173 to S179 of FIG. 19. When the processing of step S232 ends, the image decoding processing ends.

By performing the image decoding processing as described above, the decoding device 411 can decode the bit stream generated by the coding device 113. Therefore, the decoding device 411 can suppress a reduction in coding efficiency and suppress an increase in load for decoding.

<3-3. Other>
<Reference Range>

Figure 28:
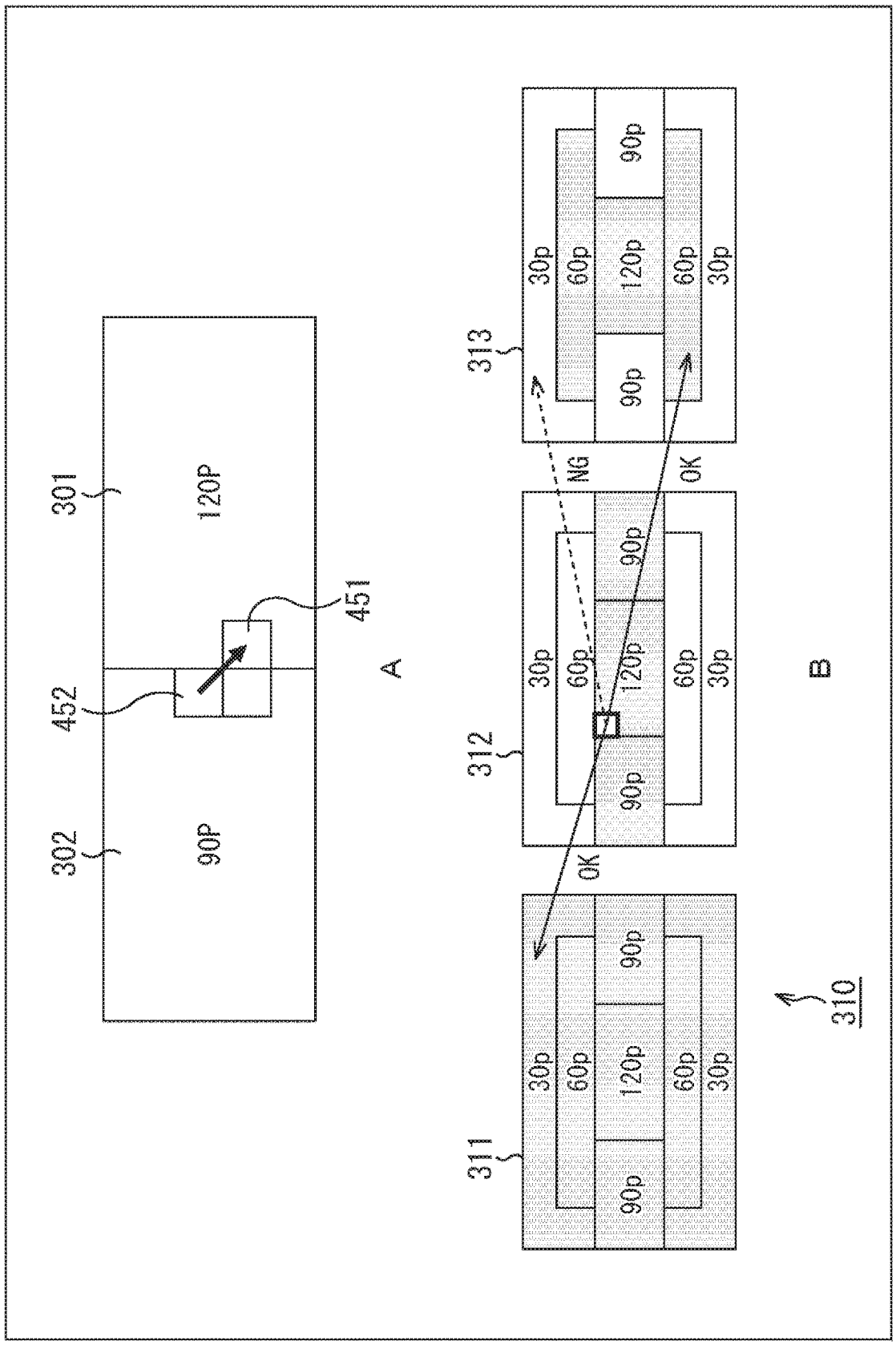
FIGS. 28A and 28B are diagrams each describing an example of a referring state.

In the case of the second embodiment, partial regions may not be tile sets as described above. Accordingly, reference may be made to other partial regions inside a picture as shown in FIG. 28A. For example, when a block 452 inside a partial region 302 is coded and decoded, reference may be made to a block 451 inside a partial region 301 to generate a prediction image. Further, when reference made to other frames, the reference may be made to partial regions different from its own partial region as shown in FIG. 28B. For example, when reference is made to a frame 311 and a frame 313 to encode and decode a block of a frame 312, the reference may be made to the blocks of arbitrary partial regions so long as the partial regions exist in the frames. Accordingly, compared with a case in which the HEVC is used as described in the first embodiment, a prediction constraint can be further reduced, prediction accuracy can be further improved, and coding efficiency can be further improved.

<Complementing Method>

Figure 29:
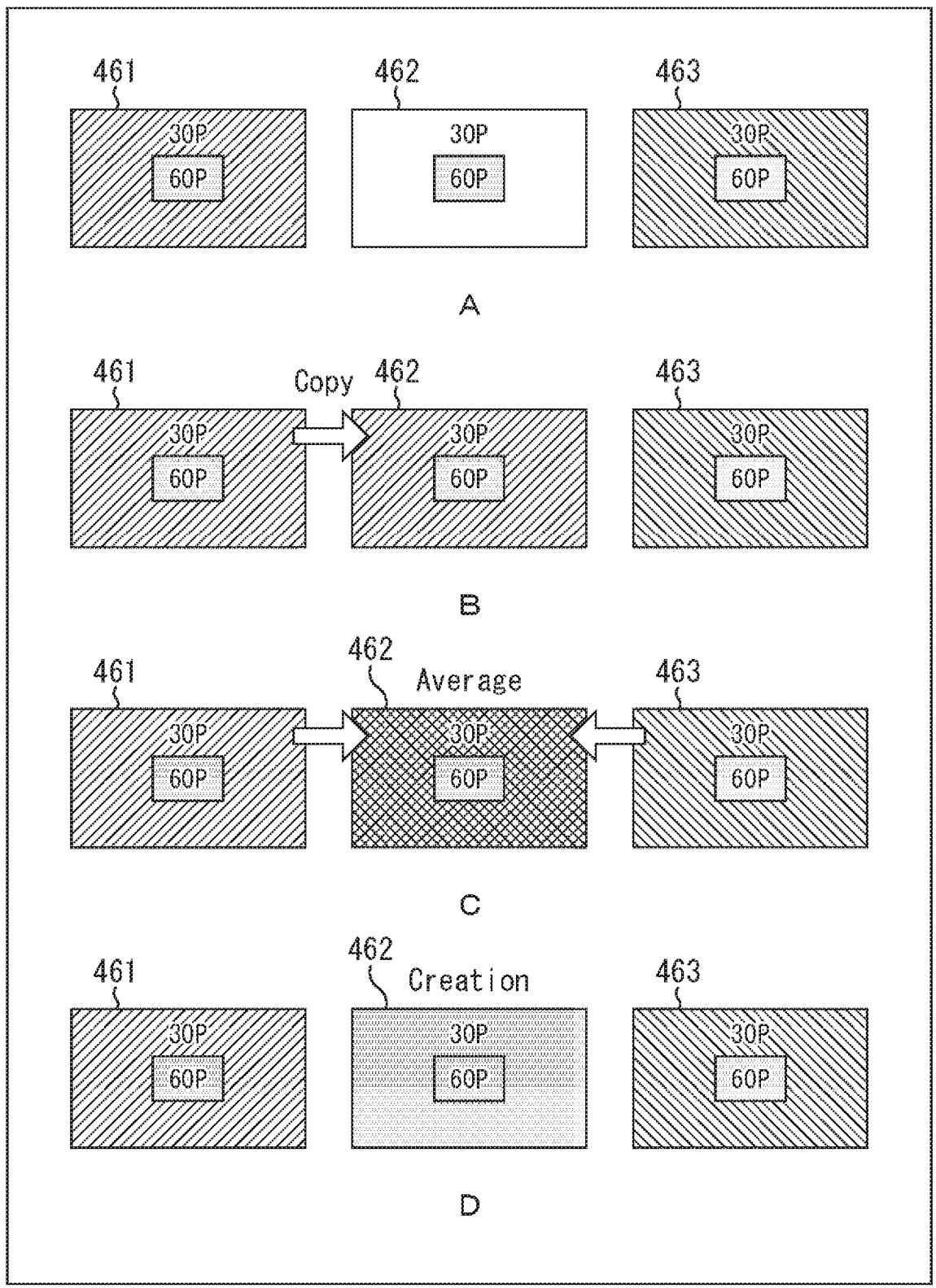
FIGS. 29A to 29D are diagrams each describing an example of a complemented state.

A complementing method performed by the decoding device 411 with respect to a region other than a partial region included in a current picture is arbitrarily. For example, when the region (the region 30p) of a frame 462 that is a current picture among successive frames 461 to 463 is complemented as shown in FIG. 29A, a reproduction of an image of another frame may be used as shown in FIG. 29B. A frame that serves as the source of the reproduction is arbitrarily. For example, a frame (for example, a frame 461 or a frame 462) adjacent to the frame 462 or a frame near the frame 462 may serve as the source of the reproduction.

Further, for example, an average of images of a plurality of other frames different from the current picture may be used to complement the region as shown in FIG. 29C. The frames used to calculate the average are arbitrarily. For example, the frames (the frame 461 and the frame 463) on the front and back sides of the frame 462 may be used, or frames other than the frames may be used.

In addition, as shown in, for example, FIG. 29D, a new image may be generated using, for example, motion flow or the like and used to complement the region.

Further, the complementing method may be variable. For example, a method selected from among a plurality of methods prepared in advance may be used. For example, any of a method in which a reproduction of an image of another picture different from the current picture is used, a method in which an average of images of a plurality of other pictures different from the current picture is used, and a method in which a newly generated image is used described above may be employed to complement the region.

In addition, for example, the complementing method may be designated from a coding side. That is, information related to the complementing method (for example, information for designating the complementing method) may be offered from the coding side to a decoding side. For example, the coding device 113 may cause the information related to the complementing method to be included in a bit stream. Then, the decoding device 411 may extract the information related to the complementing method from the bit stream and use the same to complement the region.

Thus, a more appropriate complementing method can be selected, and a reduction in subjective image quality can be further suppressed.

<Information Indicating Temporal Resolution>

Note that it is described in the second embodiment that information indicating the temporal resolution of partial regions is used as information indicating temporal resolution. However, level information set for each partial region may be used instead of the information indicating the temporal resolution of the partial regions like the case of the first embodiment. Further, information indicating pictures necessary for decoding the partial regions may be used.

<Bit Stream Conversion>

Further, it is described in the second embodiment that the decoding device 411 decodes a bit stream generated by the coding device 113. However, like the case of the first embodiment, a bit stream conversion device may extract the data of desired partial regions from the bit stream generated by the coding device 113 and generate the bit stream of the partial regions. By performing decoding after converting a bit stream as described above, the bit stream conversion device can suppress an increase in load for decoding like the case of the first embodiment.

<Decoding>

Conversely, in the first embodiment, the decoding device 133 may decode a bit stream generated by the coding device 113 like the case of the second embodiment. In the case of the first embodiment, the bit stream generated by the coding device 113 includes the data of all the partial regions of all frames. Accordingly, the decoding device 133 can decode arbitrary partial regions at arbitrary frame rates. For example, the decoding device 133 can also decode the data of the partial regions of pictures corresponding to temporal resolution.

4. Third Embodiment

<Bit Stream for Each Partial Region>

It is described in the first and second embodiments that the coding device 113 generates one bit stream. Besides, a bit stream may be generated for each partial region that controls temporal resolution. For example, the coding device 113 may set temporal resolution for each partial region of image data to be coded and generate the bit stream of the set temporal resolution for each partial region. That is, the data of the respective partial regions may be stored in bit streams different from each other and transmitted.

Figure 30:
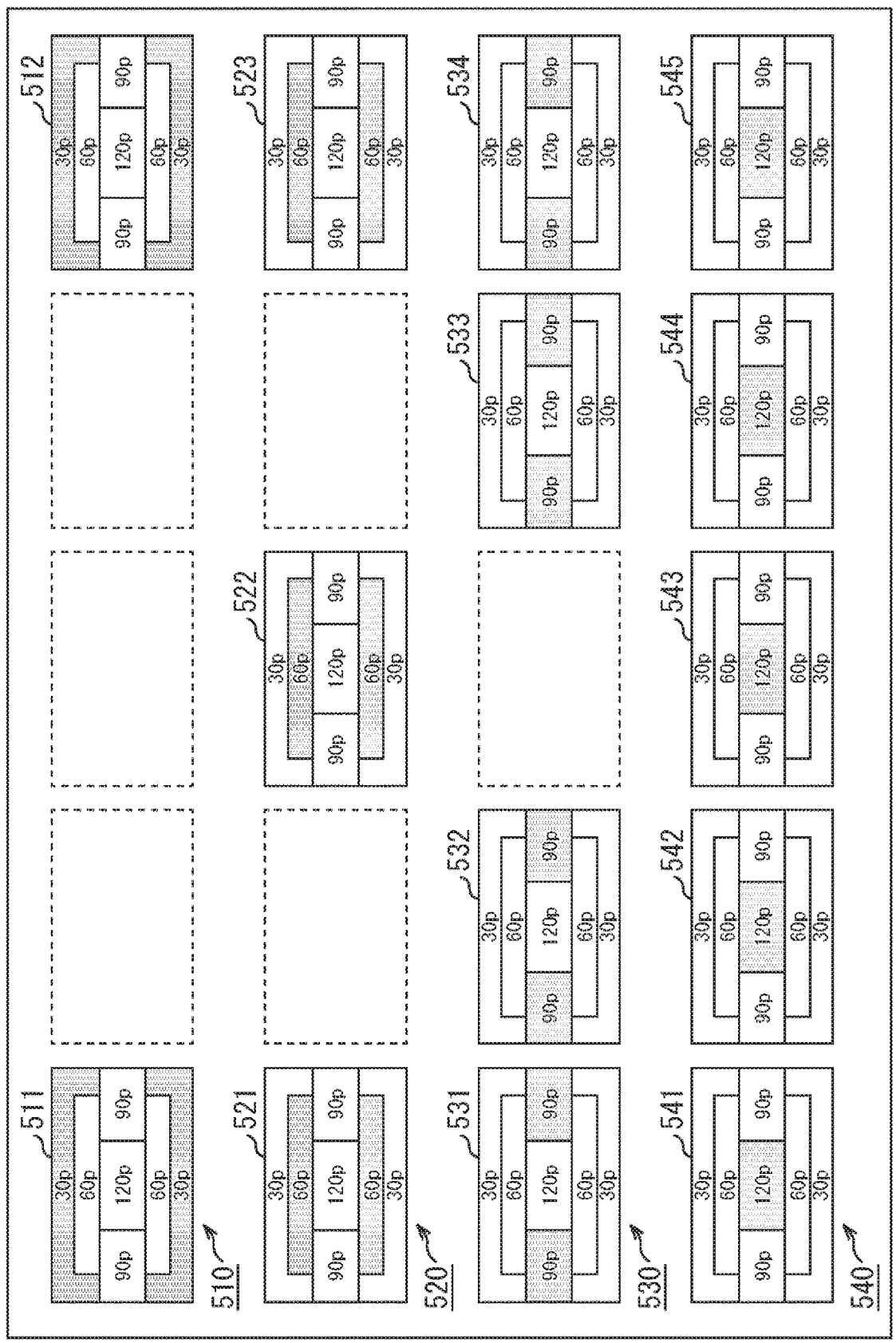
FIG. 30 is a diagram showing an example of a bit stream.

FIG. 30 shows a configuration example of bit streams in this case. As shown in FIG. 30, the four bit streams of a bit stream 510, a bit stream 520, a bit stream 530, and a bit stream 540 are generated in this case. The bit stream 510 is the bit stream of partial regions having a frame rate of 30 p and has frames thinned out by one-fourth of original frames as shown in a frame 511 and a frame 512. The bit stream 520 is the bit stream of partial regions having a frame rate of 60 p and has frames thinned out by one-half of the original frames as shown in frames 521 to 523. The bit stream 530 is the bit stream of partial regions having a frame rate of 90 p and has frames thinned out by three-quarters of the original frames as shown in a frame 531 to a frame 534. The bit stream 540 is the bit stream of partial regions having a frame rate of 120 p and has the original frames as shown in a frame 541 to a frame 545.

Thus, the coding device 113 can generate the bit streams of respective partial regions with the temporal resolution of the partial regions. Such bit streams may be transmitted (offered) using a standard such as, for example, MPEG-DASH (Moving Picture Experts Group phase—Dynamic Adaptive Streaming over HTTP). For example, in the case of the MPEG-DASH, the positional relationships between respective bit streams (between partial regions) are managed by MPD (Media Presentation Description). Thus, only bit streams necessary for reproduction can be offered, and an increase in load for transmitting data can be suppressed.

Note that like the cases of the first and second embodiments, the coding device 113 may set such partial regions and set the temporal resolution of the set respective partial regions to generate a bit stream for each of the set partial regions. Further, the partial regions may be separately decodable tile sets. Further, data as an object to be coded and decoded is arbitrarily like the cases of the first and second embodiments. For example, a plane image in which an omnidirectional image is developed or a plane image in which a six-way image is developed may be set as an object to be coded. In addition, the setting of temporal resolution with respect to partial regions is the same as that of the first and second embodiments. Thus, the same effects as those of the first and second embodiments can be obtained.

5. Other

<Object to Be Coded>

The above description refers to a case in which a VR moving image is coded, but as image as an object to be coded may be any object. The present technology is applicable to the coding, decoding, bit stream conversion, or the like of arbitrary images. For example, in the case of a VR moving image described above, a plane image in which a plurality of moving images captured by a plurality of cameras is arranged side by side on a plane is set as an object to be coded. However, a single moving image captured by a single camera may be set as an object to be coded. For example, the present technology may be applied to a monitoring camera system or the like. In this case, with the temporal resolution of a noticeable region (a region having high importance) in which an object to be monitored such as a suspicious-looking person exists kept high, the temporal resolution of a region having low importance other than the noticeable region may be reduced.

Note that (the positions, shapes, sizes, or the like of) partial regions that control temporal resolution and their temporal resolution may be variable in a temporal direction. That is, the positions, shapes, sizes, or the like of the partial regions and their temporal resolution may be changed with time. For example, when the present technology is applied to a monitoring camera system or the like, a noticeable region may be moved and deformed with the movement of an object to be monitored. Further, in the case of a VR moving image described above as well, the temporal resolution of respective regions may be changed with a change in user's visual line direction or viewpoint position.

When regions, temporal resolution, or the like is changed as described above, a sequence may be divided to newly set regions, temporal resolution, or the like in a new sequence parameter set, a SEI, or the like. However, the regions, temporal resolution, or the like may be updated in a picture parameter set.

Further, the above description refers to a case in which a captured image (a plane image generated from a captured image) is set as an object to be coded. However, an image set as an object to be coded is arbitrarily. For example, an image other than a captured image such as a CG (Computer Graphics) and an animation image may be an object to be coded.

<Control>

Note that the application of the present technology described above may be controlled. For example, the setting of temporal resolution with respect to partial regions may be controlled on the basis of user's instructions or the like. Further, temporal resolution may be set with respect to partial regions only when a prescribed condition is satisfied such as when a target bit rate is low.

Further, control information related to the application of the present technology may be transmitted from a coding side to a decoding side. The control information may be any information so long as the control information is related to the application of the present technology. For example, information (permission control information) for controlling the permission (or prohibition) of the setting of temporal resolution with respect to partial regions, information (execution control information) for controlling the execution of the setting of temporal resolution with respect to partial regions, information (parameter restriction information) for restricting parameter values such as temporal resolution, information for setting the conditions of execution or determination, or the like may be transmitted from a coding side to a decoding side.

<Coding and Decoding System>

For example, the present technology is applicable to a multi viewpoint image coding and decoding system that codes and decodes a multi viewpoint image including images of a plurality of viewpoints (views) or a hierarchical image coding (scalable coding) and decoding system that codes and decodes a hierarchical image made into a plurality of layers (hierarchized) so as to have a scalability function for a prescribed parameter.

<Applied Fields of Present Technology>

The present technology is applicable to, for example, systems, apparatuses, processing units, or the like used in arbitrary fields such as traffic, medical care, security, agriculture, livestock industry, mining industry, cosmetics, factories, home appliances, weather, and nature monitoring so long as the systems, apparatuses, processing units, or the like process images.

For example, the present technology is also applicable to systems or devices for viewing. Further, for example, the present technology is also applicable to systems or devices for traffic management. In addition, for example, the present technology is also applicable to systems or devices for security. Further, for example, the present technology is also applicable to systems or devices for sports. In addition, for example, the present technology is also applicable to systems or devices for agriculture. Further, for example, the present technology is also applicable to systems or devices for livestock industry. In addition, the present technology is also applicable to, for example, systems or devices for monitoring the states of nature such as volcanos, forests, and oceans. Further, the present technology is also applicable to, for example, weather observation systems or weather observation apparatuses that observe weather, temperature, humidity, wind speed, hours of sunshine, or the like. In addition, the present technology is also applicable to, for example, systems, devices, or the like that observe the ecology of wildlife such as birds, fishes, reptiles, amphibia, mammal, insects, and plants.

<Computer>

The series of processing described above can be performed not only by hardware but also by software. When the series of processing is performed by software, a program constituting the software is installed in a computer. Here, examples of the computer include a computer incorporated into dedicated hardware, a general-purpose personal computer that is capable of performing various functions with the installation of various programs, or the like.

Figure 31:
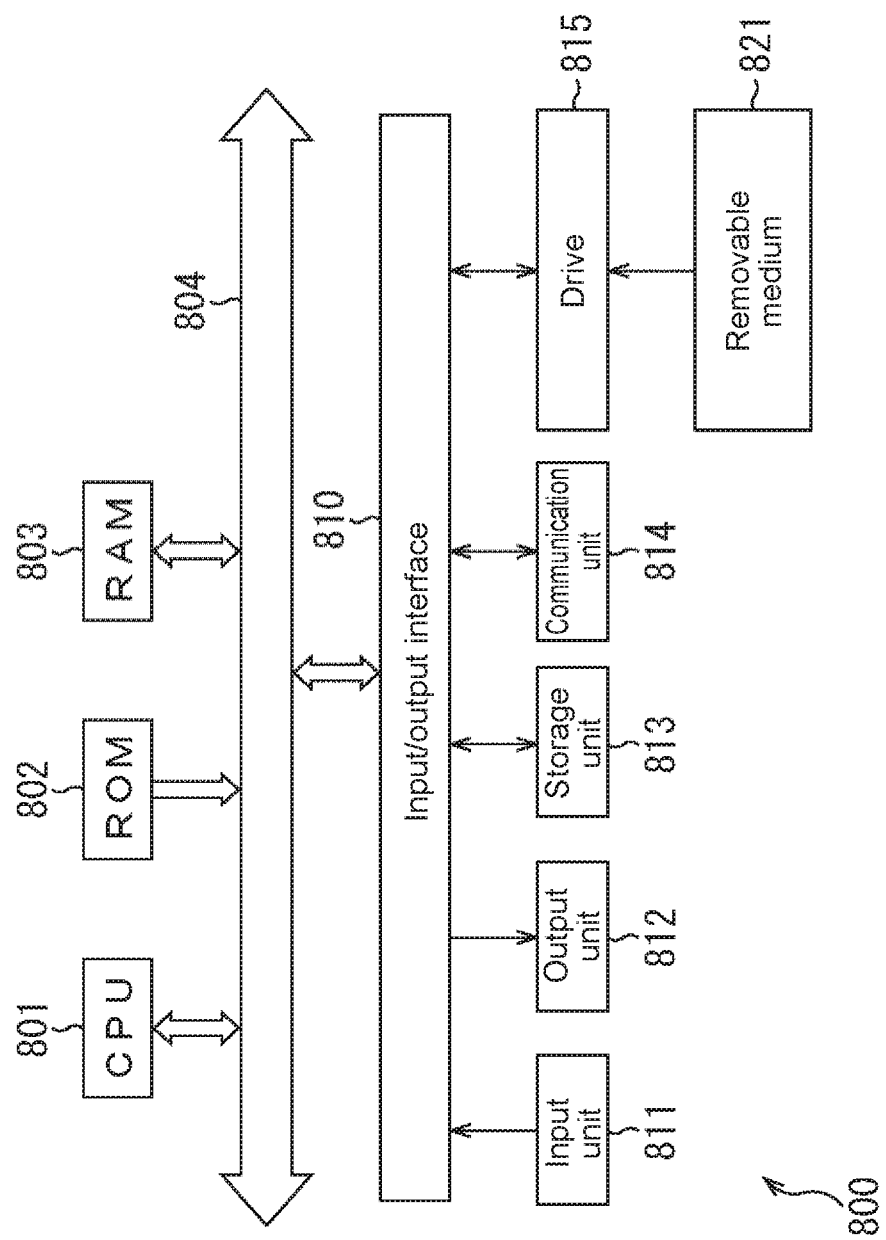
FIG. 31 is a block diagram showing a main configuration example of a computer.

FIG. 31 is a block diagram showing a hardware configuration example of a computer that performs the series of processing described above with a program.

In computer 800 shown in FIG. 31, a CPU (Central Processing Unit) 801, a ROM (Read Only Memory) 802, and a RAM (Random Access Memory) 803 are connected to each other via a bus 804.

An input/output interface 810 is also connected to the bus 804. An input unit 811, an output unit 812, a storage unit 813, a communication unit 814, and a drive 815 are connected to the input/output interface 810.

The input unit 811 is composed of, for example, a keyboard, a mouse, a microphone, a touch panel, an input terminal, or the like. The output unit 812 is composed of, for example, a display, a speaker, an output terminal, or the like. The storage unit 813 composed of, for example, a hard disk, a RAM disk, a non-volatile memory, or the like. The communication unit 814 is composed of, for example, a network interface. The drive 815 drives a removable medium 821 such as a magnetic disk, an optical disk, a magnetic optical disk, and a semiconductor memory.

In the computer configured as described above, the series of processing described above is performed, for example, when the CPU 801 loads a program stored in the storage unit 813 into the RAM 803 via the input/output interface 810 and the bus 804 and performs the loaded program. In the RAM 803, data or the like necessary when the CPU 801 performs various processing is appropriately stored.

The program to be performed by the computer (CPU 801) can be recorded on, for example, the removable medium 821 serving as a package medium to be applied. In this case, the program can be installed in the storage unit 813 via the input/output interface 810 by the attachment of the removable medium 821 to the drive 815. Further, the program can also be offered via a wired or wireless transmission medium such as a local area network, the Internet, and digital satellite broadcasting. In this case, the program can be received by the communication unit 814 and installed in the storage unit 813. Besides, the program can also be installed in the ROM 802 or the storage unit 813 in advance.

Note that some of the series of processing described above can be performed by hardware, and the other thereof can be performed by software.

<Application of Present Technology>

The present technology is applicable to, for example, various electronic appliances such as transmitters and receivers for use in distribution on satellite broadcasting, wired broadcasting such as cable TV, and the Internet, distribution to terminals via cellular communication, or the like, recording apparatuses that record images on media such as optical disks, magnetic disks, and flash memories, and reproduction apparatuses that reproduce images from the storage media.

Figure 32:
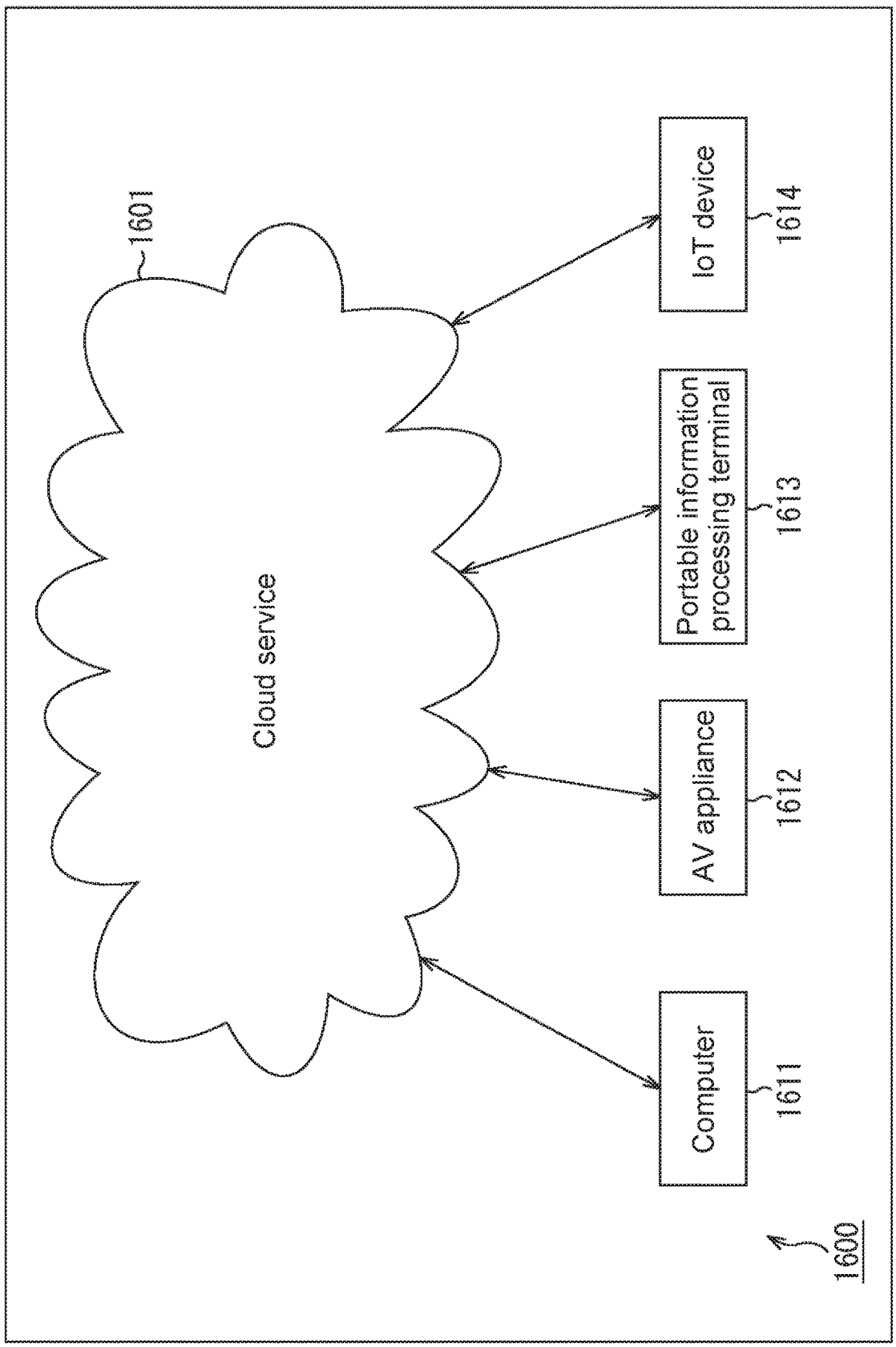
FIG. 32 is a block diagram showing a schematic configuration example of a network system.

For example, the present technology is also applicable to network systems constituted by a plurality of apparatuses. FIG. 32 shows a schematic configuration example of a network system to which the present technology is applied.

A network system 1600 shown in FIG. 32 is a system in which appliances give and receive information related to images (moving images) via a network. A cloud service 1601 of the network system 1600 is a system that offers services related to images (moving images) to terminals such as a computer 1611, an AV (Audio Visual) appliance 1612, a portable information processing terminal 1613, and an IoT (Internet of Things) device 1614 communicably connected to the cloud service 1601 itself. For example, the cloud service 1601 offers a content supply service of images (moving images) such as so-called moving image distribution (on-demand or live distribution) to a terminal. Further, for example, the cloud service 1601 offers a backup service in which image (moving image) contents are received from a terminal and managed. Further, for example, the cloud service 1601 offers a service in which giving and reception of image (moving image) contents between terminals are mediated.

The physical configuration of the cloud service 1601 is arbitrarily. For example, the cloud service 1601 may have various servers such as a server that stores and manages moving images, a server that distributes moving images to terminals, a server that acquires moving images from terminals, and a server that manages users (terminals) or charging, and arbitrary networks such as the Internet and a LAN.

The computer 1611 is constituted by, for example, an information processing apparatus such as a personal computer, a server, and a workstation. The AV appliance 1612 is constituted by, for example, an image processing device such as a television receiver, a hard disk recorder, a video game machine, and a camera. The portable information processing terminal 1613 is constituted by, for example, a portable information processing apparatus such as a notebook personal computer, a tablet terminal, a portable telephone, and a smart phone. The IoT device 1614 is constituted by, for example, an arbitrary object such as a machine, a home electric appliance, furniture, any other article, an IC tag, and a card type device that performs processing related to images. Each of these terminals has a communication function, is connected to the cloud service 1601 (establishes a session), and is capable of giving and receiving information to and from (that is, is capable of performing communication with) the cloud service 1601. Further, the respective terminals are capable of performing communication each other. The communication between the terminals may be performed via the cloud service 1601 or may be performed without the cloud service 1601.

In the network system 1600 as described above, the present technology may be applied to cases in which the coded data of moving images is given and received between the terminals or between the terminals and the cloud service 1601.

For example, when the cloud service 1601 offers a VR moving image and then the terminals acquire and reproduce the VR moving image, the cloud service 1601 may offer a bit stream obtained by coding image data in which temporal resolution is set for each partial region as described in the above respective embodiments to the terminals as the VR moving image. Thus, since an information amount can be controlled using temporal resolution for each partial region, a reduction in coding efficiency can be suppressed. As a result, a retained data amount can be reduced or an increase in load on coding and transmission (processing amount, buffer amount, processing time, or the like) can be suppressed in the cloud service 1601 that offers the VR moving image. Further, an increase in load (occupancy ratio, occupancy time, or the like) on a transmission medium (such as a network) can be suppressed. In addition, an increase in load (processing amount, buffer amount, processing time, or the like) on reception or decoding can be suppressed in the terminals that receive the VR moving image.

<Supplement>

Note that various information (such as meta data) related to coded data (bit stream) may be transmitted or recorded in any form so long as the association of the various information with the coded data is established. Here, the term "association" represents, for example, a condition that the other data can be used (linked) when one data is processed. That is, the data items associated with each other may be put together as one data or handled as separate data items. For example, information associated with the coded data (image) may be transmitted on a transmission path different from that of the coded data (image). Further, for example, the information associated with the coded data (image) may be recorded on a recording medium different from that of the coded data (image) (or may be recorded on another recording area of the same recording medium). Note that the "association" may be performed with respect to part of the data rather than being performed with respect to the whole data. For example, an image and information corresponding to the image may be associated with each other in an arbitrary unit such as a plurality of frames, one frame, and a part of a frame.

Further, in the present specification, terms such as "synthesis," "multiplication," "addition," "integration," "inclusion," "storage," "incorporation," "putting," and "insertion" represent, for example, putting a plurality of materials into one such as putting coded data and meta data into one data, and represents one method of the "association" described above.

Further, the embodiments of the present technology are not limited to the embodiments described above but may be modified in various ways without departing from the spirit of the present technology.

Further, for example, the present technology can also be performed as any configuration constituting an apparatus or a system, for example, a processor serving as a system LSI (Large Scale Integration) or the like, a module using a plurality of processors or the like, a unit using a plurality of modules or the like, a set (that is, some of the configurations of the apparatus) in which other functions are added to the unit, or the like.

Note that the system in the present specification represents the aggregate of a plurality of constituents (such as apparatuses and modules (components)), and all the constituents may not be necessarily included in the same housing. Accordingly, both a plurality of apparatuses accommodated in separate housings and connected to each other via a network and one apparatus in which a plurality of modules is accommodated in one housing are the systems.

Further, for example, the configuration described as one apparatus (or one processing unit) may be divided and configured as a plurality of apparatuses (or processing units). Conversely, the configurations described above as a plurality of apparatuses (or processing units) may be collectively configured as one apparatus (processing unit). Further, configurations other than the configurations described above may be, of course, added to the configurations of respective apparatuses (or respective processing units). In addition, some of the configurations of one apparatus (one processing unit) may be included in the configurations of other apparatuses (or other processing units) so long as configurations or operations are substantially the same as the whole system.

Further, for example, the present technology can employ the configuration of cloud computing in which one function is shared and cooperatively processed between a plurality of apparatuses via a network.

Further, for example, the program described above can be performed in an arbitrary apparatus. In this case, the apparatus may only have necessary functions (function blocks or the like) and obtain necessary information.

Further, for example, the respective steps in the flowcharts described above can be performed not only by one apparatus but also by a plurality of apparatus is a shared fashion. In addition, when one step includes a plurality of processing, the plurality of processing included in the one step can be performed not only by one apparatus but also by a plurality of apparatuses in a shared fashion. In other words, a plurality of processing included in one step can be performed as the processing of a plurality of steps. Conversely, the processing described as a plurality of steps can be collectively performed as one step.

Note that a program performed by a computer may be a program in which the processing of steps describing the program is chronologically performed in order described in the present specification, or may be a program that is separately performed in parallel or at a necessary timing such as when invoked. That is, the processing of the respective steps may be performed in order different from the order described above unless any contradiction arises. In addition, the processing of the 6 describing the program may be performed in parallel with the processing of other programs, or may be performed in combination with the processing of other programs.

Note that the present technology described in the present specification a plurality of times can be separately performed unless any contradiction arises. Of course, a plurality of the arbitrary present technologies can be performed in combination with each other. For example, some or the whole of present technology described in any of the embodiments can be performed in combination with some or the whole of the present technology described in any other embodiment. Further, some or the whole of the arbitrary present technology described above can be performed in combination with other technologies not described above.

Note that the present technology can also employ the following configurations.

(1) An image processing device including:

a temporal resolution setting unit setting temporal resolution for each of partial regions of image data to be coded; and a coding unit coding the image data to generate a bit stream including information indicating the temporal resolution for each of the partial regions set by the temporal resolution setting unit.

(2) The image processing device according to (1), in which the partial regions are separately decodable tile sets.

(3) The image processing device according to (1) or (2), in which the bit stream includes information related to the partial regions.

(4) The image processing device according to (3), in which the information related to the partial regions is MCTS SEI (Motion constrained tile set Supplemental Enhancement Information).

(5) The image processing device according to any of (1) to (4), further including:

a partial region setting unit setting the partial regions, in which the temporal resolution setting unit is configured to set temporal resolution of the respective partial regions set by the partial region setting unit.

(6) The image processing device according to any of (1) to (5), in which the information indicating the temporal resolution includes a temporal ID set for each of pictures of the image data.

(7) The image processing device according to any of (1) to (6), in which the information indicating the temporal resolution includes level information set for each of the partial regions.

(8) The image processing device according to any of (1) to (6), in which the information indicating the temporal resolution includes information indicating pictures necessary when the partial regions are decoded.

(9) The image processing device according to any of (1) to (8), is which the image data is data of a plane image in which an omnidirectional image rendered in a spherical shape about a viewpoint is developed on a single plane.

(10) The image processing device according to (9), in which the temporal resolution setting unit makes the temporal resolution higher at partial regions at positions closer to a center of the plane image in which the omnidirectional image is developed.

(11) The image processing device according to (10), in which the temporal resolution setting unit makes the temporal resolution higher at partial regions at positions closer to the center in a vertical direction of the plane image in which the omnidirectional image is developed.

(12) The image processing device according to (11), in which the temporal resolution setting unit makes the temporal resolution at partial regions near an upper end of the plane image in which the omnidirectional image is developed higher than the temporal resolution at partial regions near a lower end of the plane image.

(13) The image processing device according to any of (1) to (8), in which the image data is data of a plane image in which plane images in six directions orthogonal to each other about a viewpoint are developed on a single plane.

(14) The image processing device according to (13), in which the temporal resolution setting unit makes the temporal resolution of a plane image on a front side when seen from the viewpoint among the six directions higher than the temporal resolution of plane images in other directions.

(15) The image processing device according to (14), in which the temporal resolution setting unit makes the temporal resolution of plane images on a left side, a right side, and a back side when seen from the viewpoint among the six directions higher than the temporal resolution of plane images on a top side and a bottom side when seen from the viewpoint.

(16) The image processing device according to (15), in which the temporal resolution setting unit makes the temporal resolution of the plane images on the left side and the right side when sees from the viewpoint among the six directions higher than the temporal resolution of the plane image on the back side when seen from the viewpoint.

(17) The image processing device according to (16), in which the temporal resolution setting unit makes the temporal resolution of the plane image on the top side when seen from the viewpoint among the six directions higher than the temporal resolution of the plane image on the bottom side when seen from the viewpoint.

(18) An image processing method including:

setting temporal resolution for each of partial regions of image data to be coded; and coding the image data to generate a bit stream including information indicating the temporal resolution for each of the set partial regions.

(21) An image processing device including:

an analysis unit analyzing information indicating temporal resolution for each of partial regions of image data, the information being included in a bit stream in which the image data is coded.

(22) The image processing device according to (21), in which the partial regions are separately decodable tile sets.

(23) The image processing device according to (21) or (22), in which the bit stream includes information related to the partial regions.

(24) The image processing device according to (23), in which the information related to the partial regions is MCTS SET (Motion constrained tile set Supplemental Enhancement Information).

(25) The image processing device according to any of (21) to (24), in which the information indicating the temporal resolution includes a temporal ID set for each of pictures of the image data.

(26) The image processing device according to any of (21) to (25), in which the information indicating the temporal resolution includes level information set for each of the partial regions.

(27) The image processing device according to any of (21) to (25), in which the information indicating the temporal resolution includes information indicating pictures necessary when the partial regions are decoded.

(28) The image processing device according to any of (21) to (27), in which the image data is data of a plane image in which an omnidirectional image rendered in a spherical shape about a viewpoint is developed on a single plane.

(29) The image processing device according to (28), in which the temporal resolution at partial regions at positions closer to a center of the plane image in which the omnidirectional image is developed is set to be higher in the image data.

(30) The image processing device according to (29), in which the temporal resolution at partial regions at positions closer to the center in a vertical direction of the plane image in which the omnidirectional image is developed is set to be higher in the image data.

(31) The image processing device according to (30), in which the temporal resolution at partial regions near an upper end of the plane image in which the omnidirectional image is developed is set to be higher than the temporal resolution at partial regions near a lower end of the plane image in the image data.

(32) The image processing device according to any of (21) to (27), in which the image data is data of a plane image in which plane images in six directions orthogonal to each other about a viewpoint are developed on a single plane.

(33) The image processing device according to (32), in which the temporal resolution of a plane image on a front side when seen from the viewpoint among the six directions is set to be higher than the temporal resolution of plane images in other directions in the image data.

(34) The image processing device according to (33), in which the temporal resolution of plane images on a left side, a right side, and a back side when seen from the viewpoint among the six directions is set to be higher than the temporal resolution of plane images on a top side and a bottom side when seen from the viewpoint in the image data.

(35) The image processing device according to (34), in which the temporal resolution of the plane images on the left side and the right side when seen from the viewpoint among the six directions is set to be higher than the temporal resolution of the plane image on the back side when seen from the viewpoint in the image data.

(36) The image processing device according to (35), in which the temporal resolution of the plane image on the top side when seen from the viewpoint among the six directions is set to be higher than the temporal resolution of the plane image on the bottom side when seen from the viewpoint in the image data.

(37) The image processing device according to any of (21) to (36), further including:

a data extraction unit extracting data of a desired partial region from the bit stream in accordance with an analysis result of the analysis unit; and a bit stream generation unit generating a bit stream including the data of the partial region extracted by the data extraction unit.

(38) The image processing device according to (37), in which the data extraction unit extracts the data of the partial region from the pictures corresponding to the temporal resolution.

(39) The image processing device according to any of (21) to (36), further including:

a decoding unit decoding data of a desired partial region from the bit stream in accordance with an analysis result of the analysis unit.

(40) The image processing device according to (39), in which the decoding unit decodes the data of the partial regions of the pictures corresponding to the temporal resolution.

(41) An image processing method including:

analyzing information indicating temporal resolution for each of partial regions of image data, the information being included in a bit stream in which the image data is coded.

(51) An image processing device including:

a temporal resolution setting unit setting temporal resolution for each of partial regions of image data to be coded; and a coding unit coding the image data to generate a bit stream including information indicating the temporal resolution for each of the partial regions set by the temporal resolution setting unit.

(52) The image processing device according to (51), further including:

a partial region setting unit setting the partial regions, in which the temporal resolution setting unit is configured to set temporal resolution of the respective partial regions set by the partial region setting unit.

(53) The image processing device according to (51) or (52), in which the bit stream includes information related to the partial regions.

(54) The image processing device according to any of (51) to (53), is which the partial regions are separately decodable tile sets.

(55) The image processing device according to any of (51) to (54), in which the information indicating the temporal resolution includes a temporal ID set for each of the partial regions.

(56) The image processing device according to any of (51) to (54), in which the information indicating the temporal resolution includes level information set for each of the partial regions.

(57) The image processing device according to any of (51) to (54), in which the information indicating the temporal resolution includes information indicating pictures necessary when the partial regions are decoded.

(58) The image processing device according to any of (51) to (57), in which the image data is data of a plane image in which an omnidirectional image rendered in a spherical shape about a viewpoint is developed on a single plane.

(59) The image processing device according to (58) in which the temporal resolution setting unit makes the temporal resolution higher at partial regions at positions closer to a center of the plane image in which the omnidirectional image is developed.

(60) The image processing device according to (59), in which the temporal resolution setting unit makes the temporal resolution higher at partial regions at positions closer to the center in a vertical direction of the plane image in which the omnidirectional image is developed.

(61) The image processing device according to (60), in which the temporal resolution setting unit makes the temporal resolution at partial regions near an upper end of the plane image in which the omnidirectional image is developed higher than the temporal resolution at partial regions near a lower end of the plane image.

(62) The image processing device according to any of (51) to (57), in which the image data is data of a plane image in which plane images in six directions orthogonal to each other about a viewpoint are developed on a single plane.

(63) The image processing device according to (62), in which the temporal resolution setting unit makes the temporal resolution of a plane image on a front side when seen from the viewpoint among the six directions higher than the temporal resolution of plane images in other directions.

(64) The image processing device according to (63), in which the temporal resolution setting unit makes the temporal resolution of plane images on a left side, a right side, and a back side when seen from the viewpoint among the six directions higher than the temporal resolution of plane images on a top side and a bottom side when seen from the viewpoint.

(65) The image processing device according to (64), in which the temporal resolution setting unit makes the temporal resolution of the plane images on the left side and the right side when seen from the viewpoint among the six directions higher than the temporal resolution of the plane image on the back side when seen from the viewpoint.

(66) The image processing device according to (65), in which the temporal resolution setting unit makes the temporal resolution of the plane image on the top side when seen from the viewpoint among the six directions higher than the temporal resolution of the plane image on the bottom side when seen from the viewpoint.

(67) The image processing device according to any of (51) to (66), in which the coding unit codes a partial region included in a current picture with respect to the respective pictures of the image data on the basis of the temporal resolution for each of the partial regions set by the temporal resolution setting unit.

(68) The image processing device according to (67), in which the bit stream includes information related to a method for complementing a region other than the partial regions of the pictures during the decoding.

(69) An image processing method including:

setting temporal resolution for each of partial regions of image data to be coded; and coding the image data to generate a bit stream including information indicating the temporal resolution for each of the set partial regions.

(71) An image processing device including:

an analysis unit analyzing information indicating temporal resolution for each of partial regions of image data, the information being included in a bit stream in which the image data is coded.

(72) The image processing device according to (71), in which the bit stream includes information related to the partial regions.

(73) The image processing device according to (71) or (72), in which the partial regions are separately decodable tile sets.

(74) The image processing device according to any of (71) to (73), in which the information indicating the temporal resolution includes a temporal ID set for each of the partial regions.

(75) The image processing device according to any of (71) to (73), in which the information indicating the temporal resolution includes level information set for each of the partial regions.

(76) The image processing device according to any of (71) to (73), in which the information indicating the temporal resolution includes information indicating pictures necessary when the partial regions are decoded.

(77) The image processing device according to any of (71) to (76), in which the image data is data of a plane image in which an omnidirectional image rendered in a spherical shape about a viewpoint is developed on a single plane.

(78) The image processing device according to (77), in which the temporal resolution at partial regions at positions closer to a center of the plane image in which the omnidirectional image is developed is set to be higher in the image data.

(79) The image processing device according to (78), in which the temporal resolution at partial regions at positions closer to the center in a vertical direction of the plane image in which the omnidirectional image is developed is set to be higher in the image data.

(80) The image processing device according to (79), in which the temporal resolution at partial regions near an upper end of the plane image in which the omnidirectional image is developed is set to be higher than the temporal resolution at partial regions near a lower end of the plane image in the image data.

(81) The image processing device according to any of (71) to (76), in which the image data is data of a plane image in which plane images in six directions orthogonal to each other about a viewpoint are developed on a single plane.

(82) The image processing device according to (81), in which the temporal resolution of a plane image on a front side when seen from the viewpoint among the six directions is set to be higher than the temporal resolution of plane images in other directions in the image data.

(83) The image processing device according to (82), in which the temporal resolution of plane images on a left side, a right side, and a back side when seen from the viewpoint among the six directions is set to be higher than the temporal resolution of plane images on a top side and a bottom side when seen from the viewpoint in the image data.

(84) The image processing device according to (83), in which the temporal resolution of the plane images on the left side and the right side when seen from the viewpoint among the six directions is set to be higher than the temporal resolution of the plane image on the back side when seen from the viewpoint in the image data.

(85) The image processing device according to (84), in which the temporal resolution of the plane image on the top side when seen from the viewpoint among the six directions is set to be higher than the temporal resolution of the plane image on the bottom side when seen from the viewpoint in the image data.

(86) The image processing device according to any of (71) to (85), further including:

a decoding unit decoding coded data of a desired partial region among coded data of the image data included in the bit stream in accordance with an analysis result of the analysis unit.

(87) The image processing device according to (86), in which the decoding unit decodes coded data of a partial region included in a current picture with respect to the respective pictures of image data on the basis of the temporal resolution for each of the partial regions analyzed by the analysis unit.

(88) The image processing device according to (87), in which the decoding unit complements a region other than the partial region of a current picture.

(89) The image processing device according to (88), in which the decoding unit complements the region other than the partial region of the current picture using a reproduction of an image of another picture different from the current picture, an average of images of a plurality of other pictures different from the current picture, and a newly generated image.

(90) The image processing device according to (88), in which the decoding unit complements the region other than the partial region of the current picture using a method corresponding to information related to a method for complementing the region other than the partial region of the current picture, the information being included in the bit stream.

(91) The image processing device according to any of (71) to (85), further including:

a data extraction unit extracting data of a desired partial region from the bit stream in accordance with an analysis result of the analysis unit; and a bit stream generation unit generating a bit stream including the data of the partial region extracted by the data extraction unit.

(92) An image processing method including:

analyzing information indicating temporal resolution for each of partial regions of image data, the information being included in a bit stream in which the image data is coded.

(101) An image processing device including:

a temporal resolution setting unit setting temporal resolution for each of partial regions of image data to be coded; and a coding unit generating a bit stream of the temporal resolution set by the temporal resolution setting unit for each of the partial regions.

(102) The image processing device according to (101), further including:

a partial region setting unit setting the partial regions, in which the temporal resolution setting unit is configured to set temporal resolution of the respective partial regions set by the partial region setting unit, and the coding unit is configured to generate the bit stream for each of the partial regions set by the partial region setting unit.

(103) The image processing device according to (101) or (102), in which the partial regions are separately decodable tile sets.

(104) The image processing device according to any of (101) to (103), in which the image data is data of a plane image in which an omnidirectional image rendered in a spherical shape about a viewpoint is developed on a single plane.

(105) The image processing device according to (104), in which
the temporal resolution setting unit makes the temporal resolution higher at partial regions at positions closer to a center of the plane image in which the omnidirectional image is developed.

(106) The image processing device according to (105), in which
the temporal resolution setting unit makes the temporal resolution higher at partial regions at positions closer to the center in a vertical direction of the plane image in which the omnidirectional image is developed.

(107) The image processing device according to (106), in which
the temporal resolution setting unit makes the temporal resolution at partial regions near an upper end of the plane image in which the omnidirectional image is developed higher than the temporal resolution at partial regions near a lower end of the plane image.

(108) The image processing device according to any of (101) to (103), in which
the image data is data of a plane image in which plane images in six directions orthogonal to each other about a viewpoint are developed on a single plane.

(109) The image processing device according to (108), in which
the temporal resolution setting unit makes the temporal resolution of a plane image on a front side when seen from the viewpoint among the six directions higher than the temporal resolution of plane images in other directions.

(110) The image processing device according to (109), in which
the temporal resolution setting unit makes the temporal resolution of plane images on a left side, a right side, and a back side when seen from the viewpoint among the six directions higher than the temporal resolution of plane images on a top side and a bottom side when seen from the viewpoint.

(111) The image processing device according to (110), in which
the temporal resolution setting unit makes the temporal resolution of the plane images on the left side and the right side when sees from the viewpoint among the six directions higher than the temporal resolution of the plane image on the back side when seen from the viewpoint.

(112) The image processing device according to (111), in which
the temporal resolution setting unit makes the temporal resolution of the plane image on the top side when seen from the viewpoint among the six directions higher than the temporal resolution of the plane image on the bottom side when seen from the viewpoint.

(113) An image processing method including:
setting temporal resolution for each of partial regions of image data to be coded; and
generating a bit stream of the set temporal resolution for each of the partial regions.

REFERENCE SIGNS LIST 100 image processing system
111 imaging device
112 image conversion device
113 coding device
114 transmission device
120 network
131 reception device
132 bit stream conversion device
133 decoding device
134 image conversion device
135 display device
210 preprocessing unit
231 region-by-region basis frame rate setting unit
232 tile set setting unit
233 temporal ID setting unit
234 coding control unit
235 level information setting unit
236 MCTS SEI setting unit
237 parameter set generation unit
251 control unit
252 data extraction unit
253 meta data update unit
254 bit stream generation unit
272 decoding unit
400 image processing system
411 decoding device
421 region-by-region basis frame rate setting unit
422 region setting unit
423 region-by-region basis temporal ID setting unit
424 coding control unit
425 parameter set generation unit
441 decoding region determination unit
442 decoding unit
510 bit stream
520 bit stream
530 bit stream
540 bit stream
800 computer
1600 network system
1601 cloud service
1611 computer
1612 AV appliance
1613 portable information processing terminal
1614 IoT device

The invention claimed is:

1. An image processing device, comprising:
a temporal resolution setting unit configured to set first temporal resolution for a first partial region higher than second temporal resolution for a second partial region, wherein
the first partial region corresponds to one of a center image and a front image of image data,
the second partial region corresponds to at least one image of the image data different from the center image and the front image, and
the first partial region and the second partial region are included in one frame of the image data; and
a coding unit configured to code the image data to generate a bit stream including information indicating the first temporal resolution and the second temporal resolution,
wherein the temporal resolution setting unit and the coding unit are each implemented via at least one processor.

2. The image processing device according to claim 1, wherein each of the first partial region and the second partial region is a tile set separately decodable, the tile set indicating a part of a picture of the image data.

3. The image processing device according to claim 1, wherein
the bit stream includes information related to a tile set corresponding to the first partial region and the second partial region, the tile set indicating a part of a picture of the image data.

4. The image processing device according to claim 1, wherein
the information indicating the first temporal resolution and the second temporal resolution includes a temporal ID set for each of pictures of the image data, first level information set for the first partial region, and second level information set for the second partial region different from the first level information.

5. The image processing device according to claim 1, wherein
the image data is data of a plane image in which an omnidirectional image rendered in a spherical shape about a viewpoint is developed on a single plane.

6. The image processing device according to claim 5, wherein
the first partial region corresponds to the center image, and
the center image corresponds to a center of the plane image in which the omnidirectional image is developed.

7. The image processing device according to claim 1, wherein
the image data is data of a plane image in which plane images in six directions orthogonal to each other about a viewpoint are developed on a single plane,
the plane images include the front image and the at least one image, and
the front image is a plane image on a front side when seen from the viewpoint among the six directions.

8. The image processing device according to claim 1, further comprising:
a partial region setting unit configured to set the first partial region and the second partial region to a picture of the image data, wherein
the partial region setting unit is implemented via at least one processor.

9. The image processing device according to claim 1, wherein
the information indicating the first temporal resolution and the second temporal resolution includes a first temporal ID and a second temporal ID set for the first partial region and the second partial region respectively.

10. The image processing device according to claim 1, wherein
the coding unit is further configured to code the first partial region and the second partial region included in a current picture of the image data on a basis of the first temporal resolution and the second temporal resolution respectively.

11. The image processing device according to claim 10, wherein
the bit stream includes information related to a method for complementing a region other than the second partial region of the current picture during decoding.

12. The image processing device according to claim 1, wherein
the coding unit is further configured to generate a first bit stream of the first partial region and a second bit stream of the second partial region, and
a number of frames of the image data in the first bit stream is larger than a number of frames in the image data in the second bit stream.

13. An image processing method comprising:
setting first temporal resolution for a first partial region higher than second temporal resolution for a second partial region, wherein the first partial region corresponds to one of a center image and a front image of image data,
the second partial region corresponds to at least one image of the image data different from the center image and the front image, and
the first partial region and the second partial region are included in one frame of the image data; and
coding the image data to generate a bit stream including information indicating the first temporal resolution and the second temporal resolution.

14. An image processing device comprising:
a reception unit configured to receive a bit stream in which image data is coded;
an analysis unit configured to analyze information included in the received bit stream and indicating first temporal resolution and second temporal resolution for a first partial region and a second partial region of image data respectively, wherein
the first partial region corresponds to one of a center image and a front image of the image data,
the second partial region corresponds to at least one image of the image data different from the center image and the front image, and
the first partial region and the second partial region are included in one frame of the image data;
a data extraction unit configured to extract data of the first partial region and the second partial region from the received bit stream in accordance with the first temporal resolution and the second temporal resolution; and
a bit stream generation unit configured to convert the received bit stream based on the extracted data, wherein
the converted bit stream is different from the received bit stream, and
the reception unit, the analysis unit, the data extraction unit, and the bit stream generation unit are each implemented via at least one processor.

15. An image processing device comprising:
an analysis unit configured to analyze information indicating first temporal resolution and second temporal resolution for a first partial region and a second partial region of image data respectively, wherein
the information is included in a bit stream in which the image data is coded, and
the first temporal resolution is higher than the second temporal resolution; and
a decoding unit configured to partially decode, as a current frame of the image data, the coded image data corresponding to the first partial region in accordance with the analyzed information while complementing the second partial region based on a frame of the image data different from the current frame,
wherein the analysis unit and the decoding unit are each implemented via at least one processor.

16. The image processing device according to claim 15, wherein
the decoding unit is configured to complement the second partial region in the current frame on a basis of a reproduction of the second partial region in the different frame.

17. An image processing method comprising:
analyzing information indicating first temporal resolution and second temporal resolution for a first partial region and a second partial region of image data respectively, wherein
the information is included in a bit stream in which the image data is coded, and the first temporal resolution is higher than the second temporal resolution; and partially decoding, as a current frame of the image data, the coded image data corresponding to the first partial region in accordance with the analyzed information while complementing the second partial region based on a frame of the image data different from the current frame.

18. The image processing device according to claim 1, wherein the first temporal resolution and the second temporal resolution represent respective frame rates of the image data.

19. The image processing device according to claim 15, wherein the decoding unit is configured to complement the second partial region in the current frame on a basis of an average of a plurality of the different frames.

* * * * *